United States Patent
Shimazaki et al.

(10) Patent No.: US 6,556,516 B1
(45) Date of Patent: Apr. 29, 2003

(54) REPRODUCING METHOD AND REPRODUCING APPARATUS FOR MAGNETO-OPTICAL RECORDING MEDIUM USING DIFFERENT RADIATION PATTERNS

(75) Inventors: Katsusuke Shimazaki, Kitasouma-gun (JP); Susumu Imai, Toride (JP); Norio Ohta, Tsukuba-gun (JP); Hiroyuki Awano, Noda (JP); Masafumi Yoshihiro, Kitasouma-gun (JP); Hitoshi Watanabe, Yuuki-gun (JP); Hiroki Takao, Kitasouma-gun (JP)

(73) Assignee: Hitachi Maxell, Ltd., Ibaraki (JP)

( * ) Notice: Subject to any disclaimer, the term of this patent is extended or adjusted under 35 U.S.C. 154(b) by 0 days.

(21) Appl. No.: 09/242,907

(22) PCT Filed: Aug. 27, 1997

(86) PCT No.: PCT/JP97/02984

§ 371 (c)(1),
(2), (4) Date: Mar. 22, 1999

(87) PCT Pub. No.: WO98/09283

PCT Pub. Date: Mar. 5, 1998

(30) Foreign Application Priority Data

Aug. 27, 1996 (JP) .............................................. 8-225520
Sep. 19, 1996 (JP) .............................................. 8-246777
Mar. 28, 1997 (JP) .............................................. 9-094899

(51) Int. Cl.$^7$ .............................................. G11B 11/00
(52) U.S. Cl. .............................. 369/13.02; 369/13.07; 369/13.27; 369/116
(58) Field of Search ........................... 369/13.1, 13.27, 369/13.39, 116, 13.02, 47.28, 59.12, 53.2, 53.41, 13.07, 47.53, 44.39, 53.36, 288, 13.38, 112.07, 112.15, 13.4; 380/228

(56) References Cited

U.S. PATENT DOCUMENTS 5,062,091 A * 10/1991 Maeda et al. ................ 369/13
5,471,457 A * 11/1995 Bakx et al. .................. 369/116
6,061,307 A *  5/2000 Shimazaki et al. ............ 369/13
6,122,228 A *  9/2000 Shimazaki et al. ............ 369/13

FOREIGN PATENT DOCUMENTS

| JP | A-1-143041 | 6/1989 |
| JP | A-6-259823 | 9/1994 |
| JP | A-7-192342 | 7/1995 |

OTHER PUBLICATIONS

Y. Murakami et al., *Super Resolution Readout of a Magneto–Optical Disk with an In–Plane Magnetization Layer*, Proceedings of Magneto–Optical Recording International Symposium '92; J. Magn. Soc. Jpn., vol. 17, Supplement No. S1 (1993), pp. 201–204.

* cited by examiner

*Primary Examiner*—Ali Neyzari
(74) *Attorney, Agent, or Firm*—Oliff & Berridge, PLC

(57) ABSTRACT

External magnetic fields H(x) or reproducing light beams L(x) having different intensity patterns are applied to an identical recording position on a magneto-optical recording medium so that different pieces of information corresponding to the patterns are reproduced from the identical recording position. A function H(x) or L(x) is a password for obtaining the information. Only a person, who knows the function, can access specified information recorded on the magneto-optical recording medium. The function H(x) or L(x) is a function in which the magnetic field intensity or the light intensity is modulated with respect to the recording position x so that magnetic domains may be thinned out to perform reproduction at a specified cycle from continuous magnetic domains in a recording area. Other than the use for the purpose of security, reproduced C/N can be remarkably improved by performing reproduction n times while radiating a reproducing light beam $P_L/P_H$ which is power-modulated so that the high power $P_H$ is applied at every cycle which is not less than n times the recording clock, to a specified magneto-optical recording medium capable of magnetic domain-magnifying reproduction.

14 Claims, 29 Drawing Sheets

Fig. 1(A)
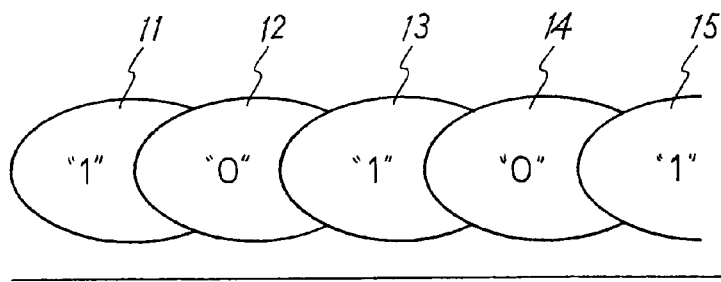
Fig. 1(B)
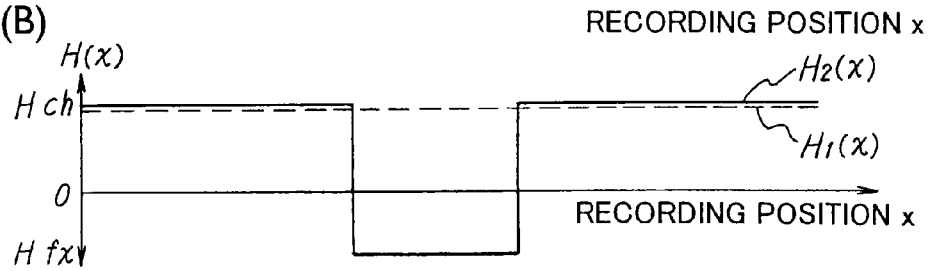
Fig. 1(C)
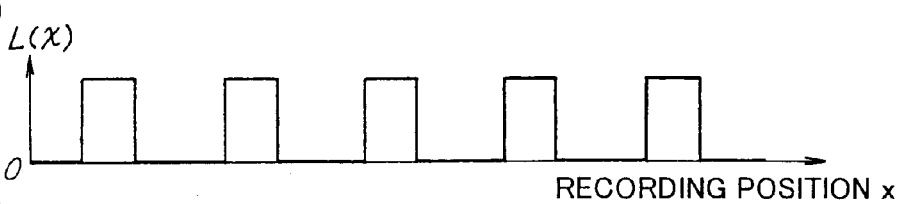
Fig. 1(D)
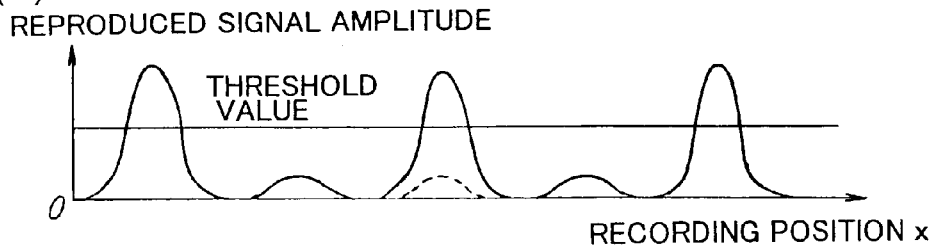
Fig. 1(E)
| REPRODUCED INFORMATION SEQUENCE | 1 | 0 | 1 | 0 | 1 | $H_1(x)$ |
| REPRODUCED INFORMATION SEQUENCE | 1 | 0 | 0 | 0 | 1 | $H_2(x)$ |

Fig. 8

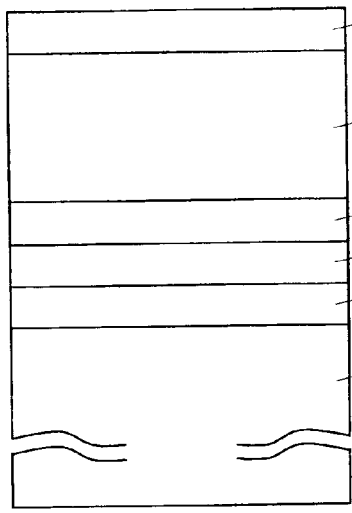

- 46: (DIELECTRIC LAYER)
- 45: (INFORMATION-RECORDING LAYER)
- 44: (NON-MAGNETIC LAYER)
- 43: (MAGNIFYING REPRODUCING LAYER)
- 42: (DIELECTRIC LAYER)
- 41: (TRANSPARENT SUBSTRATE)

Fig. 9

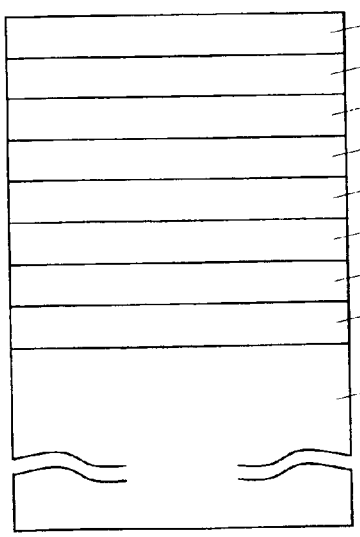

- 46: (NON-MAGNETIC LAYER)
- 50: (INFORMATION-RECORDING LAYER)
- 49: (2nd EXCHANGE COUPLING FORCE CONTROL LAYER)
- 48: (1st EXCHANGE COUPLING FORCE CONTROL LAYER)
- 47: (GATE LAYER)
- 44: (NON-MAGNETIC LAYER)
- 43: (MAGNIFYING REPRODUCING LAYER)
- 42: (DIELECTRIC LAYER)
- 41: (TRANSPARENT SUBSTRATE)

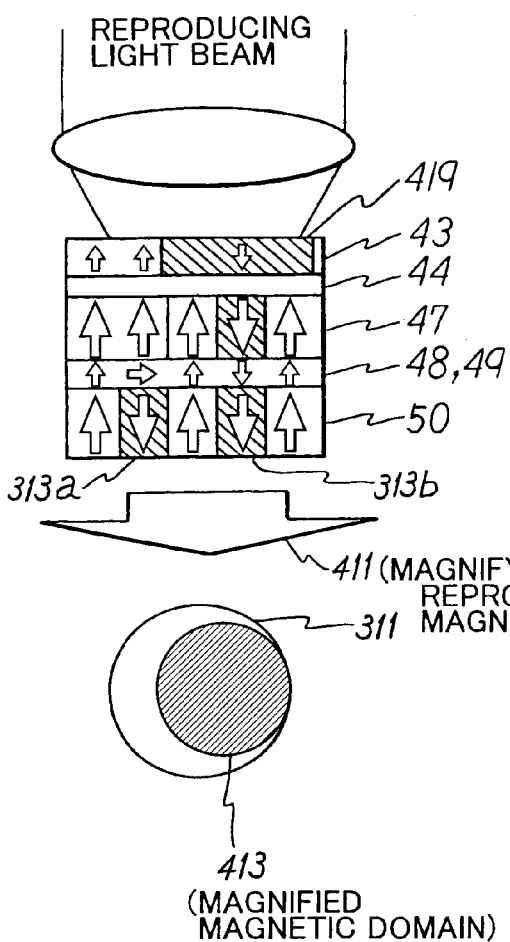
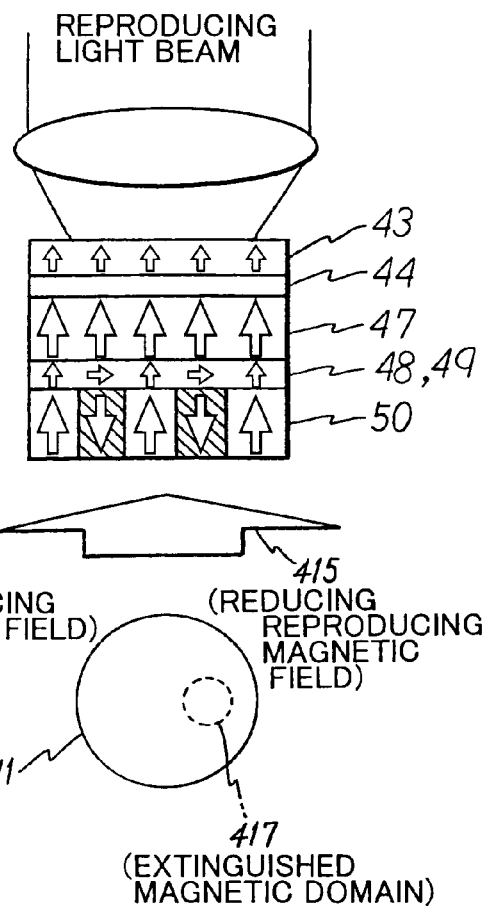

MAGNETIC DOMAIN-MAGNIFYING REPRODUCING MAGNETIC FIELD (INITIAL MAGNETIZATION CURVE)

MAGNETIC DOMAIN-REDUCING REPRODUCING MAGNETIC FIELD

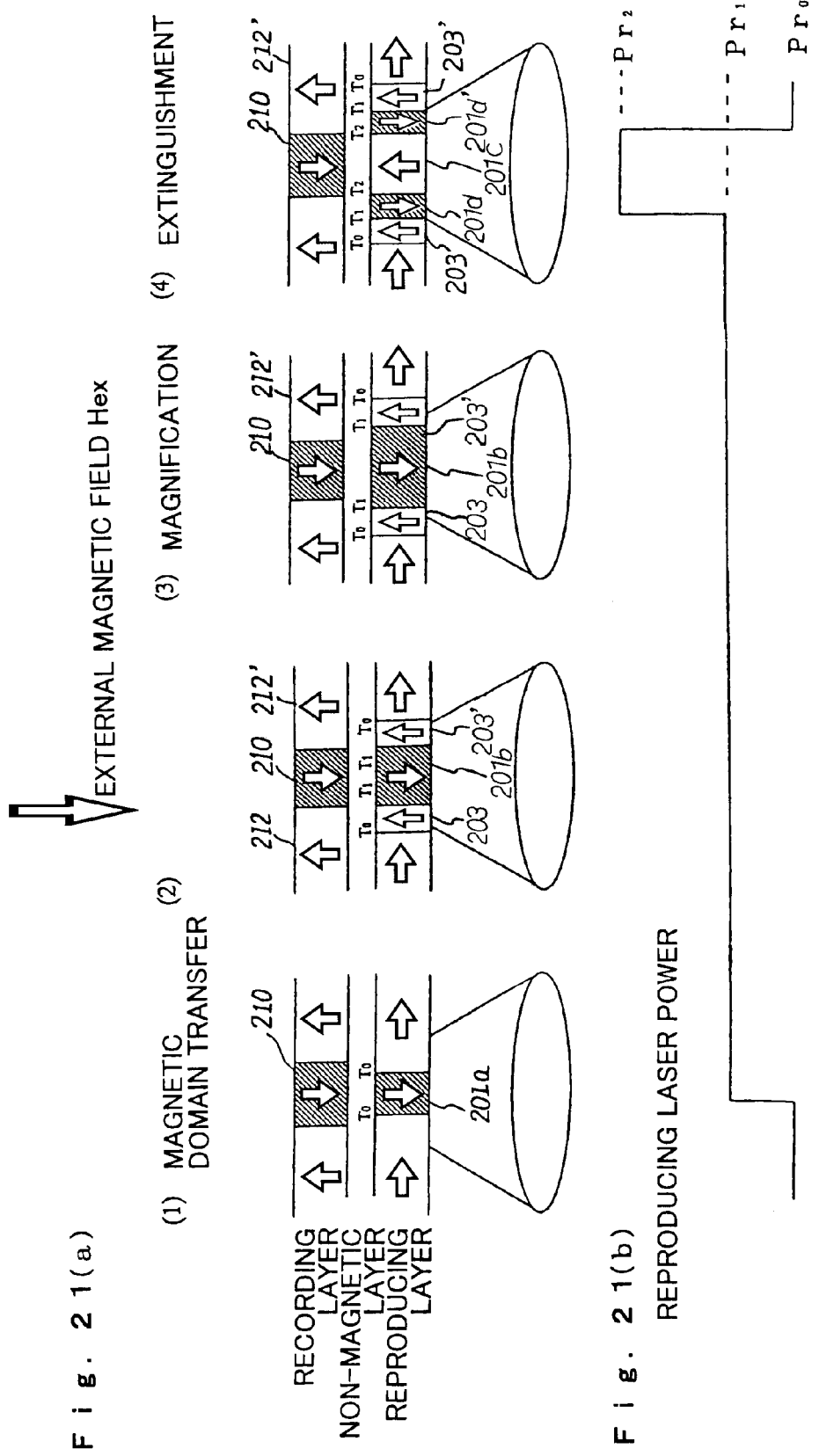

Fig. 22(a)  $T_1 < T < T_{comp}$
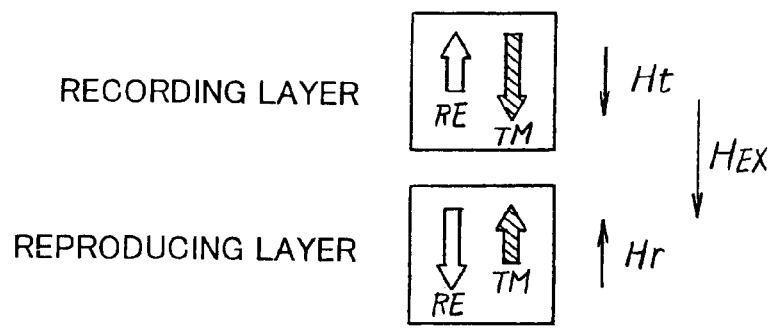
Fig. 22(b)  $T_{comp} < T < T_{CO}$
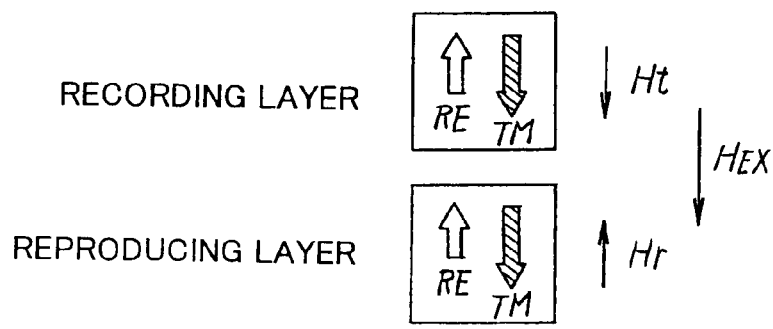

REPRODUCING METHOD AND REPRODUCING APPARATUS FOR MAGNETO-OPTICAL RECORDING MEDIUM USING DIFFERENT RADIATION PATTERNS

TECHNICAL FIELD

The present invention relates to a magneto-optical recording and reproducing method and a recording and reproducing apparatus therefor, to be carried out by using a magneto-optical recording medium. In particular, the present invention relates to a magneto-optical recording and reproducing method and a recording and reproducing apparatus therefor, based on the use of a novel reproducing technique which has not been used in any conventional magneto-optical recording and reproduction process.

BACKGROUND ART

In order to realize a more advanced high density process carried out on a magneto-optical recording medium, a technique attracts attention, in which the magneto-optical recording medium is irradiated with a reproducing laser beam while applying an external magnetic field during reproduction to obtain a reproduced signal.

The magnetically induced super resolution technique has been suggested, as described, for example, in *Journal of Magnetic Society of Japan*, Vol. 17, Supplement No. S1, p. 201 (1993). This technique improves the magnetic film of the magneto-optical recording medium, and it utilizes the occurrence of the temperature distribution in a light spot upon irradiation with a reproducing light beam. Thus, a magnetic mask is generated in the spot so that the effective spot diameter, which contributes to signal reproduction, is reduced. The use of this technique makes it possible to improve the reproducing resolving power without reducing the optical spot diameter.

Another technique for amplifying a minute reproduction signal has been also suggested, as disclosed, for example, in Japanese Patent Application Laid-Open No. 1-143041, in which the magnetic domain is magnified by applying an external magnetic field during reproduction. Japanese Patent Application Laid-Open No. 6-259823 also discloses a technique for amplifying the magnetic domain.

The use of the magnetically induced super resolution technique and the magnetic domain-magnifying reproduction technique makes it possible to mutually distinguish and reproduce a plurality of minute magnetic domains existing in the reproducing light spot. However, since such magnetic domains are subjected to high density recording, the recording clock cycle is short. When such signals are reproduced, it is feared that C/N is deteriorated due to occurrence of interference between waveforms. For this reason, a technique is further required to improve C/N when the magnetic domains, which are subjected to high density recording, are reproduced by using the techniques as described above.

In the case of the conventional techniques described above, the reproduced signal, which is obtained upon reproduction, corresponds to information recorded on the magneto-optical recording medium, either when the magnetically induced super resolution technique is used, or when the minute reproduced signal is amplified by applying the external magnetic field during reproduction to magnify the magnetic domain, because of the following reason. That is, it has been premised that the recorded information should be faithfully reproduced.

However, it is not necessarily demanded that all of recorded information is faithfully reproduced, depending on the use or application of an application system to be constructed. In some cases, it is intended to obtain different pieces of reproduced information depending on the use and the purpose. For example, in a certain application system in relation to any security use, there may be a case in which only information, that is recorded on a specified portion of a magneto-optical recording medium, is intended to be reproduced when information recorded on the magneto-optical recording medium is reproduced. Similarly, in an application system in relation to any security use or any cipher description use, there may be a case in which it is intended to directly obtain a reproduced signal by converting information with a specified function, when information recorded on the magneto-optical recording medium is reproduced. Further, depending on the use of the application system, it is desired to perform direct reproduction while thinning out information at specified intervals, when information recorded on the magneto-optical recording medium is reproduced.

An object of the present invention is to provide a magneto-optical reproducing method and a reproducing apparatus therefor, for obtaining different pieces of reproduced information depending on the use and the purpose, without faithfully reproducing all of recorded information, when information recorded on a magneto-optical recording medium is reproduced. Another object of the present invention is to provide a magneto-optical reproducing method and a reproducing apparatus therefor, which make it possible to reproduce, with high C/N, information subjected to high density recording on a magneto-optical recording medium.

DISCLOSURE OF THE INVENTION

According to a first aspect of the present invention, there is provided a method for reproducing information recorded on a magneto-optical recording medium while applying an external magnetic field to the magneto-optical recording medium, the method comprising the step of:

applying the external magnetic field including different application patterns to an identical recording area on the magneto-optical recording medium so that different pieces of information corresponding to the application patterns are reproduced from the identical recording area. The application pattern is represented as a function H(x) of the magnetic field intensity with respect to the position x on the magneto-optical recording medium. It is possible to construct a system in which the function H(x) is used as a password to obtain information, and only a person, who knows the function H(x), is able to access specified information capable of being reproduced with the function H(x).

According to a second aspect of the present invention, there is provided a method for reproducing information recorded on a magneto-optical recording medium while radiating a reproducing light beam onto the magneto-optical recording medium, the method comprising the step of:

radiating the reproducing light beam including different radiation patterns onto an identical recording position on the magneto-optical recording medium so that different pieces of information corresponding to the radiation patterns are reproduced from the identical recording position.

According to a third aspect of the present invention, there is provided a magneto-optical reproducing apparatus for reproducing recorded information by radiating a reproducing light beam onto a magneto-optical recording medium, the apparatus comprising:

a magnetic field unit for applying an external magnetic field to the magneto-optical recording medium during reproduction;

a means for selecting a specified external magnetic field application pattern from a plurality of external magnetic field application patterns; and a driving unit for driving the magnetic field unit in accordance with the selected external magnetic field application pattern, wherein the information recorded on the magneto-optical recording medium is reproduced while applying the magnetic field to the magneto-optical recording medium in accordance with the specified external magnetic field application pattern to make it possible to obtain specified information based on the pattern.

According to a fourth aspect of the present invention, there is provided a magneto-optical reproducing apparatus for reproducing recorded information by radiating a reproducing light beam onto a magneto-optical recording medium, the apparatus comprising:

a light source for radiating the reproducing light beam onto the magneto-optical recording medium during reproduction;

a means for selecting a specified radiation pattern from a plurality of radiation patterns; and a driving unit for driving the light source in accordance with the selected specified pattern, wherein:

the information recorded on the magneto-optical recording medium is reproduced while radiating the reproducing light beam onto the magneto-optical recording medium in accordance with the specified radiation pattern to make it possible to obtain specified information based on the pattern.

The principle of operation of the magneto-optical recording and reproducing method according to the present invention will be explained below. Recording is performed on the magneto-optical recording medium by magnetizing the recording layer in an area intended to perform recording, in a desired direction. Reproduction is performed by detecting the magneto-optical effect such as the Kerr rotation angle and the Faraday rotation angle. In an ordinary reproduction process, it is desired to stably obtain a reproduced signal faithfully corresponding to the recorded magnetization state. In order to stably obtain the reproduced signal faithfully corresponding to the recorded magnetization state, it is desired to obtain a reproduced signal having a stable shape, regardless of slight fluctuation of the radiation state of the laser beam to be radiated during the reproduction. When the external magnetic field is applied during the reproduction in accordance with, for example, the magnetically induced super resolution, it is desired to obtain a reproduced signal having a stable shape, regardless of slight fluctuation of the application state of the external magnetic field.

On the contrary, the present invention actively utilizes the change of the shape of the reproduced signal by changing the application pattern of the external magnetic field applied during the reproduction, the radiation pattern of the laser beam radiated during the reproduction, or the combination thereof. Even when an identical magnetization state is recorded on the recording layer of the magneto-optical recording medium, it is possible to obtain a plurality of reproduced signals having different shapes by changing the application pattern of the external magnetic field, the radiation pattern of the laser beam radiated during the reproduction, or the combination thereof, because of the following reason. That is, the magnetization state of the reading layer, which directly contributes to the reproduced signal, can be changed by changing the application pattern of the external magnetic field, the radiation pattern of the laser beam radiated during the reproduction, or the combination thereof. It is especially preferable to use a magneto-optical recording medium comprising a plurality of stacked layers including two layers of a recording layer and a reading layer, the magneto-optical recording medium being constructed such that the magnetization state of the reading layer depends on the magnetization state of the recording layer and the temperature distribution caused by irradiation with the reproducing laser beam. The use of such a magneto-optical recording medium makes it possible to obtain a plurality of reproduced signals having different shapes by changing the application pattern of the external magnetic field, the radiation pattern of the laser beam radiated during the reproduction, or the combination thereof. In other words, the present invention is preferably applied to perform the recording and the reproduction on the magneto-optical recording medium comprising a plurality of stacked layers including at least the recording layer and the reading layer, and the present invention is especially preferably applied to perform the recording and the reproduction on the magneto-optical recording medium capable of performing the magnetically induced super resolution or the magnification of the magnetic domain.

BRIEF DESCRIPTION OF THE DRAWINGS

FIG. 1 illustrates a magneto-optical recording and reproducing method according to the present invention described in a first embodiment.

FIG. 8 exemplarily shows a representative structure of a recording medium preferably used in the present invention.

FIG. 9 exemplarily shows a representative structure of a recording medium preferably used in the present invention.

FIGS. 10A and B show an experimental result obtained when the magnetic domain is magnified on the recording medium shown in FIG. 8, respectively.

FIG. 21 explains the process for reproducing the recording magnetic domain in the magneto-optical recording layer from the magneto-optical reproducing layer by irradiating the magneto-optical recording medium described in the tenth embodiment with the optically modulated reproducing light beam, wherein (a) illustrates the directions of the magnetic domains in the recording layer and the reproducing layer, and (b) illustrates the optically modulated reproducing light power.

FIG. 22 illustrates the principle of the extinguishment of the magnetic domain, wherein (a) illustrates the sub-lattice magnetization of the reproducing layer at a temperature less than the compensation temperature, and (b) illustrates the sub-lattice magnetization of the reproducing layer at a temperature above the compensation temperature.

BEST MODE FOR CARRYING OUT THE INVENTION

Figure 2:
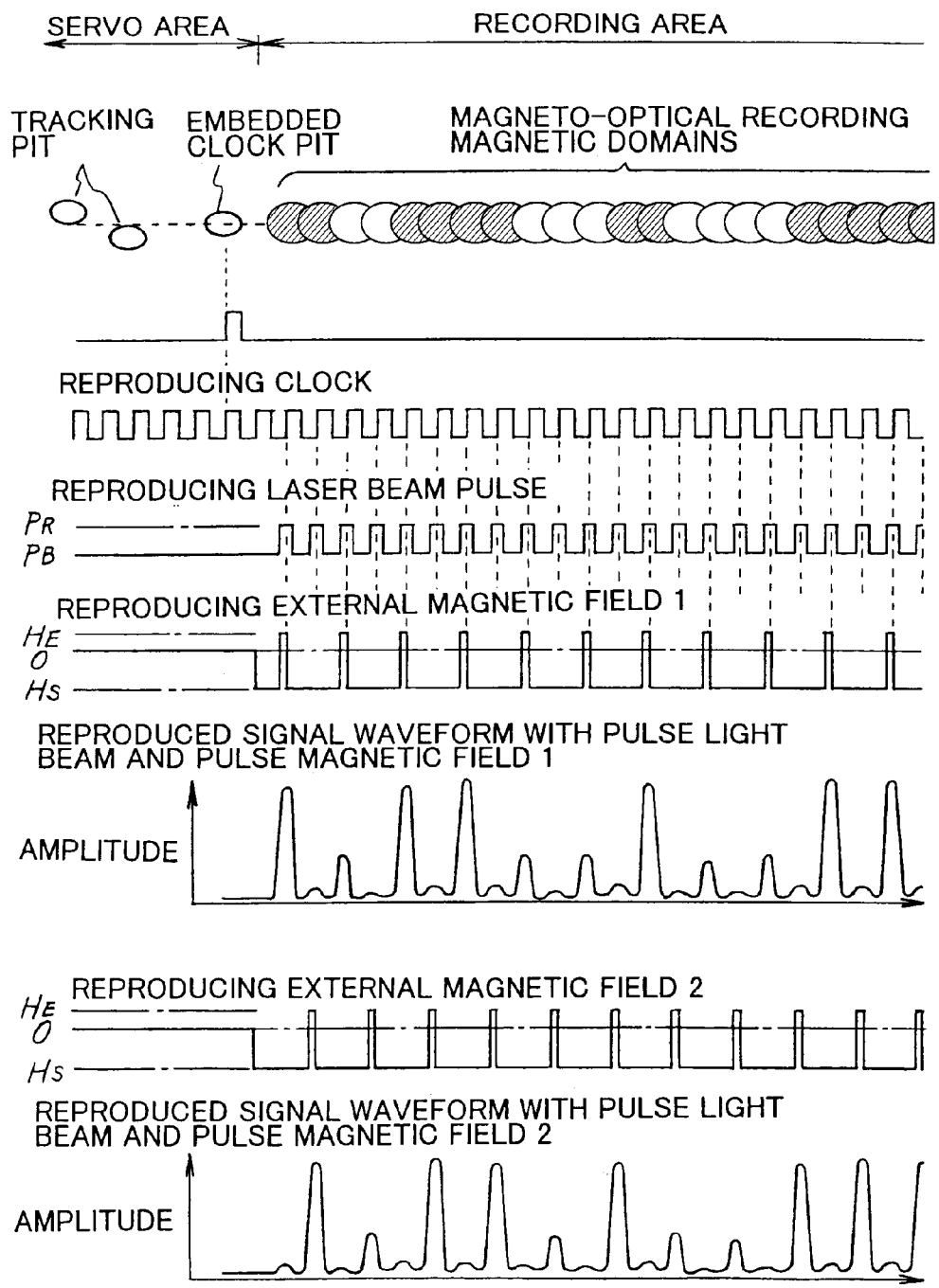
FIG. 2 illustrates a magneto-optical recording and reproducing method according to the present invention described in a second embodiment.

Embodiments and Examples of the magneto-optical recording and reproducing method and the recording and reproducing apparatus therefor according to the present invention will be explained below with reference to the drawings. However, the present invention is not limited thereto.

First Embodiment

This embodiment is illustrative of the magneto-optical recording and reproducing method in which the information, which is recorded at a position x on an identical recording medium, can be reproduced as different pieces of information by changing the function H(x) corresponding to the application pattern of the external magnetic field applied when the information is reproduced and the function L(x) corresponding to the radiation pattern of the reproducing laser beam.

FIG. 1 conceptually illustrates the magneto-optical reproducing method according to the present invention. (A) depicts a recording magnetic domain sequence on a recording medium. (B) depicts a function H(x) corresponding to the application pattern of the external magnetic field applied during reproduction. (C) depicts a function L(x) corresponding to the reproducing laser beam radiation pattern. (D) depicts a signal amplitude waveform reproduced by using the function H(x) and the function L(x). (E) depicts a reproduced information sequence. H(x) represents the intensity of the external magnetic field applied at a position x on the recording medium, and it is a function of x. H(x) is defined, for example, by the intensity of the applied magnetic field such as the maximum intensity of the applied magnetic field and the minimum intensity of the applied magnetic field, the frequency of the applied magnetic field, the rising shape and the falling shape of the signal at the portion at which the external magnetic field is switched, and the timing of the applied magnetic field. H(x) can be changed by changing at last one of the foregoing factors. L(x) represents the intensity of the reproducing laser beam radiated at x, and it is a function of x. L(x) is defined, for example, by the laser beam intensity, the clock frequency for making synchronization with the radiation of the laser beam, the duty for radiating the laser beam, the rising shape and the falling shape of the radiation intensity of the laser beam, and the radiation timing of the laser beam. L(x) is changed by changing at least one of the foregoing factors.

As shown in (A), it is assumed that a binary or two-valued information sequence of "1", "0", "1", "0", "1" is recorded in recording magnetic domains 11, 12, 13, 14, and 15 of the magneto-optical recording medium respectively. Preferably, the recording magnetic domains are subjected to recording by using the magneto-optical modulation recording method in which the external magnetic field having the polarity modulated depending on the recording signal is applied while radiating the pulse light beam which is synchronized with the recording clock. However, it is allowable to perform recording based on the optical modulation method or the magnetic field modulation method provided that the magnetic domains can be formed in desired stable shapes. In this embodiment, the recording information is added to the central position of the recording magnetic domain by using the mark position recording method. As described later on, the magneto-optical recording medium to be used is a medium of the type which information is reproduced while radiating the reproducing light beam and applying the magnetic field during the reproduction.

When the reproduction is performed, as shown in FIG. 1 (B), it is possible to apply, to the magneto-optical recording medium, the magnetic field represented by two types of functions $H_1(x)$ and $H_2(x)$. When the function $H_1(x)$ is used, the magnetic field is applied in a direction of magnetization of the recording magnetic domain (polarity of $H_{ch}$) regardless of the recording position x. On the other hand, when $H_2(x)$ is used, the magnetic field is applied by changing the intensity of the magnetic field depending on the position of the recording magnetic domain. The reproducing light beam is used as shown in FIG. 1(C). That is, a pulse-shaped laser beam L(x), which is synchronized with the recording magnetic domain (recording clock), is radiated.

In the conventional magneto-optical recording and reproduction process, the reproducing magnetic field is applied as indicated by the function $H_1(x)$ shown by a broken line in (B). That is, the reproducing magnetic field is applied in the direction of magnetization of the recording magnetic domain (polarity of $H_{ch}$) regardless of the position of the recording magnetic domain. In this case, a binary information sequence "10101" is reproduced, and the information, which has been recorded in the recording magnetic domains, is faithfully reproduced.

On the contrary, the function $H_2(x)$, which corresponds to the magnetic field pattern indicated by a solid line in FIG. 1(B), is designed such that the magnetic field is inverted into $H_{fx}$ having the polarity reverse to that of $H_{ch}$ only at the timing (position) at which x corresponds to the position of the recording magnetic domain 13. It is noted that the direction of the magnetization of the recording magnetic domain 13 is opposite to the direction of the reproducing magnetic field. Therefore, it is impossible to reproduce the magnetization information "1" of the recording magnetic domain 13 by using either the magneto-optical recording medium based on the use of the magnetic domain magnification-based reproduction process as shown in the fourth embodiment or the magneto-optical recording medium based on the use of the magnetically induced super resolution-based reproduction process as shown in the ninth embodiment as described later on. Accordingly, when the recording magnetic domains 11 to 15 are subjected to reproduction by using the magnetic field pattern in accordance with the function $H_2(x)$, a reproduced signal of "10001" is obtained.

Therefore, when the identical recording magnetic domains are subjected to reproduction, the reproduced signal (waveform) differs depending on whether the function H(x) of the applied reproducing magnetic field is $H_1(x)$ or $H_2(x)$. Thus, it is possible to obtain different pieces of information. Otherwise, it is considered that the information, which does not depend on the magnetization state of the recording magnetic domain 13, is obtained when the function $H_2(x)$ is used. In other words, it is considered that when the function $H_2(x)$ is used, the recording magnetic domain can be subjected to reproduction to produce the information which does not depend on the magnetization state, at a certain position on the identical recording medium, while the recording magnetic domain can be subjected to reproduction to produce the information which depends on the magnetization state of the recording magnetic domain, at another position on the identical recording medium. This concept is used as follows. That is, for example, if the information located on the recording magnetic domain 13 is important for a user, the user can access the necessary information by using the function $H_1(x)$ which is capable of reproducing the magnetization information of the recording magnetic domain. If the information located on the recording magnetic domain 13 is not important for another user, the recording area containing the recording magnetic domain 13 can be subjected to reproduction by using the function which fails to read the magnetization state of the recording magnetic domain 13 or the function $H_2(x)$ which is used to read the magnetization state as the magnetization information in the erasing direction irrelevant to the direction of the magnetization. That is, the function H(x) can operate as a password to access the necessary information for each user. Accordingly, it is possible to obtain a plurality of pieces of information from the identical recording magnetic domain depending on the function H(x). As demonstrated in the embodiment described later on, the information can be ciphered by precoding the recording signal in accordance with the function H(x) upon the recording process. Thus, it is possible to construct a system which is effective to keep the secret information based on the use of the magneto-optical recording medium.

It is also preferable in the embodiment of the present invention that the sampling frequency, which is used when the binary information is obtained from the reproduced signal, is not coincident with the sampling frequency which is used during the recording. For example, the reproduction process may be performed by using a sampling frequency which is three times as much as the sampling frequency used when the recording process is performed. Alternatively, the reproduction process may be performed, in which the sampling frequency during the recording process is ⅓ of the recording clock.

The information to be reproduced may be reproduced not as binary or two-valued information but as three-valued or higher multi-valued information. In this procedure, a threshold value is set beforehand to perform reproduction so that the multi-valued information is obtained. The information may be multi-valued in accordance with the amplitude of the reproduced signal.

Further, it is appropriate to combine the sampling frequencies upon the recording and the reproduction of the information, and the selection of the number of steps to obtain the multi-valued information. By doing so, even if the waveform itself of the reproduced signal is identical, it is possible to obtain those which are different from each other as reproduced information sequences.

The foregoing description may be summarized into the following statements.

i) The information, which has been recorded at the identical position on the identical recording medium, can be obtained as the reproduced signals having different waveforms by changing H(x) or L(x) during the reproduction.

ii) Even if the reproduced signals have the identical waveform, the recorded information can be reproduced as different pieces of information by changing the process condition such as the preset value for the slice level and the sampling cycle.

iii) There are a variety of methods in which the information, which has been recorded at the identical position on the identical recording medium, is reproduced as various different pieces of information by utilizing i) and ii) described above in combination.

Explanation will be made for examples of the variety of methods in which the information, which has been recorded at the identical position on the identical recording medium, is reproduced. At first, a plurality of pieces of information can be reproduced from an identical recording position by changing the application pattern represented by H(x) to apply the magnetic field to the identical recording position on the recording medium. For example, it is assumed that H(x) is represented by three types of H1(x), H2(x), and H3(x). A plurality of different pieces of information can be reproduced from an identical recording position depending on the selection of any of them. In the example shown in FIG. 1, those used as H(x) are the two types of the magnetic field waveform as depicted by the broken line shown in FIG. 1(B) and the magnetic field waveform as depicted by the solid line shown in FIG. 1(B). However, H(x) may be a more complicated function. Similarly, a plurality of different pieces of information can be reproduced from an identical recording position by changing the laser beam radiation pattern represented by L(x) to apply the laser beam to the identical recording position on the recording medium. L(x) may be a complicated function. Further, a plurality of different pieces of information can be reproduced from one piece of recorded information located at an identical position on an identical recording medium by changing L(x) in addition to the change of H(x).

Furthermore, the information sequence may be reproduced from the information recorded at an identical position on an identical recording medium, as at least two or more different information sequences, each of which is the three-valued or higher multi-valued information. Moreover, taking notice of the (d, k) constraint which is known in the field of the coding technique, the present invention is also directed to the fact that the information sequence, which is reproduced from the information located at an identical position on an identical recording medium, is reproduced as a plurality of binary sequences having different (d, k) constraints.

Those usable as the recording medium in the specified embodiment of the present invention include, for example, the conventional magneto-optical recording medium, the recording medium capable of performing the magnetically induced super resolution, and the recording medium capable of magnifying the magnetic domain as demonstrated in the embodiment described later on. It is preferable to use the recording medium capable of magnifying the magnetic domain in view of the fact that a large reproduced signal amplitude can be obtained even when the recording magnetic domain is minute. Especially, in the embodiment of the present invention, it is preferable to use the recording medium capable of magnifying the magnetic domain in view of the fact that a large difference can be obtained in the reproduced signal amplitude depending on whether the information recorded in the recording magnetic domain is "0" or "1", when $H(x)=H_{ch}$ is applied. The recording medium capable of magnifying the magnetic domain will be explained in the fourth embodiment described later on.

The illustration concerning FIG. 1 assumes the mark position recording. However, the present invention can be also carried out in accordance with the mark edge recording by making appropriate alteration. It is a matter of course that the present invention is also applicable even when the magnetic domain length of the magnetic domain to be subjected to recording differs.

Second Embodiment

This embodiment specifically illustrates an example in which the reproduced signal is changed when H(x) is changed.

FIG. 2 conceptually illustrates this embodiment. FIG. 2 shows, from the top, the position on the magneto-optical recording disk based on the sample servo system, a reproducing clock, a reproducing laser beam pulse, a reproducing external magnetic field 1, a reproduced signal waveform obtained by using the pulse light beam and the reproducing external magnetic field 1, a reproducing external magnetic field 2, and a reproduced signal waveform obtained by using the pulse light beam and the reproducing external magnetic field 2. The position on the magneto-optical disk based on the sample servo system is roughly classified into those in a servo area and those in a recording area. Tracking pits and an embedded clock pit are arranged in the servo area. Magneto-optical recording magnetic domains are disposed in the recording area.

The reproducing clock is generated by utilizing a detection signal obtained from the illustrated embedded clock pit. In FIG. 2, H(x) corresponds to the reproducing external magnetic field 1 and the reproducing external magnetic field 2. L(x) corresponds to the reproducing laser beam pulse. L(x), which is used when the reproducing external magnetic field 1 is applied, is identical to that used when the reproducing external magnetic field 2 is applied. However, the reproducing laser beam pulse is modulated into two levels of a high power PH and a low power PL. The high power PH preferably has a duty of 10% to 60%. In this embodiment, the duty is 30%.

In FIG. 2, the reproducing external magnetic field 1 was obtained by alternately applying an external magnetic field $H_E$ having a polarity in the same direction as the magnetization direction of the recording magnetic domains (black magnetic domains in FIG. 2) and a magnetic field $H_S$ in an initializing direction (magnetization direction of white magnetic domains in FIG. 2) opposite thereto, at a cycle which was twice as much as the reproducing clock. ($H_E$, $H_S$ shown in FIG. 2 correspond to $H_{ch}$, $H_{fx}$ shown in FIG. 1.) The duty of the external magnetic field $H_E$ is preferably 5% to 45%. In this embodiment, the duty was adjusted to be 25%. On the other hand, the reproducing external magnetic field 2 was applied at the same frequency at the same intensity ($H_E$, $H_S$) with the same duty as those of the reproducing external magnetic field 1 except that the phase of the reproducing external magnetic field 1 was deviated in an amount of one cycle of the reproducing clock.

As shown in FIG. 2, it is understood that when the identical recording area on the magneto-optical recording medium is subjected to reproduction, the waveform of the reproduced signal, which is obtained when the reproduction is performed by using the reproducing external magnetic field 1, is different from that obtained when the reproduction is performed by using the reproducing external magnetic field 2. Also in this embodiment, different pieces of information can be obtained even when the waveform of the reproduced signal is identical, as described in ii) in the first embodiment. The fact described in ii) in the first embodiment is also applicable to this embodiment. Those usable as the recording medium in this embodiment include, for example, the conventional magneto-optical recording medium, the recording medium capable of performing the magnetically induced super resolution, and the recording medium capable of magnifying the magnetic domain. It is preferable to use the recording medium capable of magnifying the magnetic domain, in the same manner as in the first embodiment.

Third Embodiment

This embodiment is illustrative of another example of the magneto-optical recording and reproducing method in which information, which is recorded at an identical position on an identical recording medium, can be obtained as reproduced signals having different waveforms, by changing at least one of H(x) and L(x).

FIGS. 3 to 7 conceptually illustrate the reproducing method according to this embodiment. FIGS. 3 to 7 show, from the top, the position on the magneto-optical recording disk based on the sample servo system, a reproducing clock, a reproducing laser beam pulse, a reproducing external magnetic field, a reproduced signal waveform obtained by using a DC light beam and a DC external magnetic field, a reproduced signal waveform obtained by using the pulse light beam and the pulse magnetic field, a reproduced signal waveform after sample hold obtained by using the pulse light beam and the pulse magnetic field, and a sample hold pulse synchronized with the clock. For example, the clock synchronization, which utilizes the embedded clock pit, is performed in the same manner as in the case shown in FIG. 2.

In FIGS. 3 to 7, the pulse light beam and the pulse magnetic field are applied to the magneto-optical recording medium during the reproduction. However, the respective cases use different application patterns of the reproducing magnetic field and/or the reproducing light beam (different in the function H(x) or L(x) concerning the position X on the magneto-optical recording medium). As a result, although the magneto-optically recorded magnetic domain pattern (recorded information) is completely identical in all of the cases shown in FIGS. 3 to 7, the waveform of the reproduced signal and the reproduced signal waveform after the sample hold differ, because the application pattern of the reproducing magnetic field or the reproducing light beam is different.

Figure 3:
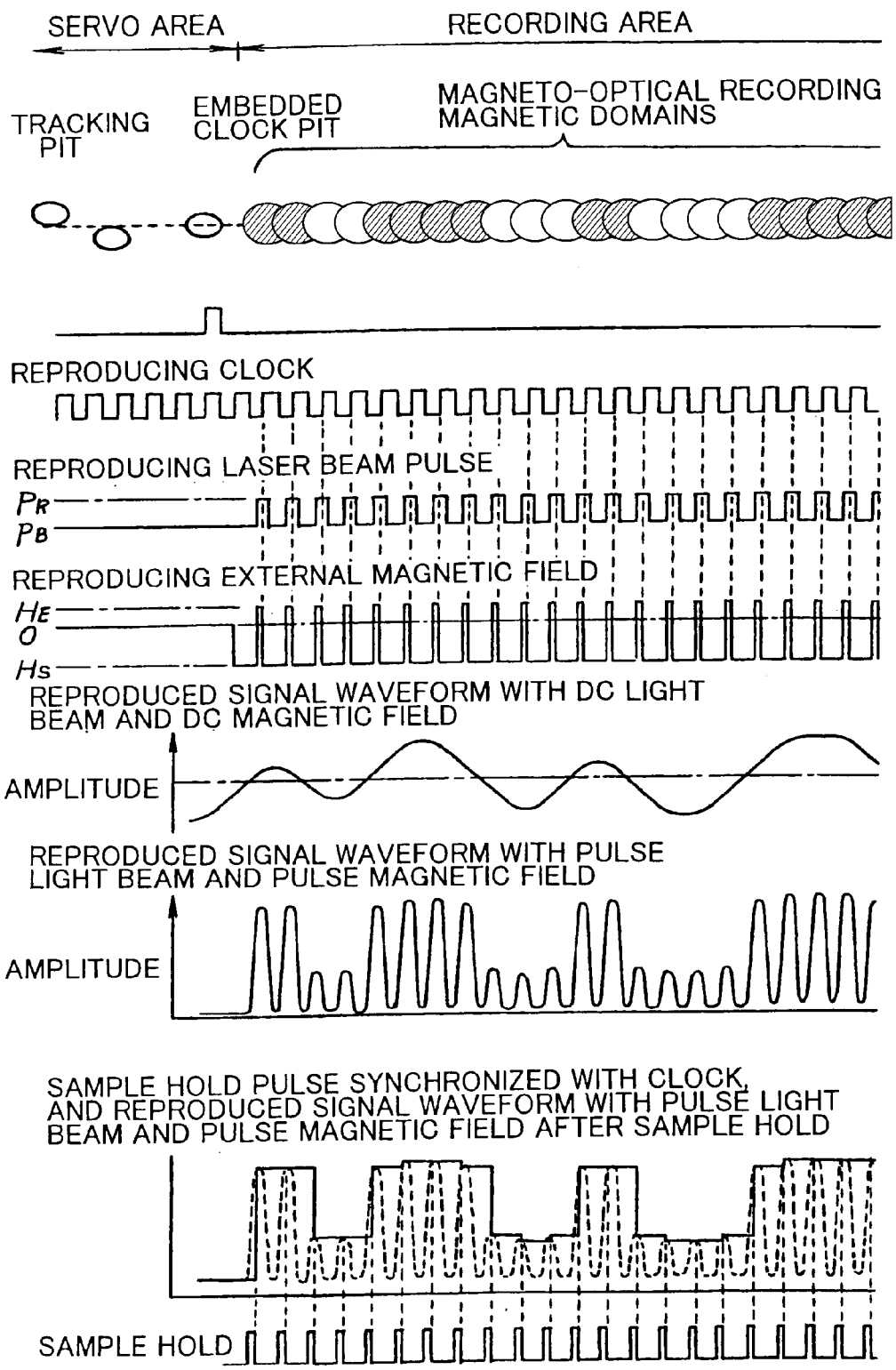
FIG. 3 illustrates a magneto-optical recording and reproducing method according to the present invention described in a third embodiment.
Figure 4:
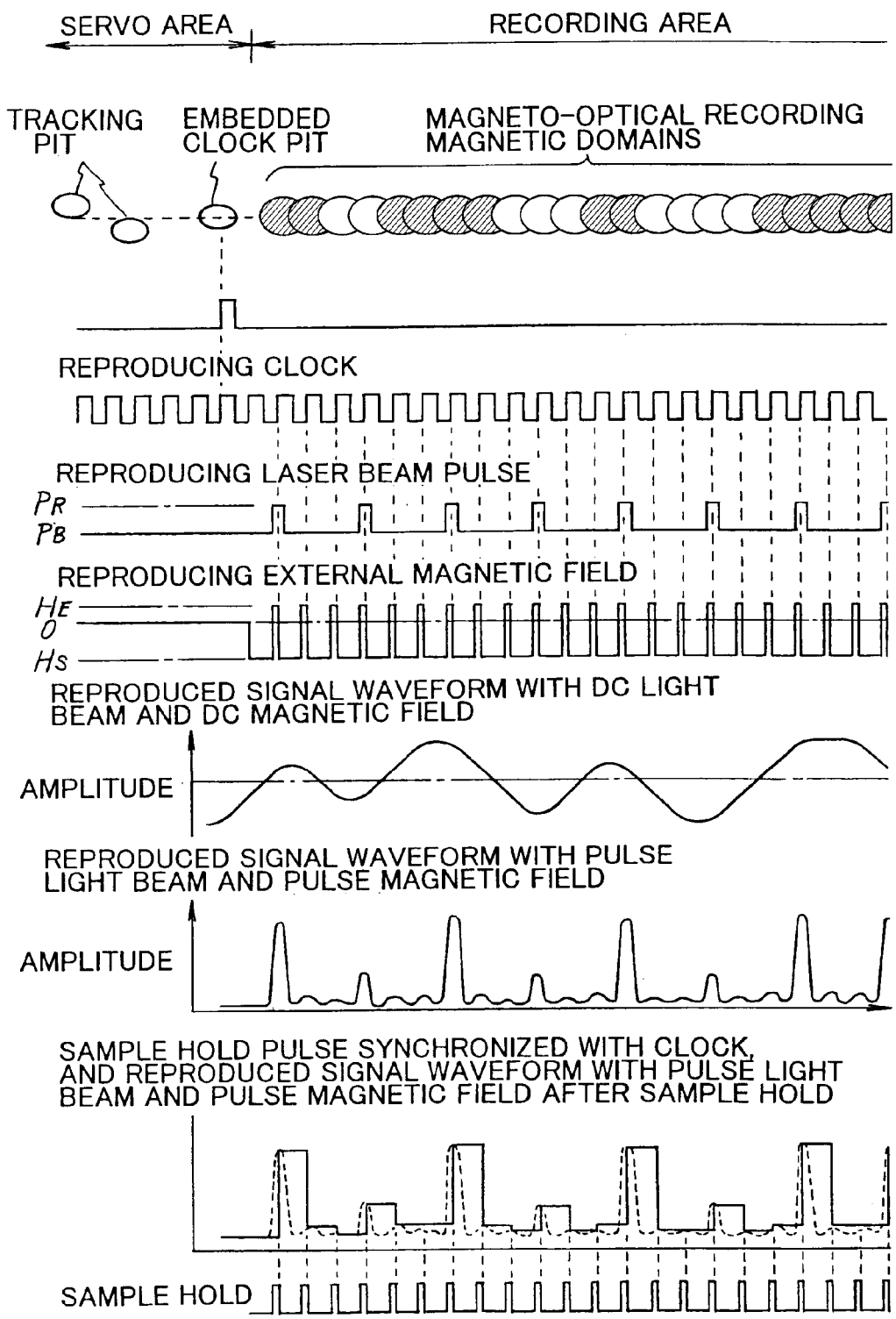
FIG. 4 illustrates the magneto-optical recording and reproducing method according to the present invention described in the third embodiment, which is different from FIG. 3.
Figure 5:
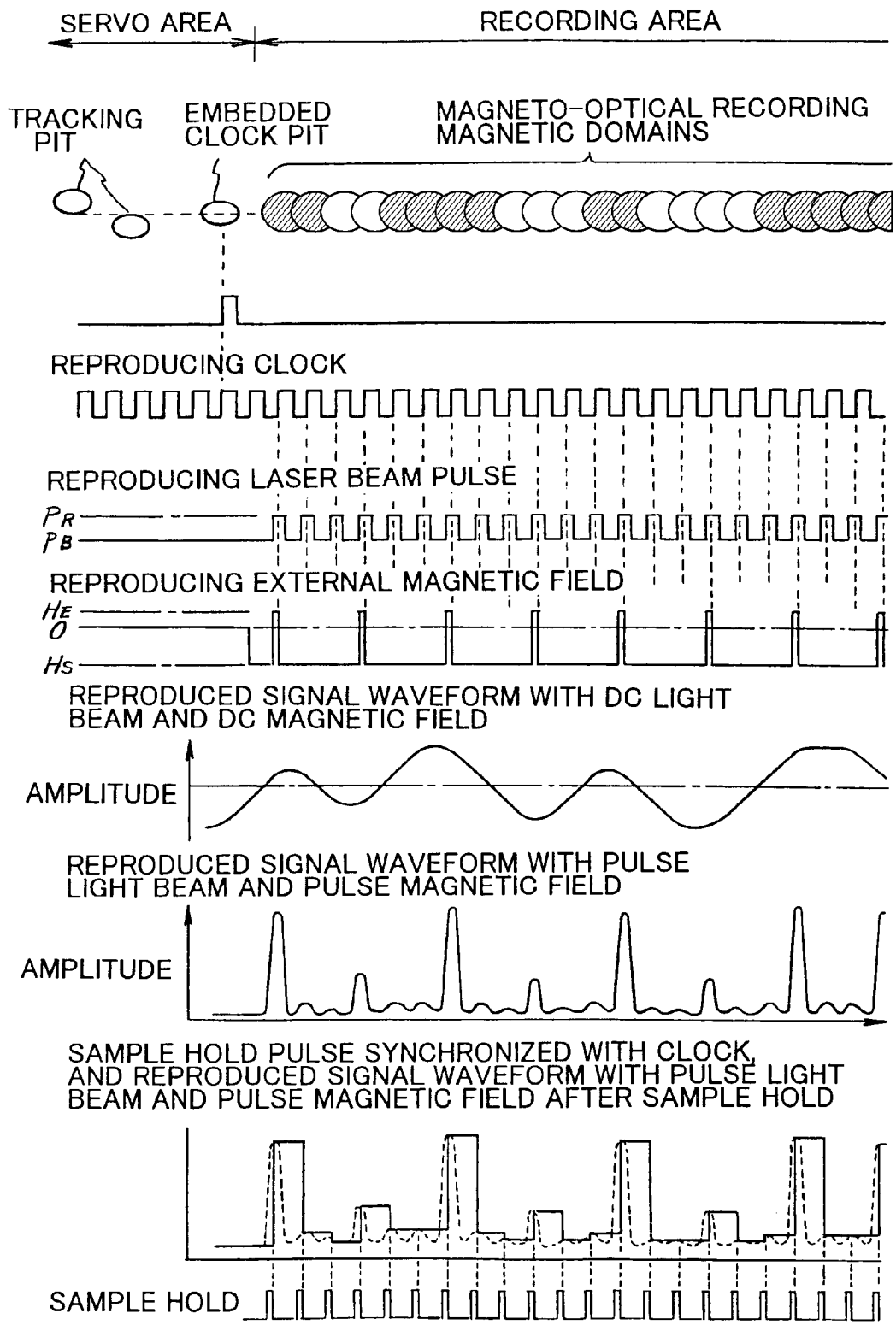
FIG. 5 illustrates the magneto-optical recording and reproducing method according to the present invention described in the third embodiment, which is different from FIGS. 3 and 4.
Figure 6:
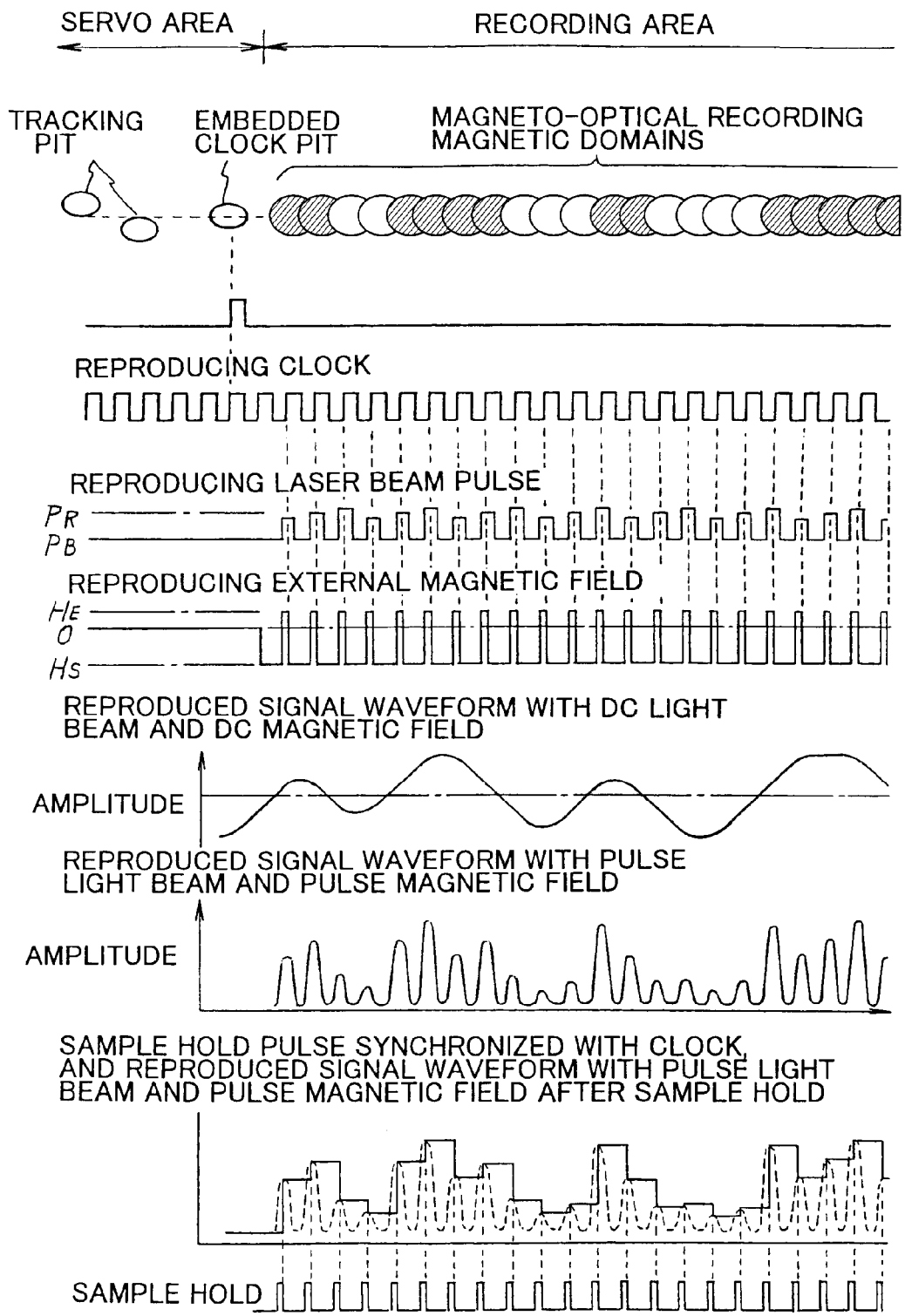
FIG. 6 illustrates the magneto-optical recording and reproducing method according to the present invention described in the third embodiment, which is different from FIGS. 3 to 5.
Figure 7:
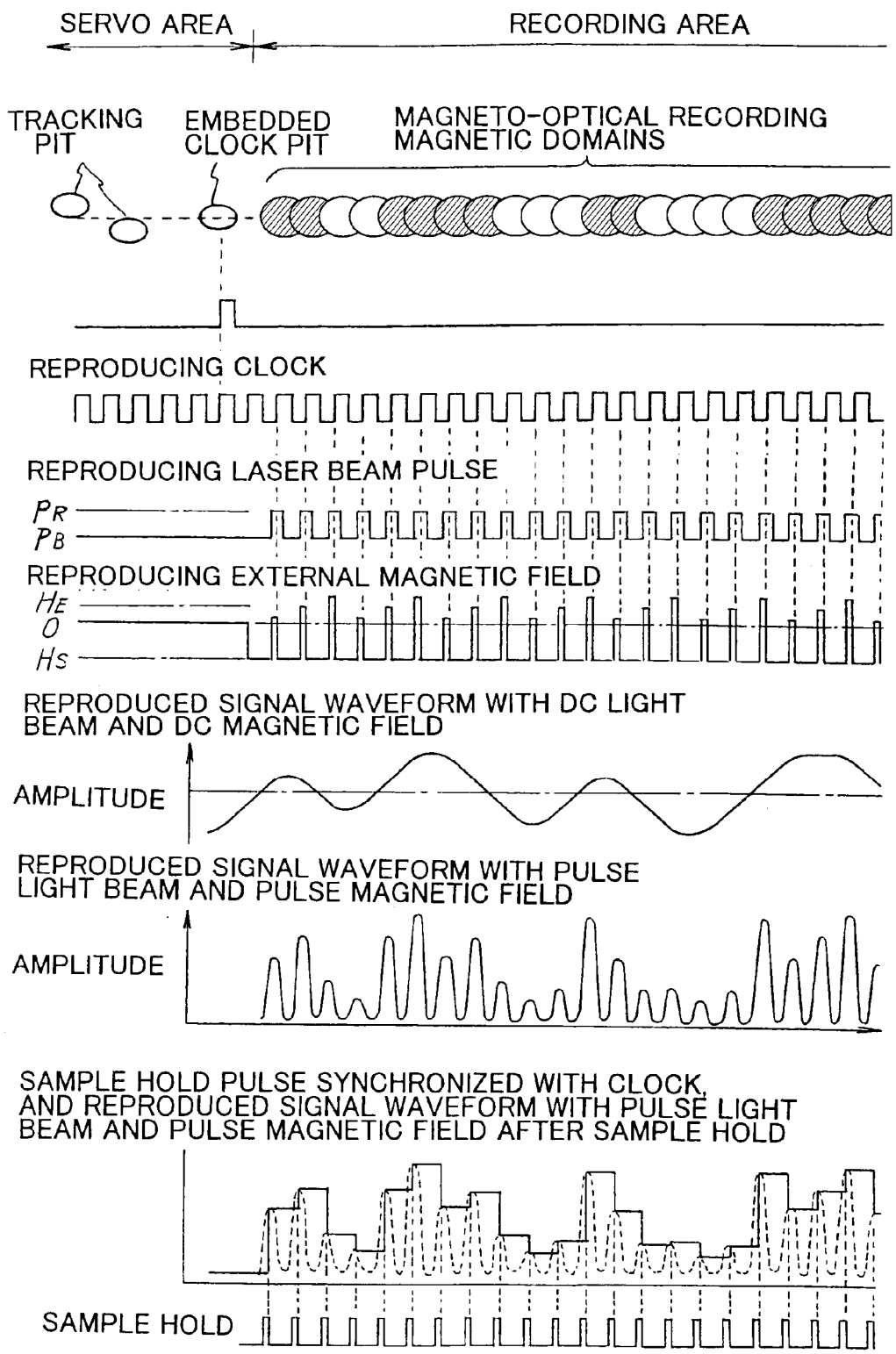
FIG. 7 illustrates the magneto-optical recording and reproducing method according to the present invention described in the third embodiment, which is different from FIGS. 3 to 6.

A reproducing condition shown in FIG. 3 is the same as the reproducing condition shown in FIG. 2 except that the reproducing light beam and the reproducing magnetic field were applied at the same cycle as that of the reproducing clock. In a reproducing condition shown in FIG. 4, the high power pulse is thinned out so that the pulse laser of the high power $P_H$ is radiated at every three cycles of the reproducing clock, as compared with FIG. 3, in which L(x) is different. In FIG. 5, the high pulse magnetic field $H_E$ is thinned out so that the high pulse magnetic field $H_E$ is radiated at every three cycles of the reproducing clock, as compared with FIG. 3, in which H(x) is different. In FIG. 6, the reproducing light beam pulse is given at multiple levels, as compared with FIG. 3, in which L(x) is different. In FIG. 7, the pulse magnetic field is given at multiple levels, as compared with FIG. 3, in which H(x) is different. The waveform of the reproduced signal, which is obtained when the pulse light beam and the pulse magnetic field are used, is different in each of the cases, because H(x) and L(x) are different as described above. FIGS. 3 to 7 show the reproduced signal waveform obtained when the DC light beam and the DC magnetic field are used respectively. It is understood that the reproduced signal, which reflects the magnetization of each of the recording magnetic domains, is not obtained even when the reproduction is performed by using the DC light beam and the DC magnetic field. In the case of the use of the DC light beam and the DC magnetic field, there is no difference in reproducing condition. Therefore, the reproduced signal is coincident throughout FIGS. 3 to 7.

As understood from this embodiment, it is possible to obtain different pieces of information depending on H(x) and/or L(x) even when the identical recording magnetic domain pattern (recorded information) on the magneto-optical recording medium is subjected to reproduction by using the reproducing magnetic field and the reproducing light beam. Those usable as the recording medium in this embodiment include, for example, the conventional magneto-optical recording medium, the recording medium capable of performing the magnetically induced super resolution, and the recording medium capable of magnifying the magnetic domain. It is preferable to use the recording medium capable of magnifying the magnetic domain, in the same manner as in the first embodiment.

Fourth Embodiment (1)

Those usable as the recording medium in the first to third embodiments include, for example, the conventional magneto-optical recording medium, the recording medium capable of performing the magnetically induced super resolution, and the recording medium capable of magnifying the magnetic domain. It is preferable to use the recording medium capable of magnifying the magnetic domain, in view of the fact that the large amplitude of the reproduced signal can be obtained even in the case of the minute magnetic domain. Explanation will be made below in the fourth embodiments (2) to (5) for examples of the magneto-optical recording medium capable of magnifying the magnetic domain in an especially preferred manner.

Fourth Embodiment (2)

FIG. 8 shows an exemplary structure of the magneto-optical recording medium capable of magnifying the magnetic domain. The recording medium of this embodiment comprises, on a transparent substrate, a dielectric layer 42, a magnifying reproducing layer 43, a non-magnetic layer 44, an information-recording layer 45, and a dielectric layer 46 which are successively stacked. The minute magnetic domain, which is recorded on the information-recording layer 45, is transferred to the magnifying reproducing layer 43. When the reproducing magnetic field is applied, the magnetic wall is moved in the magnifying reproducing layer 43. Thus, the reproduction can be performed based on the use of the magnification of the magnetic domain. That is, when the magnifying reproducing magnetic field is applied in the same direction as that of the magnetization of the minute magnetic domain in a state in which the minute magnetic domain is transferred from the information-recording layer 45 to the magnifying reproducing layer 43, the magnetic wall is moved in the direction to magnify the magnetic domain, because the coercive force of the magnetic wall is small in the magnifying reproducing layer 43. Thus, a magnified magnetic domain is formed. As a result, a magnified mark (the magnetic domain magnified in the magnifying reproducing layer 43) is observed in the reproducing light spot. The minute magnetic domain appears while being magnified on the surface of the magneto-optical recording medium as described above. Therefore, the reproduced signal, which has a sufficient intensity, is obtained from the magnified magnetic domain. When the reducing reproducing magnetic field is applied in a direction opposite to that of the magnifying reproducing magnetic field after the magnified magnetic domain in the information-recording layer 45 is subjected to the reproduction, the magnified magnetic domain in the magnifying reproducing layer 43 is reduced. The direction of magnetization is the same as the direction of the magnetic field of the reducing reproducing magnetic field. The reducing reproducing magnetic field and the magnifying reproducing magnetic field as described above can be applied by using an alternating magnetic field. A reproduced signal, which is subjected to amplification for each of the minute magnetic domains, can be obtained by synchronizing the cycle of the alternating magnetic field with the recording clock.

With reference to FIG. 8, a perpendicularly magnetizable film, in which the coercive force of the magnetic wall is smaller than the reproducing magnetic field when the reproducing light beam is irradiated, may be used for the magnifying reproducing layer 43. The magnifying reproducing layer 43 can be composed of, for example, a rare earth transition metal alloy such as GdFe, GdFeCo, and GdCo, an alloy or an alternately stacked material composed of a Pd or Pt layer and a Co layer, or a magnetic member of oxide of garnet. The magnifying reproducing layer 43 is preferably constructed such that its compensation temperature is −100 to 50° C. When the compensation temperature is within such a range, then the saturation magnetization (Ms) is small at a temperature in the vicinity of room temperature, and Ms is large only at a high temperature (the coercive force is increased in the vicinity of room temperature, and the coercive force is lowered at a high temperature). That is, Ms is increased only in the area of the magnifying reproducing layer 43 having a high temperature located at a central portion within the laser spot. Accordingly, only one recording magnetic domain, which is disposed in the information-recording layer existing under the high temperature area of the magnifying reproducing layer 43, is transferred to the reproducing layer. Only the transferred magnetic domain in the magnifying reproducing layer 43 can be magnified by using the reproducing magnetic field. Therefore, when the compensation temperature of the magnifying reproducing layer 43 is −100 to 50° C., the reproduction process based on the magnetic domain magnification is realized by using the simple structure.

The information-recording layer is required to have such a characteristic that the coercive force Hc is several times larger than the reproducing magnetic field even at the temperature at the center of the light spot during the reproduction. Those usable for the information-recording layer include, for example, TbFeCo, GdTbFeCo, DyFeCo, GdDyFeCo, GdDyTbFeCo and/or rare earth transition metal alloys added with non-magnetic element such as Cr and Ti as additive element, Pt—Co alloys, Pt/Co multi-layered films, and garnet materials. The thickness (h) of the information-recording layer preferably satisfies $(h/r) \geq 0.5$ with respect to the radius (r) of the minimum magnetic domain recorded in the information-recording layer, in order to easily control the magnification and the reduction of the magnetic domain in the magnifying reproducing layer 43. By doing so, it is possible to reliably transfer the magnetic domain by the aid of the leak magnetic field directed from the information-recording layer to the magnifying reproducing layer 43. Moreover, it is possible to obtain a relatively flat distribution in the in-plane direction of the layer of the leak magnetic field. Accordingly, it is easily control the magnification and the reduction of the magnetic domain in the magnifying reproducing layer 43.

The non-magnetic layer 43 can be inserted between the information-recording layer and the magnifying reproducing layer 43. Those usable as a material for the non-magnetic layer 44 include dielectrics such as $SiO_2$, AlN, and SiN, metals such as Al, AlTi, Au, Ag, Cu, AuAl, and AgAl, or structures composed of stacked dielectrics and metals. When the non-magnetic layer 44 exists between the magnifying reproducing layer 43 and the information-recording layer 45, it is advantageous that the magnetic domain, which is transferred to the magnifying reproducing layer 43, is smoothly magnified and reduced by the aid of the reproducing magnetic field. The magnetic domain in the information-recording layer 45 is magnetostatically transferred to the magnifying reproducing layer 43 by the aid of the leak magnetic field from the information-recording layer. The non-magnetic layer 44 may be composed of a single-layered or multi-layered film. If the exchange coupling force between the information-recording layer and the magnifying reproducing layer 43 can be controlled to be weak, it is not necessarily indispensable that the non-magnetic layer 44 is inserted between the information-recording layer and the magnifying reproducing layer 43.

The dielectric layer 42, 46 may be composed of, for example, an nitride or an oxide. The apparent Kerr rotation angle can be increased by the aid of the interference effect of the reproducing light beam in the dielectric layer. In addition to the layers shown in FIG. 8, for example, it is allowable to form a metal reflective layer composed of, for example, an Al alloy, an Au alloy, a silver alloy, or a copper alloy on the side of the magnifying reproducing layer 43 on the non-magnetic layer 44 (or as a part of the non-magnetic layer 44) in order to obtain uniform temperature distribution over the magnifying reproducing layer 43. If the track center of the magnifying reproducing layer 43 has a temperature higher than those of outer portions thereof when the reproducing magnetic field is applied, the inversion tends to be caused by the reproducing magnetic field even in the area which does not correspond to the magnetic domain recorded in the information-recording layer. Accordingly, the metal reflective layer is provided to release the heat. Thus, it is possible to avoid the situation in which only the track center has a high temperature, and it is possible to avoid the inversion of magnetic domains at unnecessary portions of the reproducing layer when the reproducing magnetic field is applied.

In the case of the structure shown in FIG. 8, it is preferable that the compensation temperature of the magnifying reproducing layer 43 or the information-recording layer 45 is adjusted to be −100 to 50° C. For example, the rare earth transition metal is used as the magnetic material for the information-recording layer 45, and the compensation temperature is −100 to 50° C. in the same manner as in the magnifying reproducing layer 43 so that the leak magnetic field is increased only at the high temperature portion. Thus, the reproduction has been successfully performed such that the amplitude of the reproduced signal from a magnetic domain of 0.3 micron is magnified three times.

Materials for the magneto-optical recording medium shown in FIG. 8 will be specifically explained. A polycarbonate substrate having a thickness of 1.2 mm was used for the transparent substrate 41. A nitride film having a film thickness of 70 nm was used for the dielectric layers 42, 46. A GdFeCo alloy having a film thickness of 20 nm, a compensation temperature of −10° C., and a Curie temperature of 350° C. was used for the magnifying reproducing layer 43. A nitride film having a film thickness of 15 nm and an Al alloy having a film thickness of 10 nm were used for the non-magnetic layer 44. A TbFeCo alloy film having a film thickness of 200 nm, a compensation temperature of −50° C., and a Curie temperature of 270° C. was used for the information-recording layer 45. These layers were formed as films respectively by means of sputtering by using a magnetron sputtering apparatus.

Figure 11A:
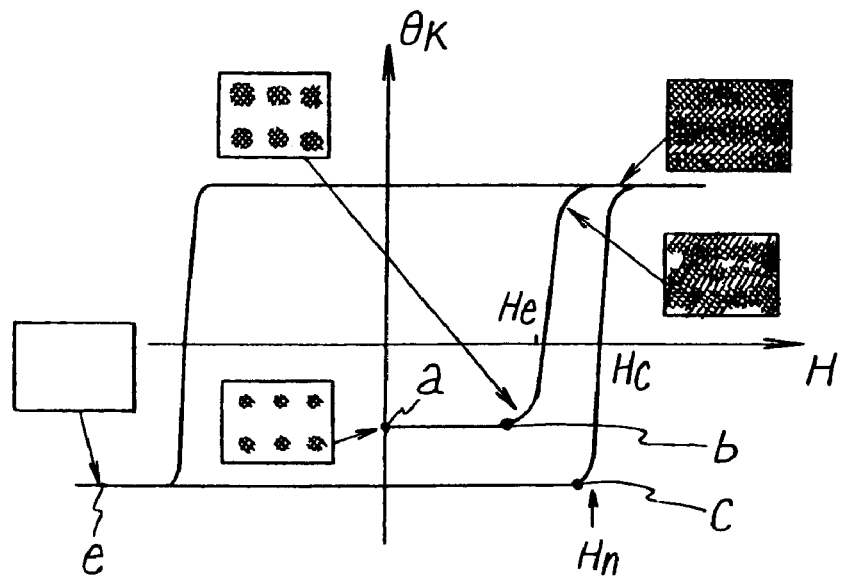
FIGS. 11A and B conceptually illustrate the magnetic characteristic of the recording medium shown in FIG. 8, respectively.

Next, explanation will be made with reference to FIG. for the relationship between the magnetic characteristic of, the recording medium and the magnitudes of $H_{fx}$ and $H_{ch}$ to be applied as the external magnetic fields as described in the first embodiment, when the magneto-optical recording medium capable of magnifying the magnetic domain as shown in FIG. 8 is used as described in the first embodiment. FIG. 11 shows the magnitude of the external magnetic field applied during the reproduction, the relationship between the magnetic field and the size of the mark which appears on the magnifying reproducing layer 43, and the hysteresis curve. At first, explanation will be made by using a hysteresis curve shown in FIG. 11(a). The hysteresis curve shown in FIG. 11(a) illustrates the change in Kerr rotation angle $\theta_k$ of the magnifying reproducing layer 43 with respect to the magnetic field H. However, the hysteresis curve is illustrative of a hysteresis curve of the magnifying reproducing layer 43 in a state in which the magneto-optical recording medium capable of magnifying the magnetic domain is irradiated with the reproducing light beam so that the recording magnetic domains in the underlying information-recording layer 45 are transferred. Since the recording magnetic domains in the information-recording layer 45 have been already transferred, a predetermined Kerr rotation angle $\theta$ is given even when the magnetic field H is zero (Point "a" in the drawing). The magnetic field H, which has the same polarity as the polarity of the magnetization of the recording magnetic domain, is gradually applied. When the magnetic field H passes over the initial point of inflection "b" on the initial magnetization curve, the Kerr rotation angle $\theta$ rises, because of the following reason. That is, the magnetic wall of the magnifying reproducing layer 43 is moved outwardly from the center of the magnetic domain depending on the magnitude of the magnetic field H, and thus the magnetic domain is magnified in the layer. After passage over the second point of inflection on the initial magnetization curve, the Kerr rotation angle $\theta$ is not increased any more due to the saturation of magnetization. FIG. 11(a) also shows conceptual drawings of microphotographs of magnetic domain patterns depicting the magnifying reproducing layer 43 as viewed from an upper position at the respective points of inflection including "a" and "b" on the initial magnetization curve of the hysteresis curve. The magnetic domain pattern (solid circle pattern) obtained at Point "a" represents the magnetic domains obtained by transferring the magnetic domains (seed magnetic domains) in the information-recording layer 45 to the magnifying reproducing layer 43 in accordance with the irradiation with the reproducing light beam. The situation starting from this state, in which the magnetic domains are magnified in accordance with the increase in magnetic field on the initial magnetization curve, can be seen from the patterns corresponding to the respective points. When the Kerr rotation angle $\theta$ is saturated, the magnetic domains are inverted over the entire surface of the magnifying reproducing layer 43.

In relation to the hysteresis curve shown in FIG. 11(a), the magnetic field at the point of inflection "c", which is obtained after the initial magnetization curve is once saturated and which has the same polarity as that of the magnetic field applied in the direction to magnify the magnetization of the magnifying reproducing layer 43, is called "new creation magnetic field". The absolute value of the new creation magnetic field is represented by Hn. The magnetic field, which is obtained at the initial point of inflection "b" on the initial magnetization curve obtained by applying the magnetic field in the direction to widen the recording magnetic domain in the magnifying reproducing layer 43 transferred from the information-recording layer 45, is called "magnetic wall-magnifying magnetic field". The absolute value of the magnetic wall-magnifying magnetic field is represented by He. On this assumption, it is desirable that the reproducing magnetic field is applied so that its absolute value Hr is within a range of He<Hr<Hn, because of the following reason. That is, if Hr is smaller than He, the recording magnetic domain transferred to the magnifying reproducing layer 43 is not magnified. If Hr is larger than Hn, even when the recording magnetic domain (seed magnetic domain) does not exist in the information-recording layer 18, then the magnetic domain in the magnifying reproducing layer 43 disposed thereover is inverted, and the magnetic domain is read as a signal.

Figure 11B:
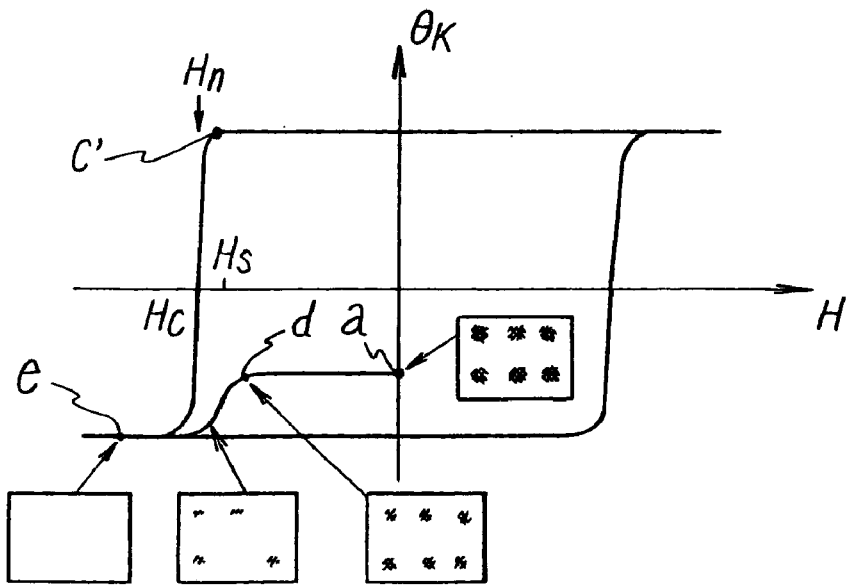

FIG. 11(b) represents an initial magnetization curve obtained when the magnetic field is applied in the direction to reduce the magnetic domains in the magnifying reproducing layer 43 transferred from the information-recording layer 45 as depicted in the hysteresis curve shown in FIG. 11(a). The magnetic field at the point of inflection "c'", which is obtained after the initial magnetization curve is once saturated and which has the same polarity as that of the initial magnetization curve as described above, is called "new creation magnetic field". The absolute value of the new creation magnetic field is represented by Hn. The magnetic field, which is obtained at the initial point of inflection "d" on the initial magnetization curve, is called "magnetic wall-reducing magnetic field". The absolute value of the magnetic wall-reducing magnetic field is represented by Hs. On this assumption, when the reproducing magnetic field Hr is applied within a range of Hs<Hr<Hn because of the same reason as described above concerning FIG. 11(a), there is no obstruction when the next magnetic domain in the information-recording layer 45 is reproduced. FIG. 11(b) also shows conceptual drawings of microphotographs of magnetic domain patterns depicting the magnifying reproducing layer 43 as viewed from an upper position at the respective points of inflection including "a" and "d" on the initial magnetization curve of the hysteresis curve. At Point "e", the recording magnetic domain, which is transferred to the magnifying reproducing layer 43, completely disappears, because the magnetic field in the reducing direction is too large. Therefore, when it is intended to reliably erase the recording magnetization, it is appropriate to adjust the magnetic field to satisfy Hs<Hn<Hr.

As described above, the minute magnetic domains in the information-recording layer 45 can be transferred to the magnifying reproducing layer 43, and they can be detected (reproduced) by magnifying them with the reproducing magnetic field. Therefore, the minute magnetic domains, which are formed in accordance with the optical magnetic field modulation method, can be reproduced with a high resolving power and at high S/N. In the first embodiment, the external magnetic fields of $H_{fx}$ and $H_{ch}$ are applied. However, they have the following relationships with respect to Hn, He, and Hs. That is, there is given He<$H_{ch}$<Hc.

In order to reproduce "0" as reproduced information, $H_{fx}$ may be not more than Hn, irrelevant to the fact that "0" is recorded on the recording magnetic domain, or "1" is recorded thereon. When $H_{fx}$ is not more than Hn, the transferred magnetic domain is completely erased even if "1" is recorded on the magnetic domain. In this case, the reproduced signal is completely identical, irrelevant to the fact that "1" is recorded on the recording magnetic domain, or "0" is recorded thereon.

Fourth Embodiment (3)

In the fourth embodiment (2), the simple structure comprising the magnifying reproducing layer 43 and the information-recording layer 45 has been successfully used to transfer the minute magnetic domains from the information-recording layer 45 to the magnifying reproducing layer 43 and magnify and reduce the transferred magnetic domains. This embodiment is illustrative of a magneto-optical recording medium provided with a gate layer 47 which makes it possible to select only one of a plurality of magnetic domains in an information-recording layer 50 existing in the reproducing light spot.

As shown in FIG. 9, the recording medium of this embodiment has a structure in which the information-recording layer 45 of the recording medium concerning the fourth embodiment (2) is replaced with a gate layer 47+exchange coupling force control layers 48, 49+an information-recording layer 50. The description in the fourth embodiment (2) equivalently holds true for the magneto-optical recording medium of this embodiment, concerning the materials for the transparent substrate 41, the dielectric layer 42, the magnifying reproducing layer 43, the non-magnetic layer 44, the information-recording layer 50, and the dielectric layer 46.

When the reproduction is performed by using the recording medium of this embodiment, at first, the initializing magnetic field is applied. The coercive force of the gate layer 47 at room temperature is smaller than the initializing magnetic field. Therefore, all of the magnetic domains recorded on the gate layer 47 are inverted, and they are directed in the direction of the initializing magnetic field. On the other hand, the coercive force of the information-recording layer 50 is extremely larger than the coercive force of the gate layer 47. Therefore, the magnetization of the recording magnetic domains in the information-recording layer 50 is maintained as it is. After the gate layer 47 is initialized, the recording medium of this embodiment is irradiated with the reproducing light beam to perform the reproduction. The reproducing light beam, which has a power lower than that of the recording light beam, is radiated during the reproduction. The area, which is deviated rearwardly from the spot center in the traveling direction, is heated to a higher temperature, in the same manner as effected by using the recording light beam. The coercive force of the gate layer 47 is lowered in the area which is heated to the high temperature. Accordingly a certain magnetic domain in the information-recording layer 50 is transferred to the gate layer 47 via the exchange coupling force control layers 48, 49 by the aid of the exchange coupling force between the information-recording layer 50 and the gate layer 47. Further, the magnetic domain is also transferred to the magnifying reproducing layer 43. On the other hand, the other recording magnetic domains in the information-recording layer 50 are not transferred to the gate layer 47, because the area of the corresponding gate layer 47 has a relatively low temperature, and its coercive force is not lowered. Therefore, when the recording medium of this embodiment is magnified and viewed from an upward position, the recording magnetic domain in the information-recording layer 50 appears as a recording mark on the gate layer 47, and it further appears on the magnifying reproducing layer 43, because only the area, which has arrived at the high temperature within the laser spot, has the lowered magnetic energy. This process is described with reference to FIG. 10(a). That is, this process corresponds to a process in which the minute magnetic domain 313b in the information-recording layer 50 is transferred to the gate layer 47 via the exchange coupling force control layers 48, 49 by the aid of the exchange coupling force between the information-recording layer 50 and the gate layer 47, and it is further transferred to the magnifying reproducing layer 43. However, in FIG. 10, the exchange coupling force control layers 48, 49 are collectively depicted as one layer. Actually, even one layer of the exchange coupling force control layer may be available provided that the exchange coupling force between the information-recording layer 50 and the gate layer 47 can be controlled as desired. On the other hand, in the area of the minute magnetic domain 313a shown in FIG. 10(a), the gate layer 47 prohibits the transfer of the magnetic domain from the information-recording layer 50 to the magnifying reproducing layer 43. In other words, only one minute magnetic domain of the plurality of minute magnetic domains existing within the spot size can be independently transferred from the information-recording layer 50 to the magnifying reproducing layer 43 by radiating the reproducing light beam.

One minute magnetic domain, which has been selected by using the gate layer 47 as described above, can be transferred to the magnifying reproducing layer 43, and it can be further magnified within the reproducing laser spot. This process is effected in the magnifying reproducing layer 43 of the recording medium concerning this embodiment, the principle of which will be explained with reference to FIG. 10(a). It is noted that the magnifying reproducing layer 43 is a magnetic layer to which the minute magnetic domain is transferred from the gate layer 47, wherein the transferred magnetic domain can be magnified by using the reproducing magnetic field. The magnifying reproducing layer 43 is a perpendicularly magnetizable film having a magnetic wall coercive force which is smaller than the reproducing magnetic field upon being irradiated with the reproducing light beam so that the magnetic wall is moved by applying the reproducing magnetic field to make it possible to magnify the magnetic domain. When the magnifying and reproducing magnetic field 411 is applied in the same direction as that of the magnetization of the minute magnetic domain 313b in a state in which the minute magnetic domain 313b is transferred from the information-recording layer 50 to the gate layer 47 and the magnifying reproducing layer 43, the magnetic wall is moved in the direction to magnify the magnetic domain, because the magnetic wall coercive force is small in the magnifying reproducing layer 43. Thus, the magnified magnetic domain 419 is formed. As a result, as shown in a lower portion in FIG. 10(a), it is possible to observe the mark 413 (the magnetic domain 419 magnified in the magnifying reproducing layer 43) within the reproducing spot 311. The minute magnetic domain appears on the surface of the magneto-optical recording medium after being magnified as described above. Therefore, it is possible to obtain the reproduced signal having a sufficient intensity from the magnetic domain magnified as described above.

When the reducing reproducing magnetic field 415 is applied in a direction opposite to the magnifying reproducing magnetic field 411 as shown in FIG. 10(b) after the magnified magnetic domain 419 in the magnifying reproducing layer 43 is reproduced, the magnified magnetic domain 419 in the magnifying reproducing layer 43 is reduced, giving the same direction of magnetization as that of the magnetic field of the reducing reproducing magnetic field 415. The reducing reproducing magnetic field 415 and the magnifying reproducing magnetic field 411 can be applied by using an alternating magnetic field. The amplified reproduced signal can be obtained for each of the minute magnetic domains by synchronizing the cycle of the alternating magnetic field with the recording clock.

Materials and other features for the magneto-optical recording medium shown in FIG. 9 will be specifically explained. A GdFeCo magnetic layer having a film thickness of 100 nm, which had a compensation temperature of −50° C. and a Curie temperature of 350° C., was used for the gate layer 47. A TbFeCo magnetic layer having a film thickness of 20 nm, which had a compensation temperature of −80° C. and a Curie temperature of 160° C., was used for the first exchange coupling force control layer 48. A GdFeCo magnetic layer having a film thickness of 10 nm, which had a compensation temperature of 90° C. and a Curie temperature of 200° C., was used for the second exchange coupling force control layer 49. A TbFeCo magnetic layer having a film thickness of 70 nm, which had a compensation temperature of −50° C. and a Curie temperature of 270° C., was used for the information-recording layer 50. The first exchange coupling force control layer 48 is a layer for controlling the transfer to the gate layer 47, of the magnetic domain in the information-recording layer 50 in an area at a temperature of not less than 70° C. The second exchange coupling force control layer 49 is a layer for controlling the transfer to the gate layer 47, of the magnetic domain in the information-recording layer 50 in an area at a temperature of not more than 160° C. The structure as described above makes it possible to transfer, to the magnifying reproducing layer 43, the recording magnetic domain in the information-recording layer 50 within a temperature range of not less than 70° C. and not more than 160° C. These layers were formed as films by using the magnetron sputtering apparatus in the same manner as in the fourth embodiment (2).

The recording medium of this embodiment has the gate layer 47. Therefore, even when a plurality of magnetic domains exist in the information-recording layer, only one magnetic domain can be allowed to emerge on (can be transferred to) the gate layer 47. Further, the one minute magnetic domain, which has been transferred to the gate layer 47, can be transferred to the magnifying reproducing layer 43, and it can be detected (reproduced) by magnifying it with the reproducing magnetic field. Therefore, the minute magnetic domains, which have been formed in accordance with the optical magnetic field modulation method, can be reproduced with a high resolving power and at high S/N.

There are several methods for transferring, to the gate layer, only one magnetic domain of the plurality of magnetic domains in the information-recording layer irradiated with the reproducing laser beam spot. That is, there are (1) a method in which the transfer to the gate layer is performed for the magnetic domains in the information-recording layer in an area having a temperature higher than a predetermined temperature concerning the temperature distributions in the gate layer and the information-recording layer within the reproducing laser beam spot, (2) a method in which the transfer to the gate layer is performed for the magnetic domains in the information-recording layer in an area having a temperature lower than a predetermined temperature concerning the temperature distributions in the gate layer and the information-recording layer within the reproducing laser beam spot, and (3) a method in which the transfer to the gate layer is performed for the magnetic domains in the information-recording layer in an area having a temperature within a predetermined temperature range concerning the temperature distributions in the gate layer and the information-recording layer within the reproducing laser beam spot.

The method (1) has been explained with reference to FIG. 10 concerning the explanation of the principle of this embodiment. This method is based on the fact that the coercive force is lowered only in the high temperature area in the gate layer 47 irradiated with the reproducing laser beam spot, and only such an area undergoes the exchange coupling force from the information-recording layer. That is, the magnetic domain transfer occurs from the information-recording layer 50 to the gate layer 47 only in the temperature area in which the coercive force of the gate layer 47 is smaller than the exchange coupling force exerted by the information-recording layer. In the case of the method (2), the coercive force is lowered in the high temperature area of the gate layer irradiated with the reproducing laser beam spot in the same manner as in the method (1). All of the magnetization of the high temperature area is aligned with the external magnetic field under the external magnetic field applied for the magnifying reproduction process. On the other hand, in the low temperature area, the magnetic domain in the information-recording layer is transferred to the gate layer by the aid of the exchange coupling force of the information-recording layer and the gate layer. In the case of the film structure of this type, it is preferable to provide an intermediate layer between the gate layer and the information-recording layer. For example, it is possible to use Gd—Fe—Co (gate layer)/Tb—Fe—Co—Al (intermediate layer)/Tb—Fe—Co (information-recording layer). The method (3) is successfully carried out by stacking the gate layers which exhibit the foregoing characteristics (1) and (2). For example, a magnetic layer, in which the magnetic domain in the information-recording layer is transferred only in the high temperature area, is provided as an upper layer, and a magnetic layer, in which the magnetic domain in the information-recording layer is transferred only in the low temperature area, is provided as a lower layer. Even when the stacked structure is not adopted, a single magnetic layer can be used to construct a magnetic layer in which the magnetic domain in the information-recording layer is transferred only within the predetermined temperature range. For example, in the case of the use a magnetic member in which the compensation temperature Tcom exists in the vicinity of room temperature and the magnetization-easy axis is directed in the in-plane direction of the film at a predetermined temperature Tcr, the transfer from the information-recording layer occurs only at a temperature of (Tcom+ΔT) to Tcr higher than the compensation temperature to some extent depending on the magnetic material.

In general, the Curie temperature of the information-recording layer is usually about 250° C., considering the power of the semiconductor laser which is available as a product. Therefore, the upper limit of the temperature of the recording film subjected to the increase in temperature effected by the reproducing light spot is about 170° C., because of the following reason. That is, if the temperature is higher than the above, there is a possibility that the recording magnetic domain is changed, because the coercive force of the information-recording layer is small. Therefore, in the case of the method (2) described above, it is preferable that the respective magnetic layers are designed so that the magnetic domain in the information-recording layer 50 in an area having a temperature lower than 170° C. is transferred to the gate layer 47. In general, the internal temperature of the magneto-optical recording and reproducing apparatus is about 50° C. Accordingly, at least a difference of 30° C. is required to obtain a certain difference from the critical temperature in the method (1) for distinguishing only one magnetic domain of the information-recording layer 50 by using the gate layer 47. Therefore, in the case of the method (1), it is preferable that the respective magnetic layers are designed so that the magnetic domain in the information-recording layer 50 in the high temperature area at 80° C. or more is transferred to the gate layer 47. Because of the same reason as described above, in the case of the method (3), it is preferable that the respective magnetic layers are designed so that the magnetic domain in the information-recording layer 50 is transferred to the gate layer 47 in a temperature range of 80° C. to 170° C.

The information-recording layer 50 is generally required to have a characteristic that the coercive force Hc is several times larger than the reproducing magnetic field even at the temperature at the center of the light spot during the reproduction, in the same manner as in the information-recording layer 45 described in the fourth embodiment (2). Those usable for the information-recording layer 50 include, for example, TbFeCo, GdTbFeCo, DyFeCo, GdDyFeCo, GdDyTbFeCo and/or rare earth transition metal alloys added with non-magnetic element such as Cr and Ti as additive element, Pt—Co alloys, Pt/Co multi-layered films, and garnet materials. In general, it is necessary that the coercive force Hc of the gate layer 47 is fairly smaller than that of the information-recording layer. Those usable for the gate layer 47 include, for example, rare earth transition metal alloys such as GdFeCo, GdFe, and GdW, Pd—Co alloys, Pt—Co alloys, Pd/Co multi-layered films, Pt/Co multi-layered films, and garnet. In order to easily control the magnification and the reduction of the magnetic domain in the magnifying reproducing layer 43, it is preferable that the thickness (h) of the gate layer+the exchange coupling force control layer+the information-recording layer satisfies (h/r)≧0.5 with respect to the radius (r) of the minimum magnetic domain recorded on the information-recording layer. By doing so, it is possible to reliably transfer the magnetic domain effected by the leak magnetic field directed from the information-recording layer to the magnifying reproducing layer 43, and obtain relatively flat distribution of the layer of the leak magnetic field in the in-plane direction. Therefore, it is possible to easily control the magnification and the reduction of the magnetic domain in the magnifying reproducing layer 43.

As shown in FIG. 9, the magneto-optical recording medium of this embodiment may comprise the non-magnetic layer 44 inserted between the gate layer 47 and the magnifying reproducing layer 43. Materials equivalent to those used in the fourth embodiment (2) can be used for materials of the non-magnetic layer 44. The existence of the non-magnetic layer 44 between the magnifying reproducing layer 43 and the gate layer 47 or the information-recording layer 50 is advantageous in that the magnetic domain transferred to the magnifying reproducing layer 43 is smoothly magnified and reduced by the aid of the reproducing magnetic field. The magnetic domain in the information-recording layer 50 is magnetostatically transferred via the gate layer 47 to the magnifying reproducing layer 43 by the aid of the leak magnetic field from the gate layer+the exchange coupling force control layer+the information-recording layer. The non-magnetic layer 44 may be composed of a single layer or a multi-layered film. When the non-magnetic layer 44 exists between the magnifying reproducing layer 43 and the gate layer 47 of the magneto-optical recording medium according to the present invention, the magnetic domain is transferred in accordance with the magnetostatic coupling between the magnifying reproducing layer 43 and the combined magnetic field of the leak magnetic fields of the magnetic domain written into the information-recording layer 50 and the magnetic domain transferred to the gate layer 47. When the non-magnetic layer 44 does not exist, the magnetic domain, which has been transferred from the information-recording layer 50 to the gate layer 47 by the aid of the exchange coupling magnetic field of the gate layer 47 and the magnifying reproducing layer 43, is magnetically transferred to the magnifying reproducing layer 43.

Fourth Embodiment (4)

Figure 12:
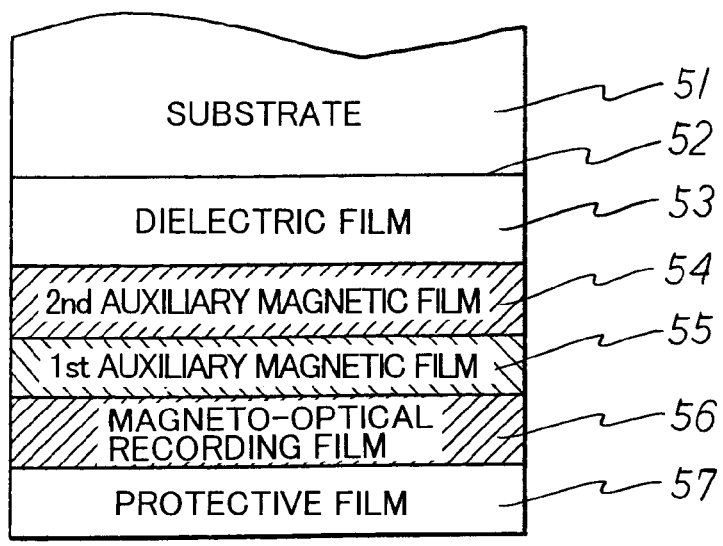
FIG. 12 exemplarily shows a representative structure of a recording medium preferably used in the present invention.
Figure 13A:
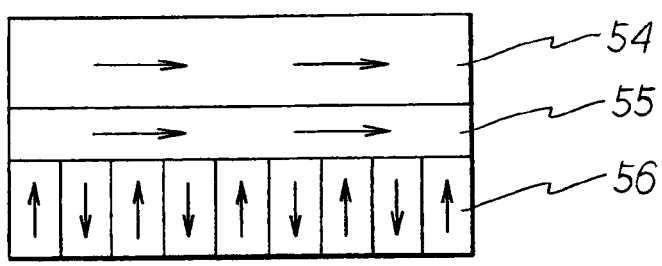
FIGS. 13A and B conceptually illustrate the magnetic characteristic of the recording medium described in a fourth embodiment (4) and shown in FIG. 12, respectively.
Figure 13B:
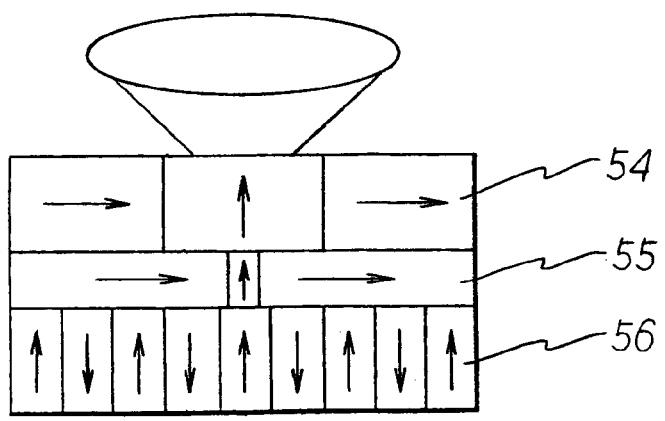
Figure 14:
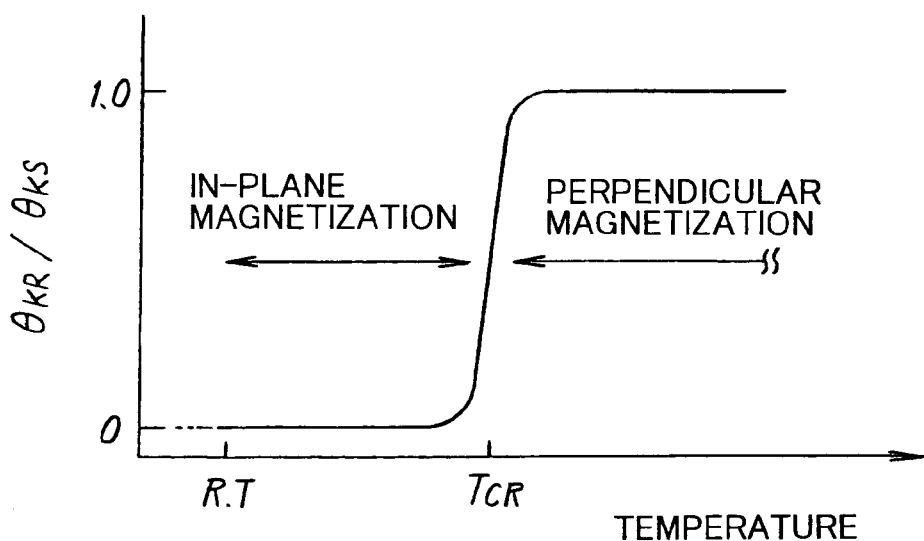
FIG. 14 conceptually illustrates the magnetic characteristic of the recording medium described in the fourth embodiment (4) and shown in FIG. 12, which is different from FIG. 13.

A recording medium concerning this embodiment is a medium comprising two layers of auxiliary magnetic films and one layer of magneto-optical recording film. As shown in FIG. 12, a second auxiliary magnetic film 54, a first auxiliary magnetic film 55, and a magneto-optical recording film 56 are stacked successively from the side to be irradiated with the laser beam. Each of the first auxiliary magnetic film 55 and the second auxiliary magnetic film 54 has such a magnetic characteristic as shown in FIGS. 13 and 14 that the film behaves as an in-plane magnetizable film at a temperature from room temperature to a certain critical temperature ($T_{cr}$) which is not less than room temperature, and the film behaves as a perpendicularly magnetizable film at a temperature which is not less than $T_{cr}$. The magneto-optical recording film 56 behaves as a perpendicularly magnetizable film at a temperature which is not less than room temperature. Assuming that the Curie temperatures of the magneto-optical recording film 56, the first auxiliary magnetic film 55, and the second auxiliary magnetic film 54 are $T_{co}$, $T_{c1}$, and $T_{c2}$ respectively, and $T_{cr}$'s of the first auxiliary magnetic film 55 and the second auxiliary magnetic film 54 are $T_{cr1}$ and $T_{cr2}$ respectively, the magnetic characteristics of the respective magnetic films are adjusted to satisfy room temperature$<T_{cr2}<T_{cr1}<T_{co}$, $T_{c1}$, $T_{c2}$.

Fourth Embodiment (5)

Figure 15:
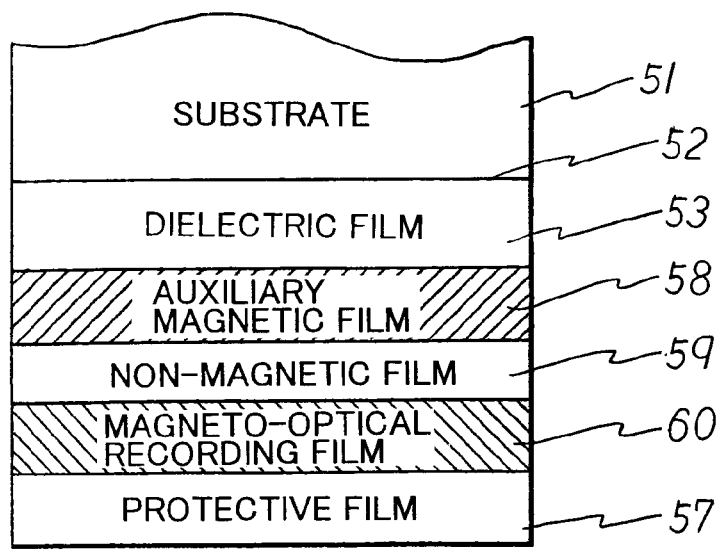
FIG. 15 exemplarily shows a representative structure of a recording medium preferably used in a fourth embodiment (5) and in the present invention.
Figure 16A:
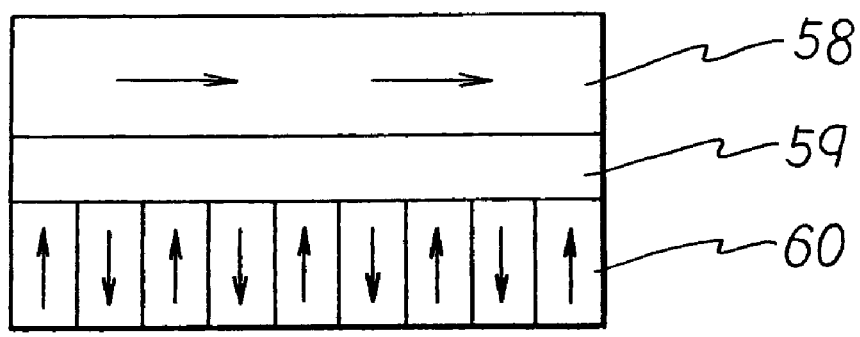
FIGS. 16A and B conceptually illustrate the magnetic characteristic of the recording medium described in the fourth embodiment (5) and shown in FIG. 15, respectively.
Figure 16B:
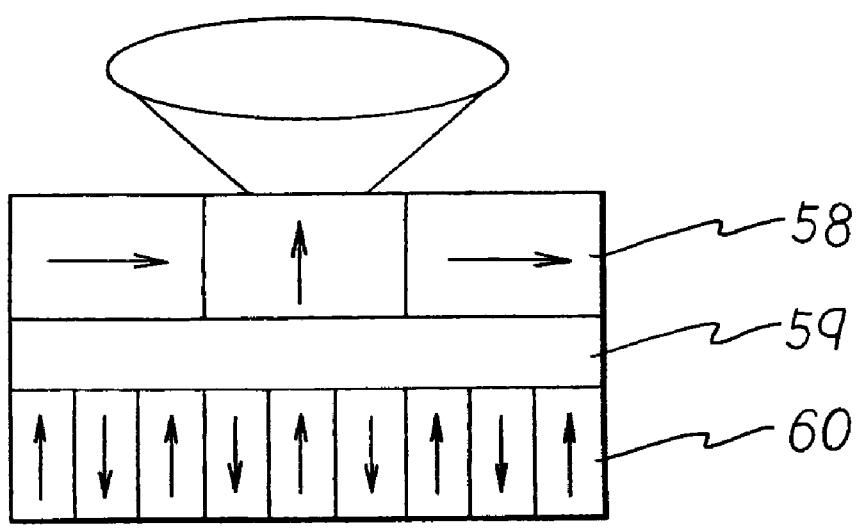

A recording medium concerning this embodiment is a medium comprising one layer of auxiliary magnetic film, one layer of magneto-optical recording film, and one layer of non-magnetic film. As shown in FIG. 15, an auxiliary magnetic film 58, a non-magnetic film 59, and a magneto-optical recording film 60 are stacked successively from the slide to be irradiated with the laser beam. Each of the auxiliary magnetic film 58 and the magneto-optical recording film 60 has a magnetic characteristic similar to those of the recording medium as constructed in the fourth embodiment (4), and each of them behaves as shown in FIG. 16. Assuming that the Curie temperatures of the magneto-optical recording film 60 and the auxiliary magnetic film 58 are $T_{co}$ and $T_{c1}$ respectively, and $T_{cr}$ of the auxiliary magnetic film 58 is $T_{cr3}$, the magnetic characteristics of the respective magnetic films are adjusted to satisfy room temperature$<T_{cr3}<T_{co}$, $T_{c1}$.

The recording media capable of magnifying the magnetic domain have been described in the foregoing forth embodiments (2) to (5). The present invention is also directed to the use of the recording medium in which different pieces of information are recorded on a plurality of recording layers of the recording medium.

Fifth Embodiment

Examples of the arrangement of the recording and reproducing apparatus according to the present invention will be explained.

Figure 17:
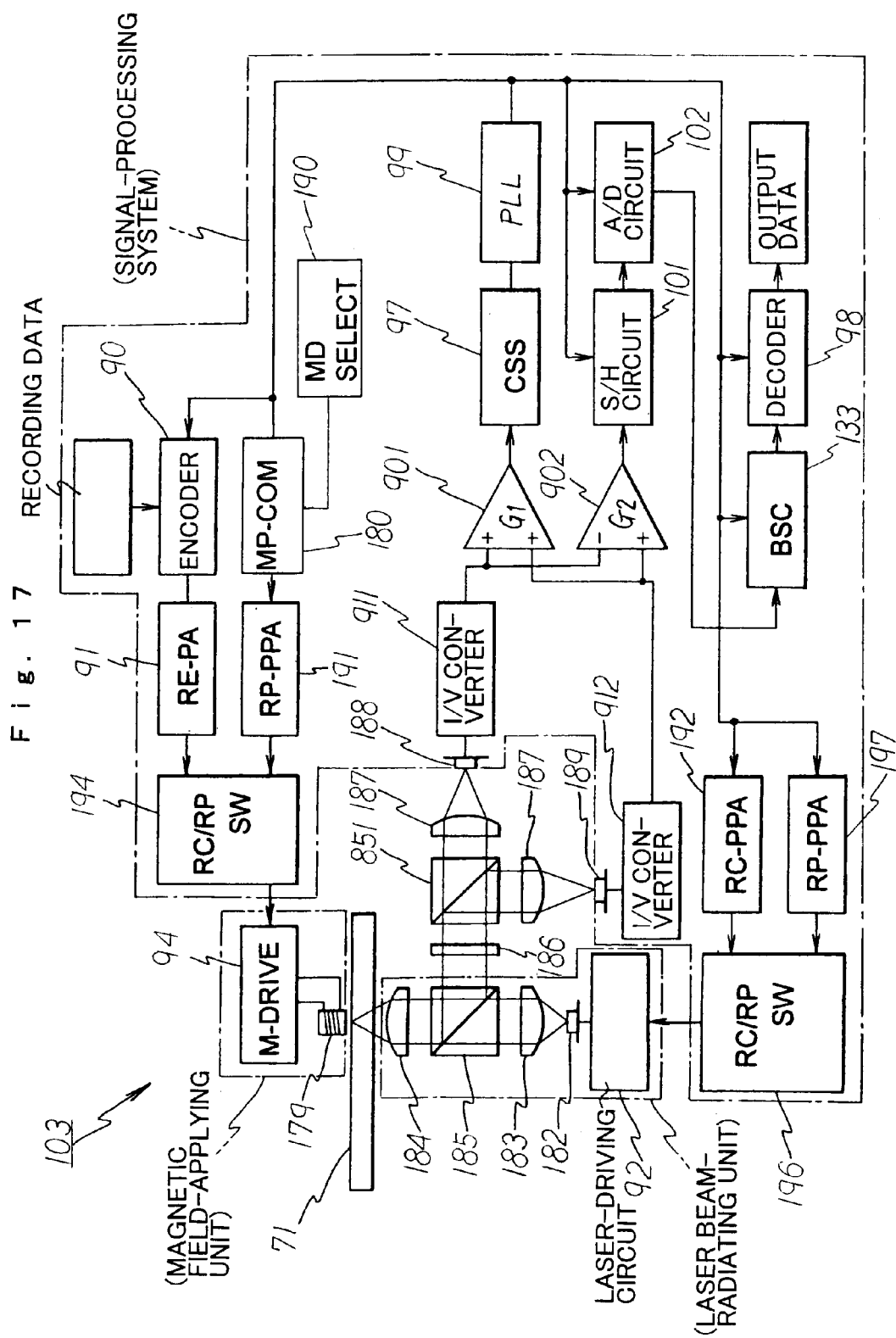
FIG. 17 illustrates an arrangement of a recording and reproducing apparatus described in a fifth embodiment, the recording and reproducing apparatus comprising a magnetic field data selector for selecting a function H(x) corresponding to a magnetic field application pattern for reproduction.

An apparatus shown in FIG. 17 principally comprises a laser control system for irradiating a magneto-optical disk 71 with a light beam pulsed at a constant cycle synchronized with code data, a magnetic field control system for controlling the magnetic field applied to the magneto-optical disk 71 during recording and reproduction, and a signal-detecting system for detecting a signal from the magneto-optical disk 71. The laser control system comprises a laser 182 which is connected to a laser-driving circuit 92. The laser-driving circuit 92 receives a clock signal from a PLL circuit 99 as described later on to adjust the phase and the pulse width, and then the laser-driving circuit 92 controls the laser 182. The magnetic field control system comprises a magnetic coil 179 for applying the magnetic field, the magnetic coil 179 being connected to a magnetic coil-driving circuit (M-DRIVE) 94. During the recording, the magnetic coil-driving circuit 94 receives input data via a phase-adjusting circuit (RE-PA) 91 from an encoder 90 to which data is inputted, to control the magnetic coil 179. On the other hand, during the reproduction, the magnetic coil-driving circuit 94 receives the clock signal from the PLL circuit 99 as described later on to adjust the phase and the pulse width, and then it controls the magnetic coil 179. The external magnetic field, which is applied from the magnetic coil 179 during the reproduction, is controlled by a reproducing magnetic field data selector (MD-SELECT) as follows. That is, the external magnetic field is changed to have a certain magnetic field pattern by a magnetic field pattern converter (MP-COM) 180. The reproducing pulse width and the phase are adjusted by a reproducing pulse width and phase-adjusting circuit (RP-PPA) 191. A recording/reproduction switch 194 (RC-RP-SW) is used to control the magnetic coil-driving circuit 94. The recording and the reproduction are switched to one another in the laser control system and the magnetic field control system as follows. That is, the switching operation is performed for the laser control system by using a recording/reproduction switch (RC/RP-SW) 196. The switching operation is performed for the magnetic field control system by using the recording/reproduction switch 194. The signal-detecting system comprises a polarizing prism 185 arranged between the laser 182 and the magneto-optical disk 71. A second polarizing prism 851 and detectors 188, 189 are arranged on the side thereof. Both of the detectors 188, 189 are connected to a subtracter 902 and an adder 901 via I/V converters 911, 912 respectively. The adder 901 is connected to the PLL circuit 99 via a clock-sampling circuit (CSS) 97. The subtracter 902 is connected to a decoder 98 via a sample hold circuit (S/H) 101 for holding the signal in synchronization with the clock, an A/D converter circuit 102 for performing analog/digital conversion in synchronization with the clock as well, and a binary signal-processing circuit (BSC) 133. A recording pulse width and phase-adjusting circuit (RC-PPA) 192 and a reproducing pulse width and phase-adjusting circuit (RP-PPA) 197 are connected to the recording/reproduction switch (RC/RP-SW) 196 for the laser beam. The pulse width and the phase during the recording and during the reproduction are adjusted by the respective circuits.

In the apparatus constructed as described above, the light beam, which is radiated from the laser 182, is converted into a parallel light beam by means of a collimator lens 183. The light beam passes through the polarizing prism 185, and it is collected on the disk 71 by means of an objective lens 184. The reflected light beam from the disk 71 is directed by the polarizing prism 185 in the direction to the polarizing prism 851, and it passes through a half-wavelength plate 186. After that, the light beam is divided into those directed in two directions by means of the polarizing prism 851. The divided light beams are collected by detector lenses 187 respectively, and they are introduced into photodetectors 188, 189. In this embodiment, pits for generating the tracking error signal and the clock signal are previously formed on the disk 71. The signal, which represents the reflected light beam from the clock signal-generating pit, is detected by the detectors 188, 189. After that, the signal is extracted by the clock-sampling circuit 97. Subsequently, a data channel clock is generated by the PLL circuit 99 connected to the clock-sampling circuit 97.

When the data is recorded, the laser 182 is optically modulated at a constant frequency by the aid of the laser-driving circuit 92 so that the laser 182 is synchronized with the data channel clock. Thus, a continuous pulse light beam having a narrow width is radiated to locally heat, at equal intervals, the data-recording area on the rotating disk 71. The data channel clock controls the encoder 90 of the magnetic field control system 90 to generate the data signal at the reference clock cycle. The data signal is sent to a magnetic coil-driving unit 94 via a phase-adjusting circuit 191. The magnetic coil-driving unit 94 controls the magnetic coil 179 so that the magnetic field having the polarity corresponding to the data signal is applied to the heated portion of the data-recording area. The magneto-optical recording and reproducing apparatus 103 comprises an unillustrated controller. The operation of the apparatus is collectively managed by the controller.

In the apparatus shown in FIG. 17, the magnetic field application pattern (H(x)) is changed as follows. A variety of functions (H1, H2, . . . Hn) are stored in the reproducing magnetic field data selector 190. A function, which is appropriate to perform the reproduction on the magneto-optical recording medium 71, is selected from the variety of functions, and it is sent as a control signal to the magnetic field pattern converter 180. In this embodiment, the function may be selected by the user. Alternatively, the control signal recorded on the magneto-optical recording medium 71 may be detected, and the function may be selected by using the data selector corresponding thereto. When the selection is performed by the user, the function is an own password of the user. The function is selected in accordance with the input of the password into the reproducing apparatus by the user. The magnetic field pattern converter 180 generates the magnetic field application pattern H(x) on the basis of the selected function. Subsequently, the reproducing pulse width and phase-adjusting circuit 191 is used to adjust the pulse width and the phase of H(x) on the basis of the reproducing clock. H(x), for which the pulse width and the phase have been adjusted, is used to control the magnetic coil-driving circuit 94 by the aid of the recording/reproduction switch 194. The means for changing H(x) can be constructed by the reproducing data selector 190 and the magnetic field pattern converter 180 as described above. The functions of the reproducing data selector 190 and the magnetic field pattern converter 180 may be possessed, for example, by the controller (not shown) for collectively managing the operation of the magneto-optical recording and reproducing apparatus 103 shown in FIG. 17.

In order to change H(x), at least one of the factors may be changed, including, for example, the intensity of the applied magnetic field, the frequency of the applied magnetic field, the rising shape and the falling shape of the signal at the portions at which the external magnetic field is switched, and the timing of the applied magnetic field.

Other than the recording and reproducing apparatus as explained above, it is possible to construct a magneto-optical recording and reproducing apparatus which makes it possible to possess the function to reproduce different pieces of information from recording information stored at an identical position on an identical recording medium, by selectively using at least one of the means for changing H(x) and the means for changing L(x).

Figure 18:
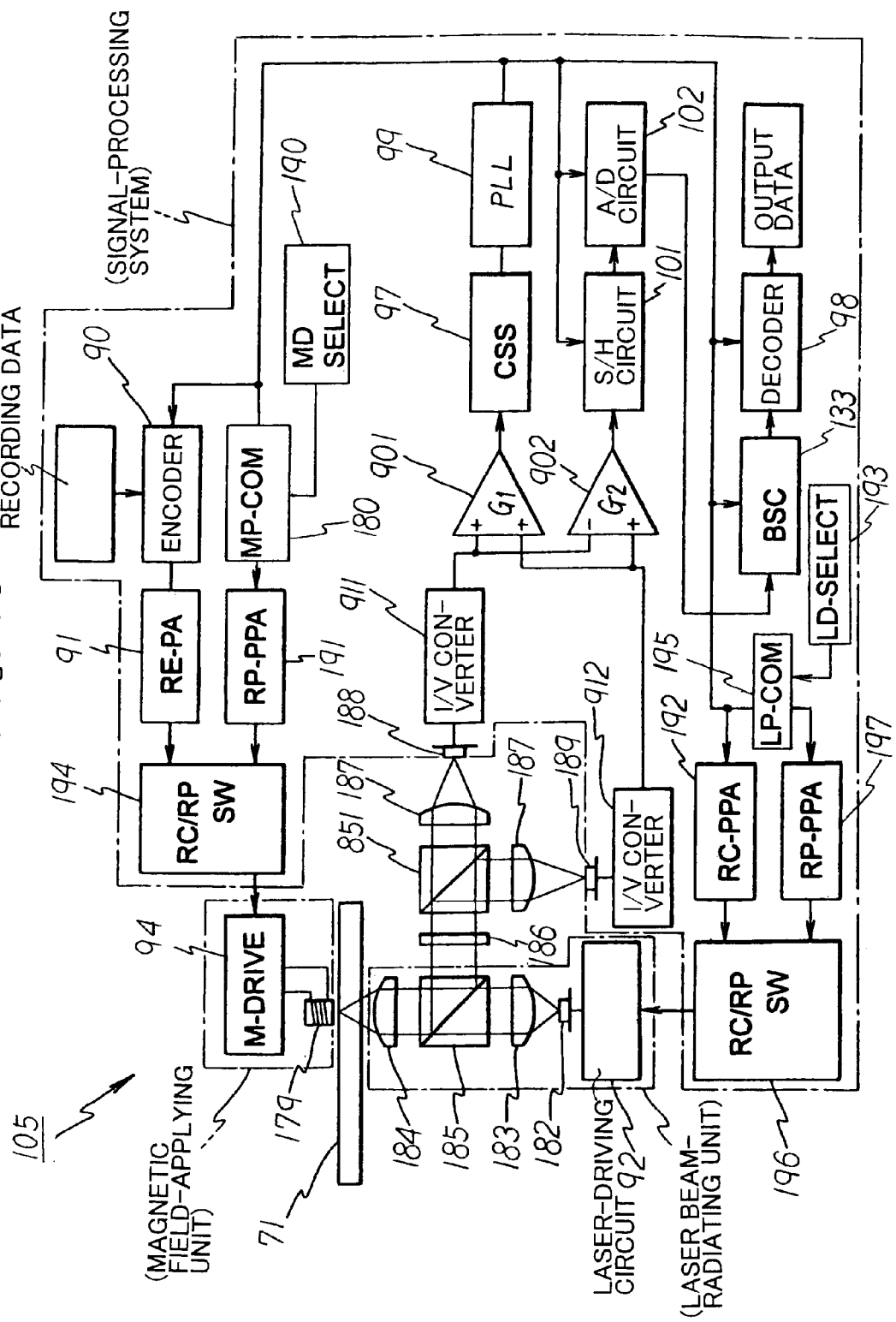
FIG. 18 illustrates an arrangement of a recording and reproducing apparatus described in the fifth embodiment, the recording and reproducing apparatus comprising a magnetic field data selector for selecting a function H(x) corresponding to a magnetic field application pattern for reproduction, and a reproducing light beam data selector for selecting a function L(x) corresponding to an intensity pattern of a reproducing light beam.

FIG. 18 shows an example of the recording and reproducing apparatus for the magneto-optical recording medium, which makes it possible to change not only the application pattern (H(x)) of the reproducing magnetic field but also the application pattern (L(x)) of the reproducing light beam. The apparatus shown in FIG. 18 is constructed in the same manner as the apparatus shown in FIG. 17 except that a laser beam pattern converter (LP-COM) 195 and a reproducing light beam data selector (LD-SELECT) 193 are connected to the reproducing pulse width/phase-adjusting circuit (RP-PPA) 197 for the reproducing light beam. Accordingly, explanation is omitted for the same arrangement as that of the apparatus shown in FIG. 17.

In the apparatus shown in FIG. 18, the reproducing light beam pattern (L(x)) is changed as follows. A variety of functions (L1, L2, ... Ln) are stored in the reproducing light beam data selector 193. A function, which is appropriate to perform the reproduction on the magneto-optical recording medium 71, is selected from the variety of functions, and it is sent as a control signal to the reproducing light beam pattern converter 195. The reproducing light beam pattern converter 195 generates the laser light pattern L(x) on the basis of the selected function. Subsequently, the reproducing pulse width and phase-adjusting circuit 197 is used to adjust the pulse width and the phase of L(x) on the basis of the reproducing clock. L(x), for which the pulse width and the phase have been adjusted, is used to control the laser-driving circuit 92 by the aid of the recording/reproduction switch 196. The means for changing L(x) can be constructed by the reproducing light beam data selector 193 and the reproducing light beam pattern converter 195 as described above. The functions of the reproducing light beam data selector 193 and the reproducing light beam pattern converter 195 may be possessed, for example, by the controller (not shown) for collectively managing the operation of the magneto-optical recording and reproducing apparatus 105 shown in FIG. 18.

In order to change L(x), at least one of the factors may be changed, including, for example, the intensity of the laser beam, the clock frequency for synchronizing the radiation of the laser beam, the duty for radiating the laser beam, the rising shape and the falling shape of the radiation intensity of the laser beam, and the timing of the laser beam radiation. The function L(x) may be selected by the user. Alternatively, the control signal recorded on the magneto-optical recording medium 71 may be detected, and the function L(x) may be selected by using the data selector 193 corresponding thereto. When the selection is performed by the user, the function is an own password of the user. The function is selected in accordance with the input of the password into the reproducing apparatus by the user.

The use of the apparatus shown in FIG. 18 makes it possible to change not only the application pattern (H(x)) of the reproducing magnetic field but also the application pattern (L(x)) of the reproducing laser beam. Different pieces of information can be reproduced from the magneto-optical recording medium 71 corresponding to the changed patterns.

Sixth Embodiment

In the reproduction process based on the magnetic domain magnification, the recording magnetic domain is magnified in the reproducing layer. Therefore, when adjacent magnetic domains are subjected to reproduction, a magnetic domain, which is to be previously read, should be promptly magnified and reduced. If the change is not made quickly, the reproduced signal waveform causes the interference between waveforms. However, in order to perform the reproduction process based on the magnetic domain transfer and magnification at a high speed, it is necessary to quickly modulate the reproducing light beam pulse and the reproducing magnetic field on the other hand, there are a lot of technical difficulties especially in the high speed modulation for the reproducing magnetic field.

In order to solve the difficulties as described above, this embodiment is illustrative of the reproducing method based on the use of different H(x)'s or L(x)'s in which the phase is mutually shifted in an amount corresponding to the recording clock (reproducing clock) or in an amount of integral multiple thereof.

Figure 19:
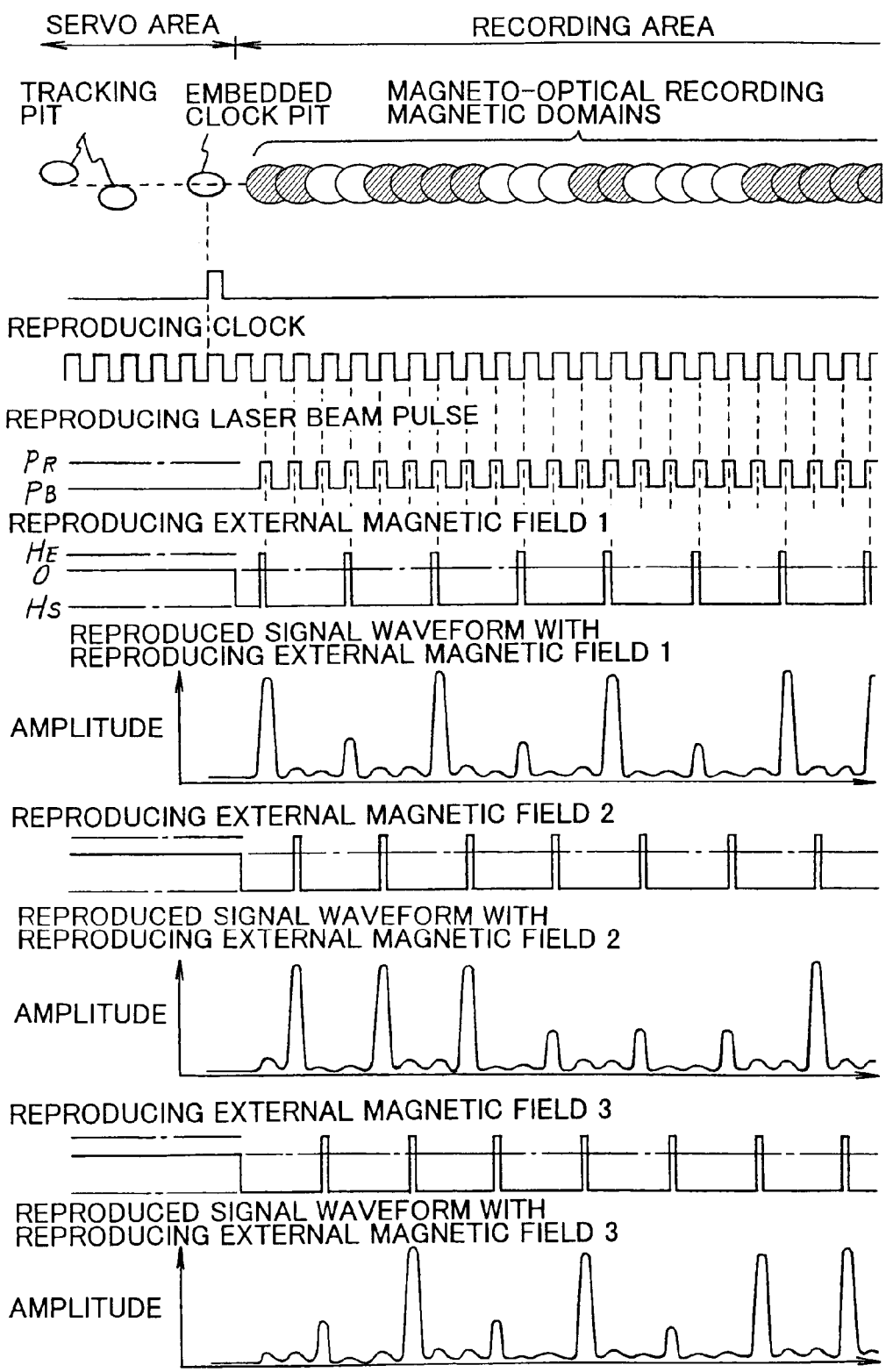
FIG. 19 shows a timing chart for illustrating a magneto-optical recording and reproducing method based on the use of external magnetic fields 1 to 3 described in a sixth embodiment.

A simple example of this reproducing method is shown in FIG. 19. This reproducing method uses three kinds of H(x)'s. In the three kinds of H(x)'s, the cycle, at which the magnetic field $H_E$ in the same direction as that of the magnetization of the recording magnetic domain (represented by black marks in the drawing) is applied during the reproduction, is three times as much as the reproducing clock, the cycle being identical for the three kinds of H(x)'s. Any of them has an identical magnitude and an identical duty for $H_E$ and $H_S$. However, the application timing (phase) of the magnetic field $H_E$ is deviated from each other by an amount of one cycle of the reproducing clock. That is, when the reproducing magnetic field concerning the first H1(x) is used, the reproduction is performed corresponding to 1st, 4th, 7th, and 10th magnetic domains. When the reproducing magnetic field concerning the second H2(x) is used, the reproduction is performed by sampling 2nd, 5th, 8th, and 11th magnetic domains. When the reproducing magnetic field concerning the third H3(x) is used, the reproduction is performed by sampling 3rd, 6th, 9th, and 12th magnetic domains. In this embodiment, an identical recording area is subjected to the reproduction three times by using the reproducing magnetic fields of H1(x), H2(x), and H3(x). Thus, it is possible to reproduce information signals from all of the recording magnetic domains shown in an upper portion in FIG. 19. The reproduction, which is performed by combining the three magnetic fields of H1(x) to H3(x), does not suffer the inter-waveform interference between reproduced signal waveforms, making it possible to perform the reproduction with high S/N. That is, the information sequence, which is continuously recorded on the recording medium, is subjected to the reproduction of information by using the plurality of cycles. Thus, it is possible to perform the reproduction with high S/N. This system is especially effective when the high density recording is made by densely forming minute recording magnetic domains in the track direction (line direction).

This system also makes it possible to select information by selecting H(x) or L(x). That is, with reference to the example described above, information 1 is recorded at positions of {H1=3n+1 (n=0 to m)}th recording magnetic domains such as the 1st, 4th, 7th, 10th . . . recording magnetic domains, information 2 is recorded at positions of {H2=3n+2 (n=0 to m)}th recording magnetic domains such as the 2nd, 5th, 8th, 11th . . . recording magnetic domains, and information 3 is recorded at positions of {H3=3n (n=0 to m)}th recording magnetic domains such as the 3rd, 6th, 9th, 12th . . . recording magnetic domains. In this case, desired information of the pieces of information 1 to 3 can be derived by selecting the functions H1 to H3 and applying the magnetic field corresponding thereto. When the selection of information corresponds to an ID number of an user, it is possible for the system to possess a confidential property.

In the embodiment described above, the recorded information can be reproduced by successively applying the three reproducing magnetic field patterns of H1(x) to H3(x). The reproduced signals are three reproduced data sequences corresponding to H1(x) to H3(x) respectively. In order to allow the plurality of reproduced data sequences to correspond to the recording data as in this embodiment, it is necessary to precode the recording data when the recording magnetic domain pattern is formed as shown in FIG. 19. It is assumed, for example, that there are data sequences to be recorded, i.e., $D_{ij}$ (i=1 to n, j=1 to m): $D_{11}, D_{12}, D_{13}, \ldots D_{1m}$, $D_{21}, D_{22}, D_{23}, \ldots D_{2m}, D_{n1}, D_{n2}, D_{n3}, \ldots D_{nm}$. This sequence can be arranged (precoded) as follows by allowing j to be in the high order. $D_{11}, D_{21}, D_{31}, \ldots D_{n1}, D_{12}, D_{22}, D_{32}, \ldots D_{n2}, D_{1m}, D_{2m}, D_{3m}, \ldots D_{nm}$. The data, which has been precoded as described above, is recorded as it is on the magneto-optical recording medium. During the reproduction, the magnetic fields $H_E/H_S$, which have a cycle that is n times as much as the recording clock and which have phases that are successively shifted by an amount of one recording clock with each other, are applied n times in total to an identical recording area to perform the reproduction. Thus, the original data sequence $D_{ij}$ (i=1 to n, j=1 to m) can be reproduced as it is. The precoding process can be executed by using the encoder 90 of the apparatuses shown in FIGS. 18 and 19.

This embodiment is illustrative of the simple example in which the sampling timing (phase) of the function H(x) is deviated with the recording clock cycle to make the change. Alternatively, only the information D can be reproduced by recording the information D so that it is carried on specified bit information, and applying $H_E$ of the reproducing magnetic field at a timing in conformity with the bit information. For example, necessary data (0 or 1) is placed only at data positions of "1" of code information of "1001001010". $H_E$ of the reproducing magnetic field is applied only at the place of "1" of the code information. Thus, it is possible to reproduce the data. Accordingly, it is possible to cipher the data as explained in the seventh embodiment described later on. The code information of "1001001010" can be used as a password of a user. It is noted that the code information of "1001001010" is one type of the function H(x) which represents the magnetic field application pattern. Another user can derive another data from the identical recording area by using another code information (different function) of "0110110001". The function H(x) may be an arbitrary complex function.

Seventh Embodiment

An embodiment will be explained, in which the present invention is utilized in order to improve the confidential property of information. According to the present invention, a plurality of different pieces of information can be reproduced from recorded information at an identical position on an identical recording medium by using H(x) and L(x). Accordingly, the magneto-optical recording and reproducing method of the present invention can be used as a method for restricting the access to information having a high confidential property. For example, an application system may be constructed, in which the access to the information of high confidential property is not permitted unless a specified information sequence is reproduced.

Further, the recording magnetic domains, which are minute as compared with the ordinary optical resolving power, are previously recorded so that no reproduction is performed unless the magnetically induced super resolution process or the magnetic domain magnification process is used. By doing so, the confidential property of information is further improved. Even if an unspecified person, who has only a reproducing means having a low resolving power, obtains the recording medium stored with confidential information, it is impossible to reproduce any meaningful data. Even if an unspecified person, who has only a reproducing means having a low resolving power, intends to illegally make a copy from the recording medium stored with confidential information, it is impossible to recognize, during the reproduction, the recording magnetic domains which are minute as compared with the ordinary optical resolving power. Therefore, only erroneous information can be reproduced, and it is impossible to make any illegal copy.

The following system may be designed. That is, in order to obtain a specified information sequence to be reproduced, the means is used, with which a plurality of different pieces of information are reproduced from recorded information at an identical position on an identical recording medium. Thus, desired reproduced information can be obtained only by using H(x) which is set for a parameter possessed by a specified user. Alternatively, the means is used, with which a plurality of different pieces of information are reproduced from recorded information at an identical position on an identical recording medium, while changing L(x). By doing so it is also possible to keep the confidential property for the reproduction of the recorded information on the magneto-optical recording medium. Further alternatively, the confidential property can be kept by combining H(x) and L(x).

Eighth Embodiment

A variety of application systems are available, based on the use of the fact that H(x) and L(x) are used to reproduce a plurality of different pieces of information corresponding thereto. Those provided as such an application system include the application system for enhancing the confidential property of information as described in the seventh embodiment, as well as an application system in which recording and reproduction are performed with a plurality of channels.

As the application system for performing recording and reproduction with a plurality of channels, it is possible to provide an application system which is characterized by the use of a plurality of pieces of voice information. It is also possible to provide an application system which uses voice information comprising a plurality of languages, as the plurality of pieces of voice information. As the application system for performing recording and reproduction with a plurality of channels, it is also possible to provide an application system which is characterized by the use of a plurality of pieces of image information. It is also possible to realize an application system which includes image information for constructing stereoscopic images, as the plurality of pieces of image information. In addition, it is also possible to provide an application system which is characterized in that an image, which corresponds to a desired direction of the line of sight, can be displayed, by using the plurality of pieces of image information. For example, it is possible to provide a system in which picture images of an objective are photographed in a plurality of directions by using recording apparatuses such as a plurality of video cameras so that a picture image photographed in a desired direction is displayed. Further, it is also possible to provide an application system which is characterized in that the time series display can be made depending on the selection of an user, as the application system for performing recording and reproduction with a plurality of channels. Furthermore, it is also possible to provide an application system which is characterized in that a specified code sequence, which is included in the different pieces of reproduced information, is allotted to index information of a file.

Ninth Embodiment

This embodiment is illustrative of an example of the magneto-optical recording and reproducing method of the present invention which uses the reproduction process based on the magnetically induced super resolution, as a means for reproducing information recorded on the recording medium. The recording and reproducing method of this embodiment is applicable to the seventh and eighth embodiments.

The magnetically induced super resolution is a technique in which the temperature distribution in the beam spot of the reproducing light beam is utilized to magnetically mask the high temperature portion or the low temperature portion so that the information, which is recorded in magnetic domains smaller than the beam spot, may be reproduced at a high resolving power. This technique includes the FAD (Front Aperture Detection) method in which the high temperature portion is masked, and the RAD (Rear Aperture Detection) method or the CAD (Center Aperture Detection) method in which the low temperature portion is masked. When the recording medium capable of the magnetically induced super resolution as described above is used while changing $H(x)$ or $L(x)$, the information, which is recorded on an identical recording medium, can be obtained as different reproduced signals. The change of $L(x)$ makes it possible to change the temperature distribution in the beam spot. The change of $H(x)$ makes it possible to control the magnetic coupling between the reproducing layer and the recording layer, and control the size and the position of the aperture.

Next, explanation will be made for an example based on the use of the FAD method of the magneto-optical recording and reproducing method according to the present invention by using the reproduction process based on the magnetically induced super resolution. A recording medium, which is formed with the following films on a substrate, is used as the recording medium capable of the magnetically induced super resolution based on the FAD method, comprising, on the transparent substrate made of, for example, glass or plastic, a magnetic layer composed of three layers of a reproducing layer, a switching layer, and a recording layer disposed in this order from the side of the substrate, the magnetic layer being interposed by dielectric layers. For example, GdFeCo is preferably used as the reproducing layer, TbFeCoNb or TbFeCoAl is preferably used as the switching layer, TbFeCo is preferably used as the recording layer, and SiN is preferably used as the dielectric layer. More specifically, for example, the following structure is available. That is, a recording medium, which is formed with films on the transparent substrate in the following order from the side of the substrate, is used, comprising, 85 nm of a dielectric layer composed of SiN, 30 nm of a reproducing layer composed of $Gd_{22.0}Fe_{58.5}Co_{19.5}$, 10 nm of a switching layer composed of $Tb_{23.0}Fe_{60.0}Co_{12.0}Nb_{5.0}$, 40 nm of a recording layer composed of $Tb_{25.5}Fe_{62.0}Co_{12.5}$, and 80 nm of a dielectric layer composed of SiN. The Curie temperature of $Gd_{22.0}Fe_{58.5}Co_{19.5}$ of the reproducing layer is higher than 400° C., the compensation temperature thereof is lower than room temperature, and coercive force thereof is 0.3 kOe at room temperature. The Curie temperature of $Tb_{23.0}Fe_{60.0}Co_{12.0}Nb_5.0$ of the switching layer is 180° C., the compensation temperature thereof is lower than room temperature, and coercive force thereof is 10 kOe at room temperature. The Curie temperature of $Tb_{25.5}Fe_{62.0}Co_{12.5}$ of the recording layer is 270° C., the compensation temperature thereof is 140° C., and coercive force thereof is larger than 12 kOe at room temperature.

When the recording medium capable of the magnetically induced super resolution based on the FAD method described above is applied with an external magnetic field of 200 Oe while being irradiated with a DC light beam during the reproduction, the high temperature portion is produced by thermal conduction within the beam spot portion disposed rearward from the central portion of the beam spot of the reproducing light beam. At the high temperature portion, the temperature is about the Curie temperature of the switching layer of 180° C. Accordingly, the exchange coupling is weakened between the reproducing layer and the recording layer. The magnetization of the reproducing layer, in which the exchange coupling with the recording layer is weakened, is aligned with the direction of the external magnetic field independently from the information recorded in the recording layer, by the aid of the external magnetic field of 200 Oe applied during the reproduction. Thus, a magnetic mask is generated. The magnetization of the reproducing layer makes exchange coupling to the magnetization of the recording layer via the switching layer, at the inside of the beam spot portion other than the high temperature portion. Therefore, the magnetization is oriented corresponding to the information in the recording layer. Thus, in accordance with the FAD method, the aperture is produced only at the front portion within the beam spot, making it possible to effect the magnetically induced super resolution process.

In the case of the FAD method, when $H(x)$ during the reproduction always satisfies $H(x)=0$, in other words, when no external magnetic field is applied during the reproduction, it is impossible to obtain the effect of the magnetically induced super resolution, because of the following reason. That is, even when the switching layer arrives at the Curie temperature, and the exchange coupling between the reproducing layer and the recording layer is broken, then the magnetic coupling is generated by the magnetostatic coupling between the reproducing layer and the, recording layer, and no magnetic mask is generated. In other words, it is premised in the FAD method that the external magnetic field is applied during the reproduction. The FAD method is preferably used when a plurality of different pieces of information are reproduced from an identical recording position by changing $H(x)$ to apply it to the identical recording position on the magneto-optical recording medium, as performed in the present invention.

When the RAD method or the CAD method is used, it is preferable to reproduce a plurality of different pieces of information by changing $L(x)$ during the reproduction. For example, if $L(x)$ during the reproduction is defined as follows, $L(x)$ can be changed by changing the size of the parameter $x0$.

That is, in the case of $nT<x \leq nT+x0$, $L(x)=L$ is given, while in the case of $nT+x0<x \leq (n+1)T$, $L(x)=0$ is given. In these expressions, T represents the magnetic domain length of the shortest recording magnetic domain recorded in the recording layer, n represents an integer, and L represents a constant provided that $0<x0 \leq T$ is given.

Tenth Embodiment

The third embodiment is illustrative of the method in which the magneto-optical recording medium capable of reproduction by magnifying the magnetic domain as described in the fourth embodiment is used to apply the reproducing external magnetic field such that the magnetic field $H_E$ in the same direction as the magnetization direction of the recording magnetic domain and the magnetic field $H_S$ in the direction opposite to the magnetization direction of the recording magnetic domain are alternately applied to magnify the magnetic domain with the magnetic field $H_E$ so that information is reproduced. In the third embodiment, different reproduced signals are obtained by changing the application pattern (function H(x)) of the external magnetic field applied to the magneto-optical recording medium and the radiation pattern (function L(x)) of the reproducing light beam during the reproduction of information.

This embodiment is illustrative of examples of the reproducing method and the magneto-optical recording medium appropriate thereto, in which the magneto-optical recording medium capable of reproduction by magnifying the magnetic domain is used to modulate the intensity of the reproducing light beam so that the magnetic domain may be magnified and reduced. This recording medium is disclosed in Japanese Patent Application No. 9-94899 filed by the present applicant (filed on Mar. 28, 1997). This embodiment explains a reproducing method in which high C/N is obtained by using the magneto-optical recording medium disclosed in Japanese Patent Application No. 9-94899. At first, explanation will be made for the magneto-optical recording medium and the reproducing method thereon disclosed in Japanese Patent Application No. 9-94899.

Japanese Patent Application No. 9-94899 has been disclosed a method for performing reproduction on a magneto-optical recording medium for reproducing a recorded signal by irradiating the magneto-optical recording medium with a reproducing light beam to detect magnitude of an magneto-optical effect, the reproducing method comprising the steps of:

using, as the magneto-optical recording medium, a magneto-optical recording medium comprising a magneto-optical recording film having perpendicular magnetization and an auxiliary magnetic film to cause transition from an in-plane magnetizable film to a perpendicularly magnetizable film when a temperature exceeds a critical temperature Tcr with a non-magnetic film intervening therebetween, the magneto-optical recording medium having a magnetic characteristic to satisfy a relationship of room temperature<Tcr<Tcomp<Tco<Tc concerning a Curie temperature Tco of the magneto-optical recording film and a Curie temperature Tc and a compensation temperature Tcomp of the auxiliary magnetic film; and executing reproduction of the recorded signal through the steps of irradiating the magneto-optical recording medium with the reproducing light beam which is power-modulated to have at least two light powers of $Pr_1$ and $Pr_2$ at the same cycle as that of a reproducing clock or at a cycle of an integral multiple thereof while applying a DC magnetic field so that a recording magnetic domain in the magneto-optical recording film is transferred to the auxiliary magnetic film, the transferred magnetic domain is magnified, and the magnified magnetic domain is reduced or extinguished.

Figure 23:
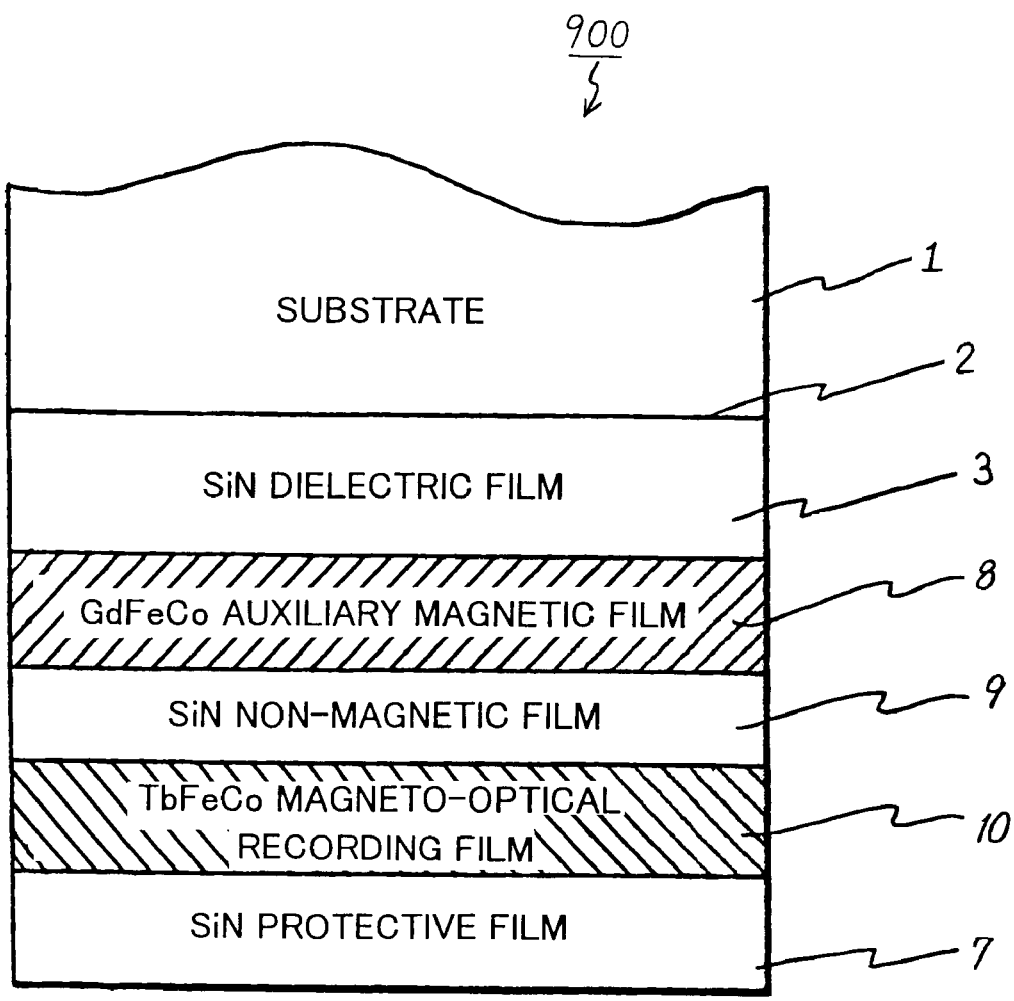
FIG. 23 conceptually shows a stacked structure of a magneto-optical recording medium used for the reproducing method according to the present invention.

At first, explanation will be made for the principle of this reproducing method. The reproducing method is based on the use of the magneto-optical recording medium comprising the magneto-optical recording film having the perpendicular magnetization, and the auxiliary magnetic film which causes transition from the in-plane magnetizable film to the perpendicularly magnetizable film when the temperature exceeds the critical temperature Tcr, with the non-magnetic film interposed therebetween. FIG. 23 shows an illustrative structure of the magneto-optical recording medium of this type. A magneto-optical disk 900 shown in FIG. 23 comprises, in a stacked form on a substrate 1, a dielectric film 3, an auxiliary magnetic film 8, a non-magnetic film 3, a magneto-optical recording film 10, and a protective film 7. The auxiliary magnetic film 8 has a compensation temperature Tcomp between a critical temperature Tcr and its Curie temperature Tc. The magneto-optical recording medium 900 satisfies the relationship of room temperature<Tcr<Tcomp<Tco<Tc concerning the Curie temperature Tco of the magneto-optical recording film 10, the critical temperature Tcr, the Curie temperature Tc, and the compensation temperature Tcomp of the auxiliary magnetic film 8.

Figure 20:
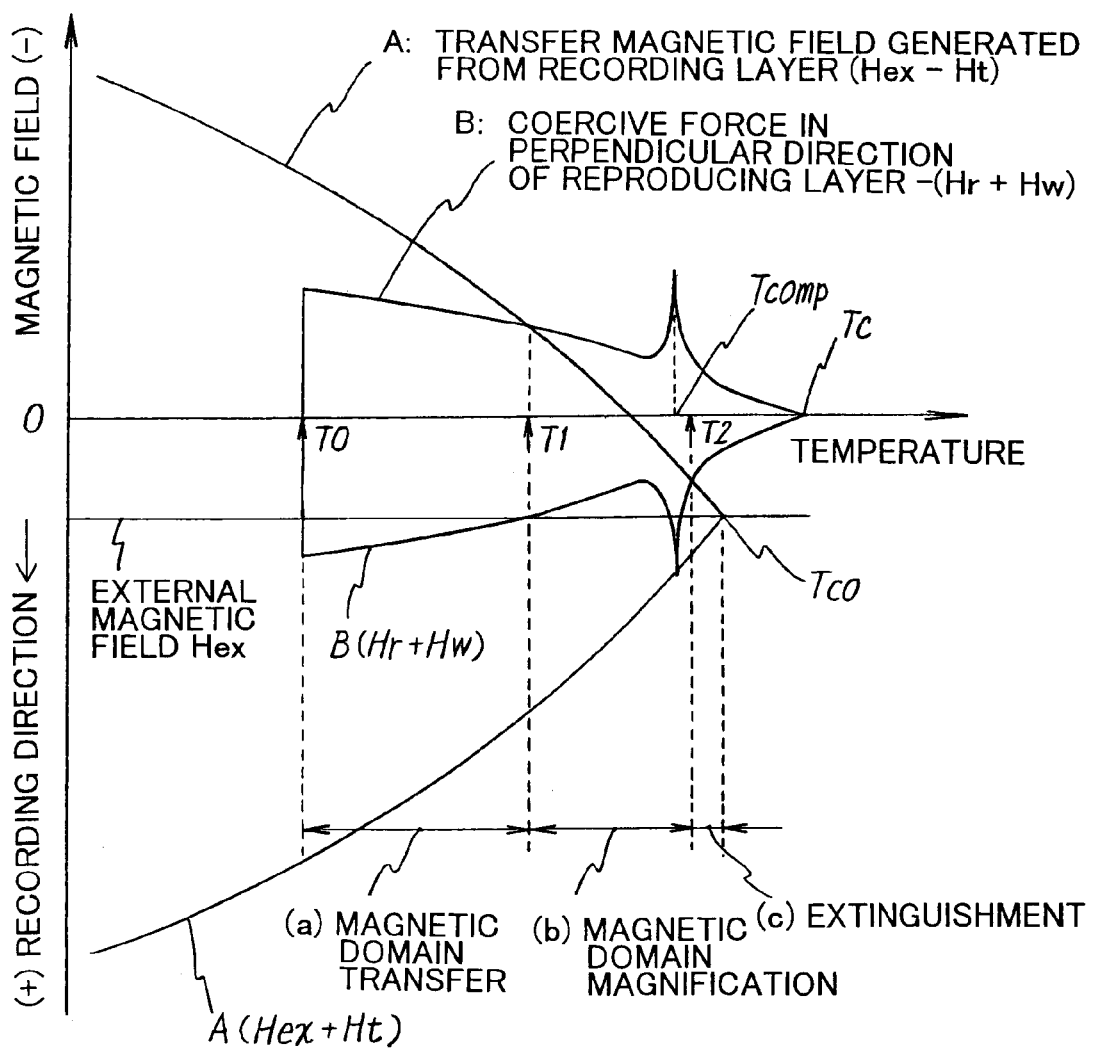
FIG. 20 shows the magnetic temperature characteristic concerning a magneto-optical recording layer and a magneto-optical reproducing layer of a magneto-optical recording medium described in a tenth embodiment.

Reproduction is performed in accordance with the reproducing method of the present invention by radiating the light power-modulated reproducing light beam while applying the external DC magnetic field to the magneto-optical recording medium 900 having the magnetic characteristic as described above. FIG. 20 shows magnetic characteristics of the magneto-optical recording film 10 and the auxiliary magnetic film 8 of the magneto-optical disk 900 in a state in which the constant DC magnetic field Hex is applied to the magneto-optical recording medium 900 in the recording direction. The magnetic temperature curve A shown in FIG. 20 denotes a temperature-dependent change in transfer magnetic field (static magnetic field) generated by the magnetization of the recording layer from the magneto-optical recording film 10 (hereinafter simply referred to as "recording layer") to the auxiliary magnetic film 8 (hereinafter simply referred to as "reproducing layer"). The transfer magnetic field of the curve A represents the magnitude of the magnetic field obtained by adding an amount of offset of the external magnetic field Hex. Therefore, the magnetic filed having the magnitude of (Hex–Ht) and the magnetic field having the magnitude of (Hex+Ht) exist as the entire transfer magnetic field depending on the direction of the magnetic domain of the recording layer, with a boundary of the Curie temperature Tco of the recording layer. The two magnetic fields constitute the curve A. In FIG. 20, the downward direction is the recording direction. Hex is applied in the downward direction. In this case, the external magnetic field Hex is adjusted to be small as compared with the magnitude of the static magnetic field Ht in the initializing direction generated from the magnetization of the recording layer at room temperature. Therefore, the entire transfer magnetic field includes those directed in the upward direction (negative) and in the downward direction (positive) depending on the magnetization direction of the recording magnetic domain in the recording layer as illustrated by the curve A.

The magnetic temperature curve B denotes the temperature-dependent change of the coercive force in the perpendicular direction of the reproducing layer in a state of having the perpendicular magnetization. The coercive force is represented by Hr+Hw as including the pure coercive force Hr of the magnetic domain in the reproducing layer in the perpendicular direction and the magnetic field Hw corresponding to a virtual magnetic field regarded to be applied by generation of the magnetic wall of the reproducing layer (in other words, the exchange coupling magnetic field in the in-plane direction of the reproducing layer). That is, Hr+Hw represents the magnetic field necessary to perform inversion of the magnetization in the direction perpendicular to the film surface of the reproducing layer. As shown in FIG. 20, the magnetization in the direction perpendicular to the film surface of the reproducing layer appears at a temperature which is not less than the critical temperature Tcr (T0 in FIG. 20) at which the reproducing layer behaves as a perpendicularly magnetizable film. The coercive force is maximal at the compensation temperature Tcomp because the magnetization of the reproducing layer is zero.

The temperature curves A and B shown in FIG. 20 are divided into those belonging to three areas (a) to (c) as shown in FIG. 20. The three areas (a) to (c) correspond to the three steps of i) magnetic domain transfer from the recording layer to the reproducing layer, ii) magnification of the transferred magnetic domain in the reproducing layer, and iii) extinguishment of the magnified magnetic domain, in the reproducing method of the present invention as shown in FIG. 21(*a*) respectively. Accordingly, explanation will be made with reference to FIG. 21 for the magnetic characteristics required for the recording layer and the reproducing layer in the areas (a) to (c) shown in FIG. 20. Arrows in the recording layer and the reproducing layer shown in FIG. 21(*a*) denote the direction of the magnetic moment of the rare earth metal included in each of the magnetic domains.

The area (a) is a temperature area in which the magnetic domain is transferred from the recording layer to the reproducing layer in the reproducing method of the present invention, which belongs to a temperature range of T0 to T1 in FIG. 20(*a*). T0 means the critical temperature Tcr, and T1 is a temperature at which the magnetic temperature curve A on the side of Hex−Ht initially intersects the magnetic temperature curve B. The temperature range T0 to T1 can be achieved by adjusting the light power of the reproducing light beam to be a relatively low power as described later on. In order to actually perform the magnetic transfer as shown in FIG. 21(*a*) (1) in this temperature area, it is necessary that the magnitude of the transfer magnetic field in this temperature area exceeds the coercive force of the reproducing layer in the perpendicular direction. That is, when the magnetization recorded on the recording layer is in the direction ↓ (recording direction), it is necessary that the transfer magnetic field represented by Hex+Ht is larger than Hr+Hw or −(Hr+Hw) (requirement for magnetic domain transfer). When the magnetization recorded on the recording layer is in the direction ↑ (erasing direction), it is necessary that the negative transfer magnetic field represented by Hex−Ht is smaller than the coercive force Hr+Hw or −(Hr+Hw) of the reproducing layer in the perpendicular direction (requirement for magnetic domain transfer).

On the other hand, when the magnetic temperature curves A and B are compared with each other in the area (a) shown in FIG. 20, it is appreciated that the relationships of the following expressions (a1) to (a3) hold.

$$Hr < Hex + Ht - Hw \quad (a1)$$

$$-Hr > Hex - Ht + Hw \quad (a2)$$

$$Hr > Hex - Ht - Hw \quad (a3)$$

Therefore, the area (a) satisfies the magnetic domain transfer requirement described above, and the recording magnetic domain in the recording layer can be transferred to the reproducing layer regardless of the direction of magnetization thereof. FIG. 21(*a*) (1) shows a case in which the magnetization in the direction ↓ recorded in a magnetic domain 210 in the recording layer is transferred to an area of the reproducing layer at a temperature which exceeds the temperature T0 within the reproducing light spot so that a transferred magnetic domain 201*a* is formed.

Subsequently, in the area (b) shown in FIG. 20, the magnetic domain magnification is performed for the magnetic domain 201*b* transferred to the reproducing layer as shown in FIG. 21(*a*) (2) and (3). This temperature area resides in a range indicated by T1 to T2 in FIG. 20. The temperature T2 is a temperature at which the magnetic temperature curve A on the side of Hex−Ht intersects the magnetic temperature curve B on the high temperature side. The magneto-optical disk having the magnetic characteristic shown in FIG. 20 is adjusted such that T2 is approximately coincident with the compensation temperature Tcomp of the reproducing layer (the temperature exists between the compensation temperature Tcomp and the Curie temperature Tco of the recording layer, and the temperature is a temperature extremely close to the compensation temperature Tcomp) in relation to the external magnetic field Hex. In this temperature area, as shown in FIG. 21(*a*) (2), magnetic domains 203, 203', which are subjected to magnetic transfer from magnetic domains 212, 212' in the recording layer in the upward direction, exist on both sides of the magnetic domain 201*b* transferred to the reproducing layer, as a result of being heated to T0 to T1 within the reproducing light spot. In order to allow the magnetic domain 201*b* transferred to the reproducing layer to start magnification in the in-plane direction, it is necessary that the directions of the magnetic domains 203, 203' disposed on the both sides are directed to the recording direction (direction ↓) in the same manner as the magnetic domain 201*b*. The magnetic domains 203, 203' receives the transfer magnetic field (Hex−Ht) (totally in the direction ↑) obtained by adding, to the external magnetic field Hex, the static magnetic field Ht in the upward direction from magnetic domains 212 in the recording layer existing just thereover. On the other hand, the magnetic domains 203, 203' have the coercive force in the perpendicular direction including the exchange coupling magnetic field Hw (in the downward direction) exerted by the magnetic domain 201*b* and the coercive force Hr to invert the magnetization of the magnetic domains 203, 203' themselves. Therefore, when the coercive force in the perpendicular direction (Hr+Hw) is made larger than the transfer magnetic field (Hex−Ht) of the magnetic domains 203, 203', the magnetic domains 203, 203' are inverted (requirement for magnetic domain inversion).

It is appreciated that the following relational expressions hold in the area (b) according to the relative magnitude between the magnetic temperature curves A and B.

$$Hr < Hex + Ht - Hw \quad (b1)$$

$$-Hr < Hex - Ht + Hw \quad (b2)$$

$$Hr > Hex - Ht - Hw \quad (b3)$$

The foregoing expression (b2) is the condition of magnetic domain inversion itself under which the coercive force (Hr+Hw) in the perpendicular direction is larger than the transfer magnetic field Hex−Ht (in the upward direction) of the magnetic domains 203, 203'. Therefore, the magnetic domain magnification occurs in the area (b) for the magnetic domain 201*b* in the reproducing layer as shown in FIG. 21(*a*) (3). According to the relationship of (b2), it is demonstrated that no magnetic domain in the downward direction appears in the reproducing layer when there is no magnetic domain in the recording direction in the reproducing layer, in the temperature area (b). In FIG. 21(a) (3), the both sides of the magnified magnetic domain 201b are the temperature area of T0 to T1. Therefore, the magnetic domains 203, 203' in the direction ↑, which are subjected to the magnetic domain transfer from the magnetic domains 212, 212' in the recording layer, exist therein.

Subsequently, in the area (c), the transferred and magnified magnetic domain is inverted (extinguished), and a magnetic domain 201c in the erasing direction is formed as shown in FIG. 21(a) (4). This temperature area exists in a range from T2 which slightly exceeds the compensation temperature of the reproducing layer, to the Curie temperature Tco of the recording layer. The magnified and reproduced magnetic domain can be extinguished or reduced by applying the reproducing magnetic field in the erasing direction, i.e., by using the alternating magnetic field as the reproducing magnetic field. However, in the reproducing method of the present invention, the DC magnetic field is used to extinguish the magnified magnetic domain by power-modulating the reproducing light beam to have the power higher than the reproducing light power used to perform the magnetic transfer and the magnification. The reproducing light power may be modulated to be further small in order to extinguish the magnified magnetic domain.

Explanation will be made with reference to FIG. 22 for the principle to invert (extinguish) the magnified magnetic domain in the area (c). FIG. 22 illustrates the temperature-dependent change of the direction and the magnitude of sub-lattice magnetization of the rare earth metal and the transition metal of the magnetic domain 210 in the recording layer composed of the rare earth-transition metal (TbFeCo alloy) and the magnetic domain 201 in the reproducing layer composed of the rare earth-transition metal (GdFeCo alloy) subjected to the magnetic domain transfer therefrom shown in FIG. 21(a) (2). As shown in FIG. 22(a), when the temperature of the reproducing layer is less than the compensation temperature Tcomp, then the magnetization of the rare earth metal in the reproducing layer is dominant, and it is parallel to the magnetization direction of the recording layer of the transfer source (the magnetization of the transition metal is dominant). Subsequently, when the temperature of the reproducing layer exceeds the compensation temperature Tcomp by radiating the high power laser in accordance with the reproducing method of the present invention, the magnetic moment of the transition metal in the reproducing layer is dominant. It is appreciated that the following expressions (c1) and (c2) hold according to the relative magnitude of the magnetic temperature curves A and B of the reproducing layer and the recording layer in the area (c) shown in FIG. 20.

$$Hr < Hex + Ht - Hw \qquad (c1)$$

$$Hr < Hex - Ht - Hw \qquad (c2)$$

That is, the coercive force Hr of the magnetic domain 201b is smaller than the entire magnetic field (Hex+Ht−Hw or Hex−Ht−Hw) in the recording direction acting on the magnetic domain 201b. As a result, when the temperature of the reproducing layer is not less than the compensation temperature Tcomp (exactly, when it is not less than T2), the dominant magnetic moment of the transition metal is inverted to be directed in the recording direction as shown in FIG. 22(b). Therefore, the magnetic moment of the rare earth metal in the downward direction of the magnified magnetic domain 201b shown in FIG. 21(a) (3) is inverted in the area which is heated to the temperature not less than the temperature of the area (c), i.e., not less than the compensation temperature Tcomp. Thus, the inverted magnetic domain 201c is generated (FIG. 21(a) (4)). The magnetic domains 201d, 201d', which are disposed on the both sides of the inverted magnetic domain 201c, have their temperatures ranging from T1 to T2. Therefore, the magnetic domains 201d, 201d' have the same magnetization direction as that of the magnified magnetic domain 201b.

In the reproducing method according to the present invention, the three temperature areas (a) to (c) can be achieved by modulating the reproducing light power to have at least the two power levels $Pr_1$ and $Pr_2$ as shown in FIG. 21(b). That is, the light power $Pr_1$ of the reproducing light beam may be the power for heating the auxiliary magnetic layer to the temperature of Tcr to Tcomp and making it possible to transfer the recording magnetic domain in the magneto-optical recording film to the reproducing layer and magnify the magnetic domain. The light power $Pr_2$ of the reproducing light beam may be the power for heating the auxiliary magnetic layer to the temperature of Tcomp to Tco and reducing or extinguishing the magnified magnetic domain as described above. The $Pr_1/Pr_2$ power-modulated reproducing light beam is used as the reproducing light beam in synchronization with the reproducing clock. Thus, the recording magnetic domain in the recording layer can be subjected to reproduction through the steps of i) transfer to the reproducing layer, ii) magnification of the transferred magnetic domain, and iii) extinguishment of the magnified magnetic domain.

In the reproducing method based on the principle described above, it is preferable to use a magneto-optical recording medium having at least a magneto-optical recording film on a substrate, the magneto-optical recording medium comprising the magneto-optical recording film having perpendicular magnetization and an auxiliary magnetic film to cause transition from an in-plane magnetizable film to a perpendicularly magnetizable film when a temperature exceeds a critical temperature Tcr with a non-magnetic film intervening therebetween, wherein a relationship of room temperature<Tcr<Tcomp<Tco<Tc holds concerning a Curie temperature Tco of the magneto-optical recording film and a Curie temperature Tc and a compensation temperature Tcomp of the auxiliary magnetic film, and wherein under a condition in which an external magnetic field Hex is applied to the magneto-optical recording medium, a temperature curve A of a transfer magnetic field which is generated by the external magnetic field Hex and the magneto-optical recording film, and a temperature curve B of a coercive force of the auxiliary magnetic film in a perpendicular direction intersect at a point between room temperature and the compensation temperature Tcomp of the auxiliary magnetic film, and the temperature curve A and the temperature curve B intersect at a point between the compensation temperature Tcomp of the auxiliary magnetic film and the Curie temperature Tco of the magneto-optical recording film.

Next, explanation will be made for specified embodiments of the magneto-optical recording medium and specified reproducing methods therefor as explained in the principle of the reproducing method described above. A glass substrate was used as a transparent substrate 1 of the magneto-optical recording medium 900 shown in FIG. 23. A transparent resin film 2, onto which a preformat pattern is transferred, is formed on one surface of the glass substrate. A dielectric film 3 is composed of SiN, and it is formed to have a film thickness for causing multiple interference with the reproducing laser beam so that the apparent Kerr rotation angle is increased. An auxiliary magnetic film 8 is composed of a ferri-magnetic amorphous alloy GdFeCo comprising rare earth and transition metals. The auxiliary magnetic film 8 exhibits the in-plane magnetic anisotropy at a temperature from room temperature to a certain critical temperature $T_{CR}$ not less than room temperature, and it exhibits the perpendicular magnetic anisotropy at a temperature not less than $T_{CR}$. A non-magnetic film 9 is composed of SiN, and it is inserted to magnetostatically couple the auxiliary magnetic film 8 and a magneto-optical recording film 10. The magneto-optical recording film 6 is composed of a ferri-magnetic amorphous alloy TbFeCo comprising rare earth and transition metals, and it has the perpendicular magnetic anisotropy at a temperature from room temperature to the Curie temperature. A protective film 7 is composed of SiN, and it is provided to protect the thin films stacked between the substrate 1 and the protective film 7, from chemical harmful influences such as corrosion.

The dielectric film 3, the auxiliary magnetic film 8, the non-magnetic film 9, the magneto-optical recording film 10, and the protective film 7 were formed as films to have the following film thicknesses by means of continuous sputtering by using a magnetron sputtering apparatus respectively. The dielectric film 3 had a thickness of 60 nm, the auxiliary magnetic film 8 had a thickness of 60 nm, the non-magnetic film 9 had a thickness of 20 nm, the magneto-optical recording film 10 had a thickness of 50 nm, and the protective film 7 had a thickness of 60 nm.

The composition of TbFeCo for constructing the magneto-optical recording film 10 is $Tb_{21}Fe_{66}Co_{13}$ as represented by an atomic % ratio to exhibit a characteristic such that the magnetization component of the transition metal is more dominant than the magnetization component of the rare earth at a temperature from room temperature to the Curie temperature $T_{CO}=270°$ C. On the other hand, the composition of GdFeCo for constructing the auxiliary magnetic film 8 is $Gd_{28}Fe_{53}Co_{19}$ as represented by an atomic % ratio to exhibit, as a single layer film, a temperature-dependent characteristic of the Kerr rotation angle as shown in FIG. 24.

Figure 24:
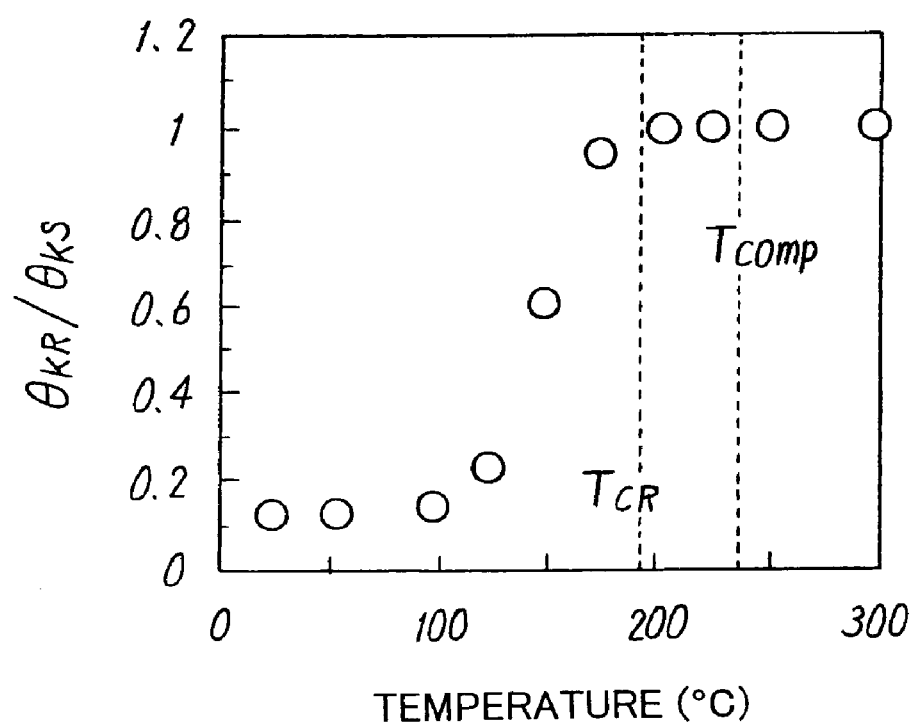
FIG. 24 shows a graph illustrating a temperature-dependent characteristic of the Kerr effect of an auxiliary magnetic film of the magneto-optical recording medium produced in the embodiment of the present invention.

With reference to FIG. 24, the horizontal axis denotes the temperature, and the vertical axis denotes the ratio $\theta_{KR}/\theta_{KS}$ of the remaining Kerr rotation angle $\theta_{KR}$ to the saturated Kerr rotation angle $\theta_{KS}$ of the GdFeCo auxiliary magnetic film 8 determined from the hysteresis of the Kerr rotation angle with respect to the temperature. According to this graph, the critical temperature $T_{CR}$, at which the auxiliary magnetic film 8 is converted from the in-plane magnetizable film into the perpendicularly magnetizable film, is about 200° C. The auxiliary magnetic film 8 has a Curie temperature Tc of not less than 300° C., and it has a compensation temperature $T_{comp}$ between room temperature $T_{room}$ and the Curie temperature, in which $T_{comp}$ is about 230° C. The following relationship is given concerning the critical temperature $T_{CR}$, the compensation temperature $T_{comp}$, and the Curie temperature Tc of the auxiliary magnetic film 8, and the Curie temperature $T_{CO}$ of the magneto-optical recording film 10. $T_{room}<T_{CR}<T_{comp}<T_{CO}<Tc$. By satisfying this condition, it is extremely easy to perform reproduction by using the power-modulated pulse light beam as described later on.

[Preparatory Experiment for Determining Intensity of Reproducing Laser Pulse]

In the reproducing method of the present invention, the recording magnetic domain is magnified to perform reproduction by using the pulse light beam obtained by power-modulating the laser power to have the high power Pr2 and the low power Pr1. Accordingly, a preparatory experiment is firstly performed to determine the optimum laser powers of Pr2 and Pr1 for reproducing data recorded on the magneto-optical recording medium 900. In this preparatory experiment, a magneto-optical drive comprising an optical system having a laser beam wavelength of 680 nm and a numerical aperture of 0.55 is used to radiate recording and reproducing laser beams onto the side of the substrate 1 (side of the auxiliary magnetic film 8). A continuous light beam is used as the reproducing laser beam as described later on. The reproducing laser beam is changed to have various powers to observe respective reproduced signal waveforms.

A laser beam having a recording power of 4.5 mW was modulated with a cycle of 640 ns and a pulse width of 213 ns at a linear velocity of 5.0 m/s for a track disposed at a radius of 40 mm of the previously initialized magneto-optical recording medium 900 to perform optical modulation recording while applying a recording magnetic field of 500 Oe. Accordingly, recording marks each having a length of about 1.6 μm were continuously recorded at a pitch of 3.2 μm on the track.

Subsequently, the track recorded with the recording marks was subjected to reproduction with continuous light beams having various reproducing powers Pr. In order to determine the optimum modulation condition for the reproducing power, the value of the power Pr of the continuous light beam was changed to be at five levels, i.e., Pr=1.0 mW, 1.5 mW, 1.9 mW, 2.0 mW, and 2.1 mW to determine reproduced signals respectively. No magnetic field was actively applied to the magneto-optical recording medium 900 during the reproduction. However, a leakage magnetic field (about 800 Oe), which leaked from the actuator of the optical head, was generated in the recording direction.

Figure 25A:
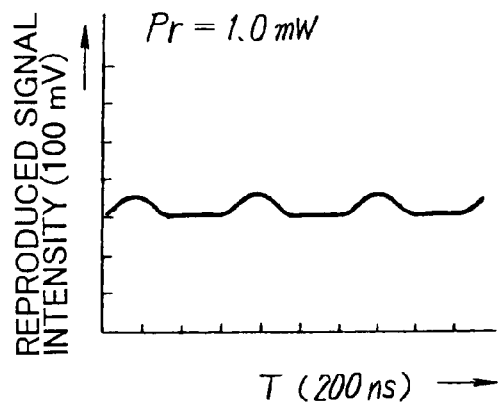
FIG. 25 shows graphs (A) to (E) illustrating reproduced signal waveforms observed on an oscilloscope when the magneto-optical recording medium obtained in the tenth embodiment of the present invention is subjected to reproduction with continuous light beams having various reproducing powers.
Figure 25B:
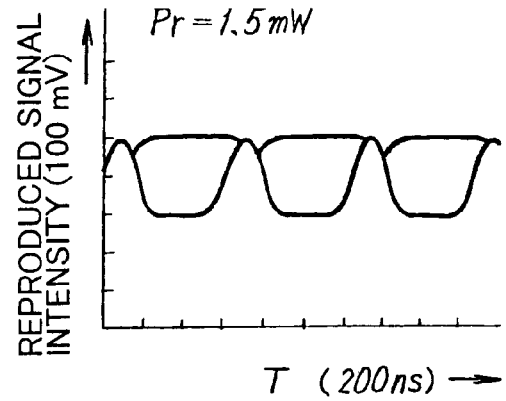

FIGS. 25A to 25E show reproduced signal waveforms obtained when the recording track of the magneto-optical recording medium 900 was subjected to reproduction with the respective reproducing powers Pr as described above. In this experiment, the reproduced signal waveform itself was subjected to triggering to observe the waveform by using an oscilloscope. FIG. 25A shows a reproduced signal waveform obtained for the reproducing light power Pr=1.0 mW, from which it is understood that the reproduced signal arises corresponding to the pattern of the recording mark. On the graph, the base line indicates an erased state, and the rising peak signal indicates a recording state. The amplitude between the recording state and the erased state was 50 mV. When the reproducing light power was increased to Pr=1.5 mW, the signal amplitude was increased to about 200 mV as shown in FIG. 25B. According to the waveform shown in FIG. 25B, it is understood that the adjoining peak signals are continuous on the side of the recording state in a part of the area of the waveform.

Figure 25C:
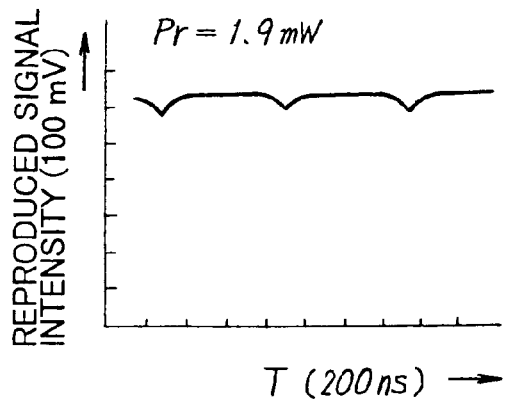
Figure 25D:
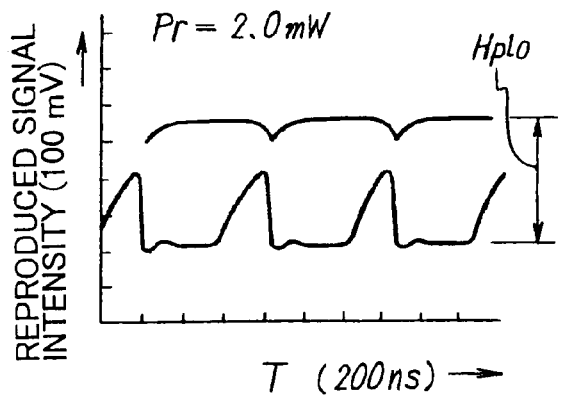
Figure 25E:
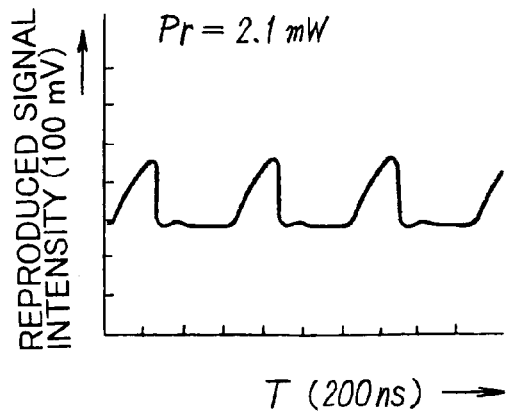

FIG. 25C shows a reproduced signal waveform for the reproducing power of Pr=1.9 mW, indicating that the peak signals are completely continuous on the side of the recording state (at an upper portion in the drawing). This result demonstrates that the magnetic domain is magnified in the auxiliary magnetic film as described later on, and the magnified magnetic domain undergoes movement on the track in accordance with the scanning for the track with the reproducing light spot. When the reproducing light power is further increased to Pr=2.0 mW, the peak signals having been continuous begin to be discontinuous as shown in FIG. 25D. In this case, the amplitude $H_{plo}$ between the connected portion of the peak signal and the base line was about 350 mV. When the reproducing light power was further increased up to Pr=2.1 mW, the peak signal is completely discontinuous as shown in FIG. 25E, giving a waveform corresponding to the recording mark pattern. In FIG. 25E, the amplitude between the recording state and the erased state was 200 mV.

Figure 26A:
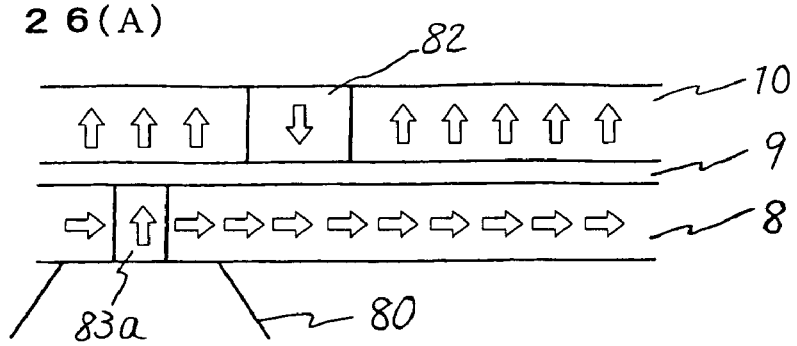
FIG. 26 conceptually illustrates magnetization states (A) to (C) of the respective layers of the magneto-optical recording medium when the signal waveform shown in FIG. 25(A) is obtained.
Figure 26B:
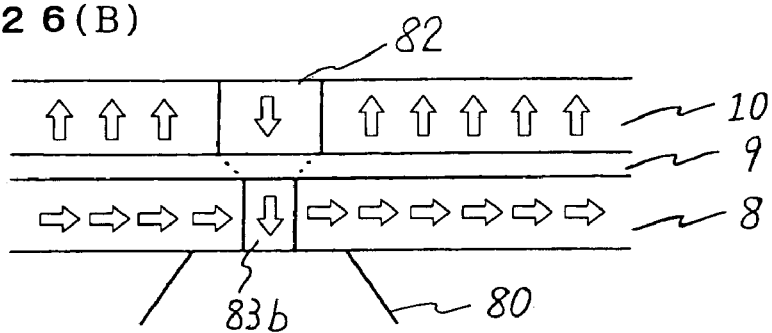

The magnetization states of the auxiliary magnetic film 8 and the magneto-optical recording film 10 stacked with the non-magnetic film 9 intervening therebetween, which are given when the reproduced signal waveforms shown in FIGS. 25A to 25E are obtained, will be explained with reference to conceptual drawings shown in FIGS. 26 to 28. FIG. 26 shows a situation in which the signal waveform shown in FIG. 25A is obtained (reproducing light power Pr=1.0 mW), illustrating the relationship between the reproducing light spot 80 and the directions of magnetization of the auxiliary magnetic film 8 and the magneto-optical recording film 10 irradiated with the reproducing light spot 80. At first, the auxiliary magnetic film 8, which is irradiated with the reproducing light spot 80 as shown in FIG. 26A, exhibits perpendicular magnetization in an area in which its temperature is raised to be not less than the critical temperature $T_{CR}$. The magnetization of the magneto-optical recording film 10 is transferred to an area 83a of the auxiliary magnetic film 83a by the aid of the magnetostatic coupling. As shown in FIG. 26B, when the reproducing light spot 80 is disposed just under a magnetic domain (recording magnetic domain) 82 in which the magnetization is directed in the recording direction, the magnetization of the recording magnetic domain 82 is transferred to the auxiliary magnetic film 8 by the aid of the magnetostatic coupling. In this case, the reproducing light power Pr is 1.0 mW which is low. Therefore, only the central portion of the auxiliary magnetic film 8 within the light spot 80, i.e., only the area 83b has the temperature which exceeds the critical temperature $T_{CR}$. The transferred area 83b of the auxiliary magnetic film 8 is not magnified to be larger than the width of the recording magnetic domain 82. Accordingly, as shown in FIG. 25A, the reproduced signal intensity is small. When the reproducing light spot 80 passes over the recording magnetic domain 82, a transferred area 83c has the same direction of magnetization as that of the magnetic domain in the magneto-optical recording film 10 located just thereover, as a result of transfer from the magnetic domain in the magneto-optical recording film 10 located just thereover.

Figure 27A:
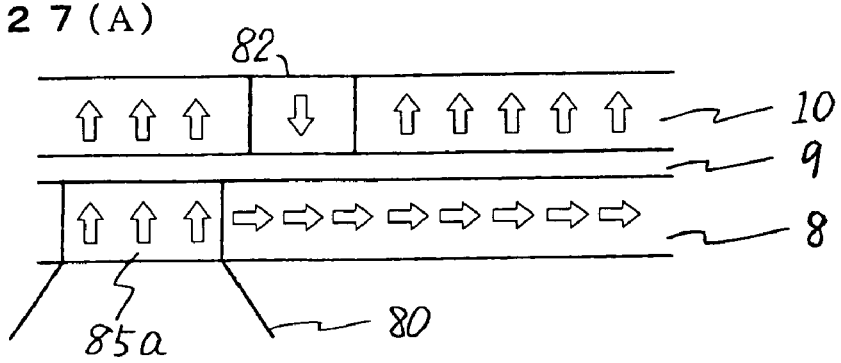
FIG. 27 conceptually illustrates magnetization states (A) to (C) of the respective layers of the magneto-optical recording medium when the signal waveform shown in FIG. 25(C) is obtained.
Figure 27B:
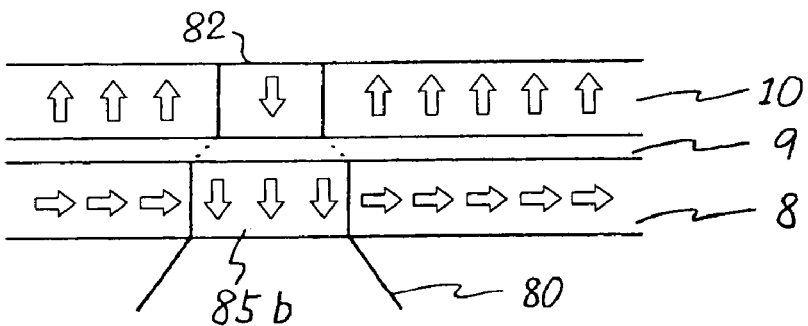

FIG. 27 shows a situation in which the signal waveform shown in FIG. 25C is obtained (reproducing light power Pr=1.9 mW), illustrating the relationship between the reproducing light spot 80 and the directions of magnetization of the auxiliary magnetic film 8 and the magneto-optical recording film 10 irradiated with the reproducing light spot 80. In this case, the reproducing light power is 1.9 mW which is relatively large. Therefore, as shown in FIG. 27A, an entire area 85a within the spot in the auxiliary magnetic film 8 irradiated with the reproducing light spot 80 has a temperature raised to be not less than the critical temperature $T_{CR}$, giving perpendicular magnetization. The magnetic domain in the magneto-optical recording film 10 is transferred to the area 85b by the aid of the magnetostatic coupling effected by the magneto-optical recording film 10. When the reproducing light spot 80 is subjected to scanning to locate the reproducing light spot 80 just under the recording magnetic domain 82 as shown in FIG. 27B, the magnetization of the recording magnetic domain 82 is transferred. In this case, the area 85b of the auxiliary magnetic film 8, which is heated to a temperature not less than the critical temperature $T_{CR}$, has its width larger than the recording magnetic domain 82. Accordingly, the recording magnetic domain 82 is transferred while being magnified in the auxiliary magnetic film 8. The large signal waveform is obtained owing to the magnification of the magnetic domain. After the reproducing light spot 80 passes over the recording magnetic domain 82, the area 85c maintains the same magnetization state as that of the area 85b. Therefore, the waveform, in which the reproduced signal peaks are continuous as shown in FIG. 25C, is obtained.

Figure 26C:
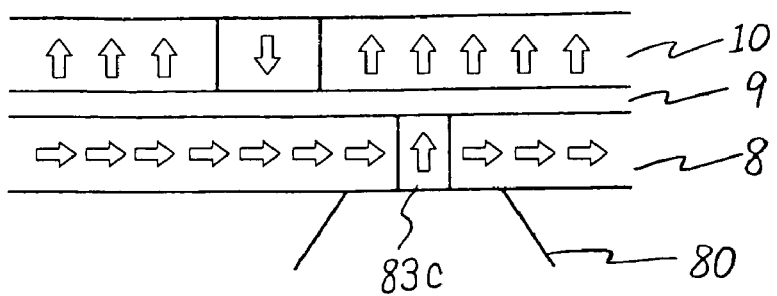
Figure 27C:
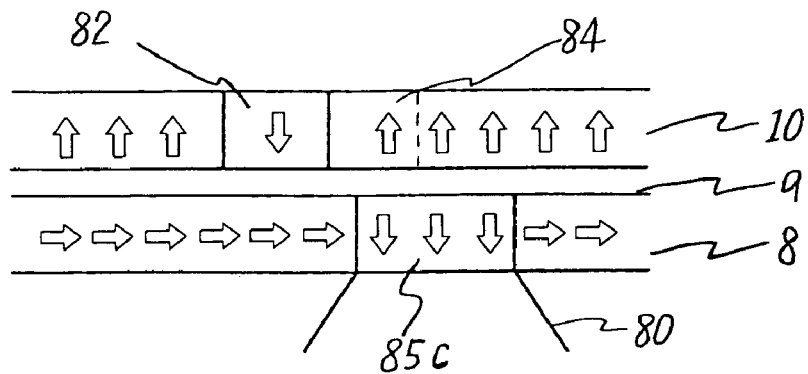

In the case of the situation shown in FIG. 27, the area 85c maintains the same magnetization state as that of the area 85b after the reproducing light spot 80 passes over the recording magnetic domain 82. A phenomenon arises, in which the light spot draws the recording magnetic domain which is transferred to the auxiliary magnetic layer to be subjected to the magnetic domain transfer and the magnetic domain magnification. The reason for this phenomenon is considered to be as follows. The temperature of the auxiliary magnetic layer 8 is raised to be not less than the critical temperature by being irradiated with the reproducing laser beam, and the auxiliary magnetic layer 8 is converted into the perpendicularly magnetizable film having the coercive force Hc in the perpendicular direction. During the reproduction, the auxiliary magnetic film 8 is applied with the external magnetic field Hex (in the recording direction, i.e., in the downward direction in this embodiment) which is caused by the leakage magnetic field, for example, from the actuator of the optical head, and the static magnetic field Hs which is generated from the magnetization of the magneto-optical recording film 10 at a temperature not less than the critical temperature of the auxiliary magnetic film 8. The applied magnitude is Hex+Hs (when the magnetization of the recording magnetic domain is in the downward direction) or Hex−Hs (when the magnetization of the recording magnetic domain is in the upward direction) depending on the direction of the magnetization of the magneto-optical recording film 10. If the absolute value of Hc is larger than the absolute value of (Hex+Hs) or the absolute value of (Hex−Hs) concerning the magnitude of the combined magnetic field of the external magnetic field Hex and the static magnetic field Hs and the coercive force Hc of the auxiliary magnetic film 8, the magnetization formed in the auxiliary magnetic film 8 is maintained as it is. As shown in FIG. 27C, the magnetic domain, which is once transferred to the auxiliary magnetic film, does not cause reinversion even when the reproducing spot proceeds to the area in which no recording magnetic domain exits in the magneto-optical recording film 10. Hc is the coercive force in the perpendicular direction, obtained when the auxiliary magnetic film 8 is in the perpendicular magnetization state. In the case of the situation shown in FIG. 26, Hc of the auxiliary magnetic film is lower than that in FIG. 27, because the temperature of the auxiliary magnetic layer subjected to transfer by the low reproducing power is relatively low. Accordingly, the magnetic domain transferred to the auxiliary magnetic film 8 causes reinversion when the reproducing spot proceeds to the area in which no recording magnetic domain exists in the magneto-optical recording film 10 (FIG. 26C).

Figure 28A:
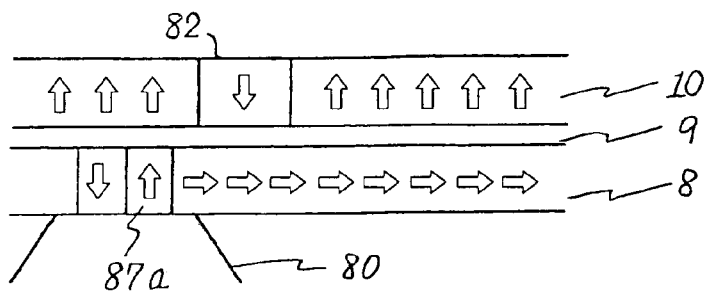
FIG. 28 conceptually illustrates magnetization states (A) to (C) of the respective layers of the magneto-optical recording medium when the signal waveform shown in FIG. 25(E) is obtained.
Figure 28B:
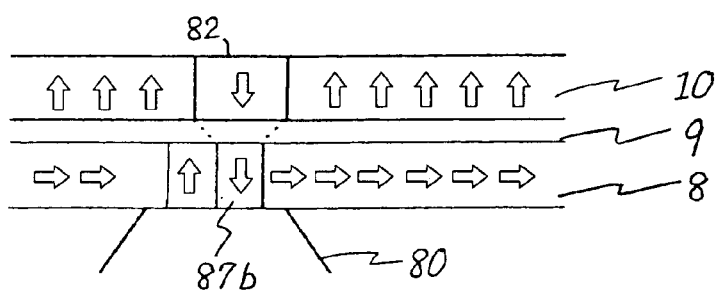
Figure 28C:
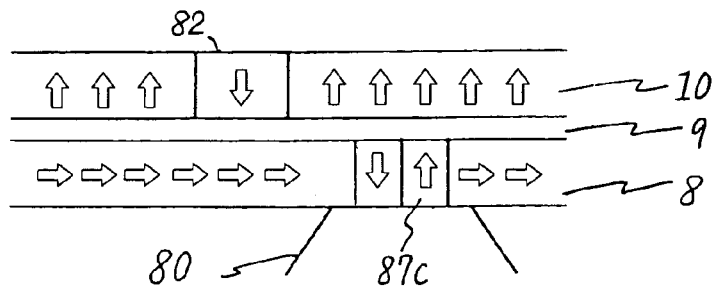

FIG. 28 shows a situation in which the signal waveform shown in FIG. 25E is obtained (reproducing light power Pr=2.1 mW), illustrating the relationship between the reproducing light spot 80 and the directions of magnetization of the auxiliary magnetic film 8 and the magneto-optical recording film 10 irradiated with the reproducing light spot 80. In this case, the reproducing light power is 2.1 mW which is relatively large. Therefore, a front portion area 87a within the spot in the auxiliary magnetic film 8 irradiated with the reproducing light spot 80 has a temperature raised to be not less than the critical temperature $T_{CR}$, giving perpendicular magnetization, and it is subjected to magnetic domain transfer of the magnetic recording layer 10 located just thereunder. However, the central portion and the back portion within the spot are heated intensely as compared with the front portion to exceed the compensation temperature Tcomp of the auxiliary magnetic film 8. Therefore, it is considered that a state is given, in which the magnetization is inverted. Accordingly, as shown in FIG. 28A, only the area 87a, which is disposed at the front portion of the auxiliary magnetic film within the reproducing light spot 80, has the magnetization in the upward direction, and the central portion and the back end portion have the magnetization in the downward direction.

Subsequently, when the track is subjected to scanning with the reproducing light beam so that the spot 80 is located just under the recording magnetic domain 82, the magnetization of the recording magnetic domain 82 is transferred to only the area 87b having the relatively low temperature disposed at the front portion of the auxiliary magnetic film 8. Therefore, no magnetic domain magnification occurs. It is impossible to obtain the signal as shown in FIG. 25C having the large reproduced signal intensity. When the reproducing light spot 80 passes over the recording magnetic domain 82, the transfer area 87c includes the magnetization having the same direction as that of the magnetic domain in the magneto-optical recording film 10 disposed just thereover and the inverted magnetic domain thereof in a mixed manner by the aid of the magnetostatic coupling effected by the magneto-optical recording film 10.

In the case of the situation shown in FIG. 27 (FIG. 25C), the reproduced signal intensity is increased, because the magnetic domain magnification occurs in the auxiliary magnetic film 8 as described above. The magnetic domain 85b, which is magnified from the recording magnetic domain 82, is moved together with the reproducing light spot 80 while being magnified. However, in the situation shown in FIG. 27C, when the center of the reproducing light spot 80 is located just under a magnetic domain 84 adjacent to the recording magnetic domain 82, it is necessary to avoid the phenomenon in which the magnified magnetic domain is drawn by the light spot, in order to reproduce the magnetization of the magnetic domain 84 by the aid of the auxiliary magnetic layer 8. That is, it is necessary to erase the magnified magnetic domain 85c of the recording magnetic domain 82 and transfer the magnetization of the magnetic domain 84 to the auxiliary magnetic layer 8 followed by magnification.

On the other hand, as shown in FIG. 26 (corresponding to FIG. 25A) and FIG. 28 (corresponding to FIG. 25E) respectively, when the reproducing power Pr is relatively small (reproducing light power Pr=1.0 mW), and when the reproducing power Pr is relatively large (reproducing light power Pr=2.1 mW), the magnetic domain 83b (87b) transferred from the recording magnetic domain 82 is extinguished after the reproducing light spot 80 passes over the recording magnetic domain 82. That is, the phenomenon, in which the magnified magnetic domain is drawn, does not take plate. Therefore, if the reproducing light beam to be used is a pulse light beam which is power-modulated at a reproducing clock cycle or at a cycle of an integral multiple thereof between the reproducing light power Pr=1.9 mW at which the magnetic domain magnification occurs and the reproducing light power Pr=2.1 mW (or 1.0 mW) at which the magnetic domain magnification does not occur, the magnetic domain can be magnified, and then the magnified magnetic domain can be extinguished when the center of the reproducing light spot is moved from the recording magnetic domain in the magneto-optical recording film onto the adjacent recording magnetic domain.

According to the result of the preparatory experiment described above, if the reproducing laser beam is applied as the pulse light beam which is intensity-modulated between Pr=1.9 mW as shown in FIG. 25C and Pr=2.1 mW as shown in FIG. 25E, the reproduced signal is detected as a difference between the reproduced signal intensities obtained as shown in FIG. 25C and FIG. 25E. The difference is considered to correspond to $H_{plo}$=350 mV shown in FIG. 25D, suggesting that the reproduction can be performed with an amplitude which is larger than the amplitudes obtained in FIGS. 25A and 25E. Therefore, in the following experiment of reproduction based on the use of the reproducing light pulse, the high power Pr2 is set to be Pr2=2.1 mW, and the low power Pr1 is set to be Pr1=1.9 mW.

[Reproducing Method on Magneto-optical Recording Medium with Power-modulated Pulse Light Beam]

After the magneto-optical recording medium 900 produced in this embodiment was initialized, a laser beam having a recording power of 6.3 mW was modulated with a cycle of 320 ns and a pulse width of 53.3 ns to perform optical modulation recording with a recording magnetic field of 500 Oe, at a linear velocity of 5.0 m/s for a track disposed at a radius of 40 mm. This corresponds to a condition in which recording marks of about 1.6 μm were continuously recorded at a pitch of 3.2 μm.

The recording track of the magneto-optical recording medium 900 thus subjected to the recording is irradiated with the power-modulated pulse laser having the reproducing light laser powers of $P_H$, i.e., (Pr2)=2.1 mW and $P_L$, i.e., (Pr1)=1.9 mW as determined by the preparatory experiment so that reproduction is performed. The high power $P_H$ is a power for the erasing, and $P_L$ is a low power f,or magnification and reproduction. The lower power $P_L$ is selected to be a power to cause the phenomenon as shown in FIG. 27(C). Therefore, a magnified reproduced signal obtained from a specified magnetic domain is continuously reproduced unless the light beam is irradiated at the high power $P_H$.

Figure 29:
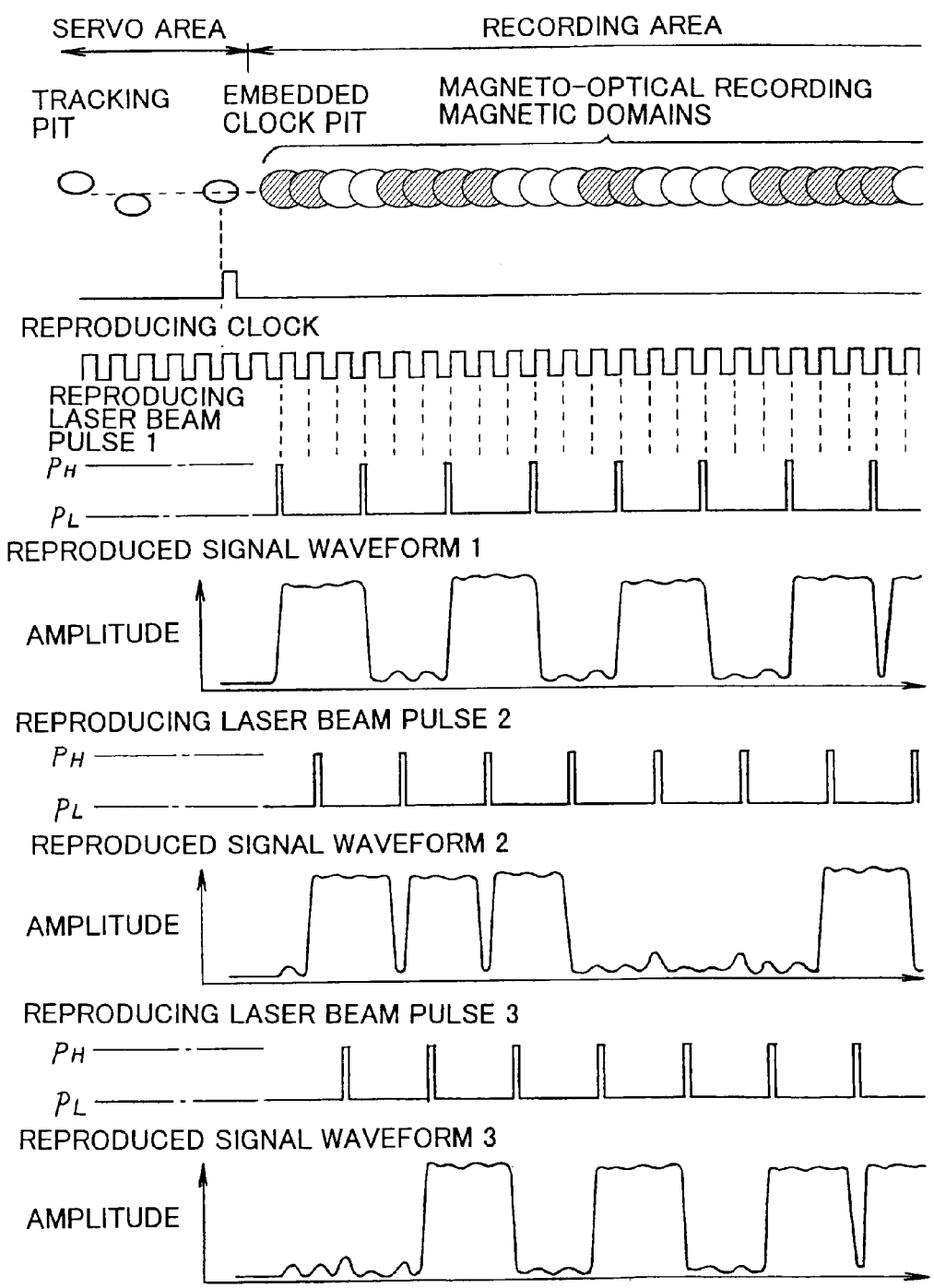
FIG. 29 shows a timing chart illustrating a method for reproducing information by repeating application of a high power reproducing light beam at every three clock cycles under a DC magnetic field while deviating the phase by one clock three times by using the magneto-optical recording medium described in the tenth embodiment.

In this embodiment, as shown by a reproducing laser pulse in a timing chart in FIG. 29, the high power $P_H$ is radiated at every three recording clocks (reproducing clocks). By doing so, as shown by a reproduced signal waveform 1, when one recording magnetic domain A is magnified and reproduced by the low power laser $P_L$, the magnetic domain of the recording magnetic domain A is continuously reproduced until the high power $P_H$ is next radiated, i.e., until the reproduction is performed for the magnetic domain which is disposed downstream in an amount of two clocks from the concerning reproduced magnetic domain A. Therefore, the magnetic domain is reproduced at every three clocks. However, the reproduced signal is obtained in a continuous form during the three clocks. After the recording area is subjected to the reproduction as described above, the reproducing laser beam $P_H/P_L$ is radiated in a pattern as shown by a reproducing laser pulse 2 such that the high power $P_H$ is radiated at every three recording clocks (reproducing clocks) while the phase is delayed by an amount of one clock as compared with the reproducing laser pulse 1. After the reproduction effected with the reproducing laser pulse 2, the reproducing laser beam $P_H/P_L$ is radiated in a pattern as shown by a reproducing laser pulse 3 such that the high power $P_H$ is radiated at every three recording clocks (reproducing clocks) while the phase is delayed by an amount of two clock as compared with the reproducing laser pulse 1. Thus, the recording area of the magneto-optical recording medium 900 is irradiated with the reproducing light beam with the power of $P_L$ so that the high power $P_H$ laser is radiated at the cycle which is three times the recording clock while the phase is deviated by one clock from each other. In this embodiment, the duty of the reproducing light beam was adjusted as follows concerning the cycle of radiation of the high power $P_H$. That is, $P_H$ (=2.1 mW) was radiated at a pulse width of 10 ns from the frontward end of the recording mark, followed by $P_L$ (=1.9 mW) at a pulse width of 150 ns. The magnetic field was not applied actively during the reproduction. However, the leak magnetic field (about 80 Oe) was generated in the recording direction from the actuator of the optical head.

Reproduced signal waveforms, which are obtained by the reproduction by using the reproducing laser pulses 1 to 3, are shown as reproduced signal waveforms 1 to 3. In any case, the magnetic domain is reproduced at every three clocks. However, the reproduced signal is obtained in the continuous form during the period of three clocks. Accordingly, it is possible to improve C/N of the reproduced signal. In this experiment, the improvement in the reproduced C/N of about 8 dB was confirmed. As for the reproduced signal intensity, the amplitude was about 220 mV corresponding to the recording mark. On the contrary, mark patterns, which were recorded under the same condition, were reproduced by using continuous light beams having constant reproducing powers of Pr=1.0 mW and Pr=2.1 mW. As a result, the amplitudes were 100 mV and 170 mV respectively.

According to the result described above, even in the case of the magnetic domain subjected to the high density recording, the respective reproduced signals are obtained over the period of time longer than the period of time corresponding to the reproduction based on the respective recording clocks, by thinning the recording clock to perform the plurality times of reproduction. Therefore, it is understood that C/N can be improved. In order to deal with the reproduced signal waveforms 1 to 3 as reproduced information as they are, the information may be recorded by using the precoding method as described in the sixth embodiment.

In this embodiment, the respective pulse laser intensities, i.e., the high power $P_H$=2.1 mW and the low power $P_L$=1.9 mW were selected. The low power pulse was used to generate the magnified magnetic domain, and the high power pulse was used to extinguish the magnified magnetic domain. However, the high power pulse may be $P_H$=1.9 mW to generate the magnified magnetic domain, and the low power pulse may be $P_L$=1.0 mW to extinguish the magnified magnetic domain. The pulse width ratio between the high power pulse and the low power pulse, i.e., the duty may be appropriately changed in order to obtain an enhanced reproduced signal.

The magneto-optical recording medium produced in this embodiment may comprise a heat control layer having an appropriate heat conductivity disposed on the protective film of the magneto-optical recording medium, in order to give a desired shape for the temperature profile of the medium obtained when the reproducing light beam is radiated, or in order to decrease the linear velocity dependency of the temperature profile. Further, in order to obtain a better reproducing CN ratio, it is also allowable to add, between the dielectric film 3 and the auxiliary magnetic film 8, a reproducing magnetic film which is a perpendicularly magnetizable film at a temperature not less than room temperature in which the Kerr rotation angle θk is not less than θk of the auxiliary magnetic film at the maximum arrival temperature of the medium when the reproducing light beam is radiated.

[Second Reproducing Method on Magneto-optical Recording Medium with Power-modulated Pulse Light Beam]

In the foregoing embodiment of the reproducing method, the leakage magnetic field generated from the magnetic head during reproduction is applied to the magneto-optical recording medium. In this embodiment, reproduction is performed while actively applying a DC magnetic field in the same direction as the magnetization direction of the recording magnetic domain. Reproduction was performed in this embodiment by modulating the laser beam intensity as well in order to realize magnification and extinguishment of the transferred magnetic domain. This embodiment is based on the use of the magneto-optical disk 900 as shown in FIG. 18, in which the GdFeCo reproducing layer 8 has a critical temperature Tcr of 175° C. and a Curie temperature Tc of 340° C. The GdFeCo reproducing layer 8 has a compensation temperature Tcomp=240° C. between the critical temperature Tcr and the Curie temperature Tc. The TbFeCo recording layer 10 has its Curie temperature Tco of 270° C. and its compensation temperature of not more than room temperature. That is, there is given the relationship of Troom<Tcr<Tcomp<Tco<Tc. The relationship concerning the temperatures has been explained with reference to FIG. 20.

The reproducing laser power was modulated to have two power levels of 1.5 mW as the low power $P_L$ to magnify the magnetic domain, and 3.5 mW as the high power $P_H$ to reduce (or extinguish) the magnetic domain.

The reproducing condition in the embodiment described above may be explained as follows in relation to FIG. 20 used to explain the principle. That is, the reproducing layer is heated by the low power $P_L$ of the power-modulated reproducing light beam to be in the temperature areas (areas (a) and (b)) shown in FIG. 20 in which the magnetic domain transfer and the magnetic domain magnification are caused, i.e., up to Tcr=175° C. to Tcomp=240° C. The recording layer is heated by the high power $P_H$ to be in the temperature area (area (c)) shown in FIG. 20 in which the magnetic domain extinguishment is caused, i.e., from a temperature exceeding Tcomp (240° C.) to Tco=270° C. The direct current magnetic field of about 80 Oe applied in the recording direction allows the magnetic temperature curves A and B to be disposed so that the relationship as shown in FIG. 20 is given. That is, the relationship between the magnetic temperature characteristic of the magneto-optical disk used in this embodiment and the applied direct current magnetic field satisfies the following requirements (3) and (4). The requirements necessary for the reproducing method described in this embodiment will be enumerated below. The magnetic characteristics of the reproducing layer and the recording layer of the magneto-optical recording medium used in this embodiment satisfy the following requirements (1) and (2) as described above.

(1) The reproducing layer, which is magnetized in the film surface direction at least at room temperature, has the compensation temperature Tcomp between the Curie temperature Tco and the critical temperature Tcr to cause magnetization in the perpendicular direction.

(2) The Curie temperature Tco of the recording layer exists at a temperature between the compensation temperature Tcomp of the reproducing layer and the Curie temperature Tco of the reproducing layer.

(3) The magnetic temperature curve A and the magnetic temperature curve B intersect at a point (T1) between room temperature and the compensation temperature Tcomp of the reproducing layer under the condition in which the external magnetic field Hex is applied in the recording direction.

(4) The magnetic temperature curve A and the magnetic temperature curve B intersect at a point (T2) between the compensation temperature Tcomp of the reproducing layer and the Curie temperature Tco of the recording layer.

In this embodiment, the foregoing requirements (1) to (4) are satisfied by constructing the magneto-optical disk with the specified materials shown in FIG. 18, and applying the DC magnetic field=80 Oe in the recording direction. However, arbitrary combinations may be used provided that the magneto-optical recording medium comprising the materials and the stacked structure and the magnitude of the external magnetic field applied during the reproduction are capable of satisfying the requirements (1) to (4). The direction of the DC magnetic field applied during the reproduction is not limited to the recording direction, which may be the erasing direction.

In the reproducing method of the present invention, the process of (a) magnetic domain transfer, (b) magnetic domain magnification, and (c) extinguishment of transferred magnetic domain is executed by modulating the reproducing light power intensity under the DC magnetic field. The period of time, in which the process is carried out, depends not only on the magnetic characteristics of the recording layer and the reproducing layer but also on the temperature rising velocity and the heat transfer velocity between the respective layers concerning, for example, the recording layer, the reproducing layer, the non-magnetic layer, the dielectric layer, and the protective layer, as well as other stackable magnetic layers, non-magnetic layers, and substrates. The velocities can be controlled by appropriately changing, for example, the stacked structure, the thickness, and the thermal conduction characteristics of the materials for constructing the layers. Accordingly, it is possible to respond to a desired reproducing access velocity.

It is preferable that the dielectric layer and the non-magnetic layer, which adjoin the reproducing layer (auxiliary magnetic layer), have appropriate degrees of thermal insulation properties. However, the degree of the thermal insulation property can be appropriately adjusted in relation to the thermal characteristics obtained by combining the access velocities upon recording and reproduction, the magnitude of the linear velocities upon recording and reproduction on the recording medium, and the thermal conduction characteristics of the reproducing layer and the recording layer.

The foregoing embodiment is illustrative of the structure in which the reproducing layer (auxiliary magnetic layer) of the magneto-optical recording medium is interposed by the dielectric layer and the non-magnetic layer. However, a magnetic member having magnetic anisotropy in the in-plane direction may be stacked in contact with the reproducing layer (auxiliary magnetic layer). It is desirable that the magnetic anisotropy in the in-plane direction is dominant in the magnetic member up to its Curie temperature, and the Curie temperature is approximately equal to the Curie temperature of the reproducing layer. When such a magnetic member is stacked in contact with the reproducing layer, it is possible to suppress occurrence of the Bloch line in the transferred magnetic domain during the reproduction, and it is possible to reduce the noise during the reproduction owing to its suppressing action. Those usable as materials for such a magnetic member include, for example, Pt—Co alloys such as Pt—Co alloys containing 25 atomic % of Co and GdFeCo alloys. Such a magnetic member may be stacked to make contact with any one of the upper and lower sides of the reproducing layer.

Eleventh Embodiment

The structures of a variety of magneto-optical recording media, to which the present invention is applicable, have been demonstrated. The present invention is also applicable to a magneto-optical recording medium having a structure described in this embodiment.

Reproduction is performed on this magneto-optical recording medium by modulating the laser beam intensity in order to realize magnification and extinguishment of the transferred magnetic domain, while applying a DC magnetic field in the same direction as the magnetization direction of the recording magnetic domain in the same manner as in the tenth embodiment.

Figure 30:
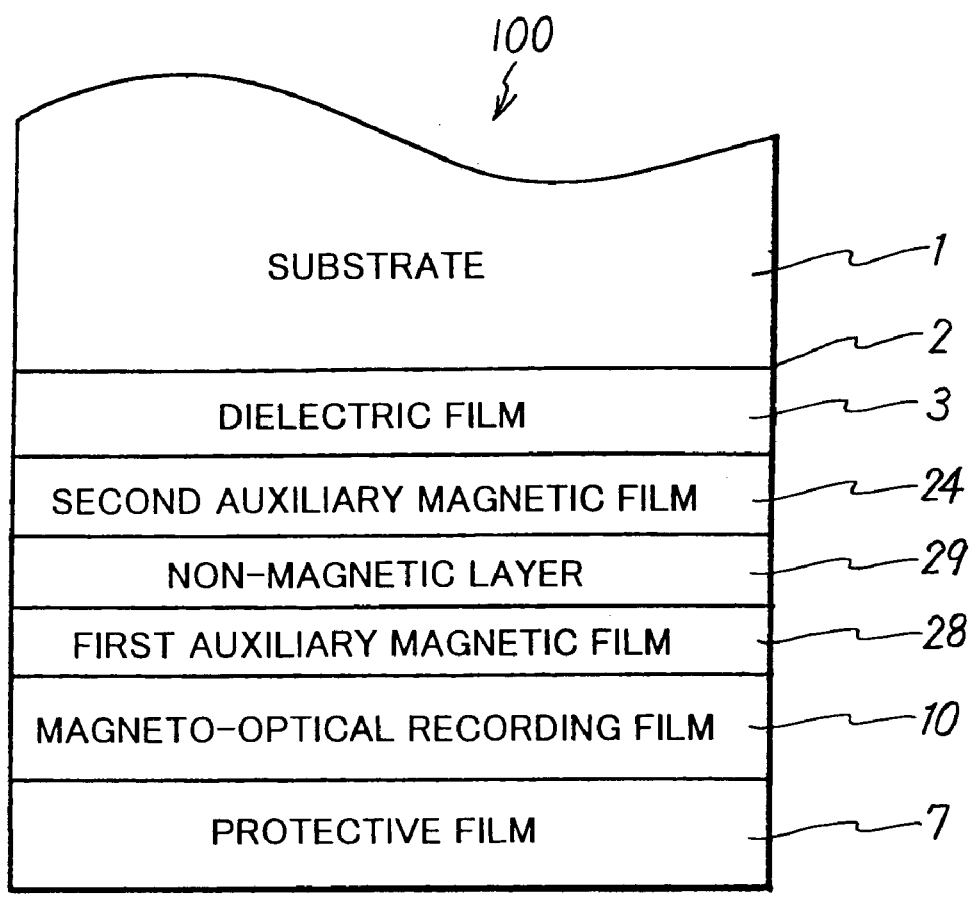
FIG. 30 shows a medium structure of a magneto-optical recording medium produced in an eleventh embodiment.

At first, explanation will be made for a magneto-optical disk used in this embodiment. As shown in FIG. 30, the magneto-optical disk 100 comprises, in a stacked manner on a surface of a polycarbonate substrate 1 formed with a preformat pattern 2, a dielectric layer 3 composed of SiN, a reproducing layer (second auxiliary magnetic film) 24 composed of a GdFeCo alloy, a non-magnetic layer 29 composed of SiN, a magnetic layer (first auxiliary magnetic film) 28 composed of a GdFeCo alloy, a recording layer (magneto-optical recording film) 10 composed of a TbFeCo alloy, and a protective layer 7 composed of SiN. The TbFeCo recording layer 10 and the GdFeCo reproducing layer 24 are magnetostatically coupled to one another through the non-magnetic layer 9 and the magnetic layer (first auxiliary magnetic film) 28 composed of the GdFeCo alloy.

The reproducing layer 24 composed of the GdFeCo alloy is a magnetic film which exhibits in-plane magnetization at room temperature and which causes transition to a perpendicularly magnetizable film at a temperature exceeding a critical temperature $Tcr_{12}$ higher than room temperature. In this embodiment, $Gd_{28}Fe_{56}Co_{16}$ is used as the reproducing layer 24, which behaves as an in-plane magnetizable film at room temperature and which is changed into a perpendicularly magnetizable film at a temperature exceeding the critical temperature $Tcr_{12}=175°$ C. The Curie temperature $Tc_2$ of the reproducing layer 24 is 340° C.

The magnetic layer 28 composed of the GdFeCo alloy is a magnetic film which exhibits perpendicular magnetization at room temperature and which causes transition to an in-plane magnetizable film at a temperature above a critical temperature $Tcr_{11}$ higher than room temperature. In this embodiment, $Gd_{21}Fe_{64}Co_{15}$ is used as the magnetic layer 28 composed of the GdFeCo alloy, which behaves as a perpendicularly magnetizable film at room temperature and which is changed into an in-plane magnetizable film at a temperature exceeding the critical temperature $Tcr_{11}=200°$ C. The Curie temperature $Tc_1$ of the magnetic layer 28 was 350° C.

Figure 31:
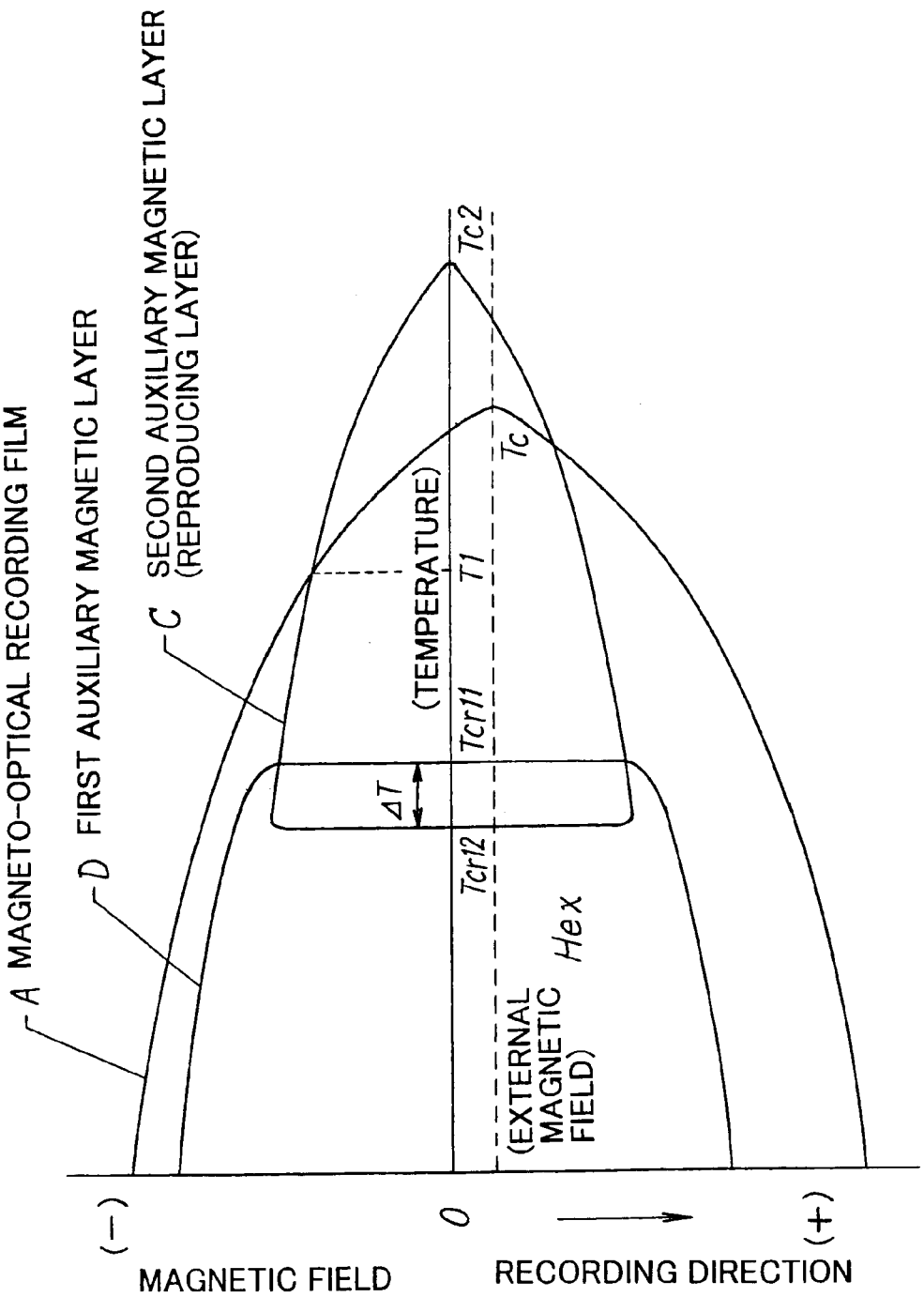
FIG. 31 shows the magnetic temperature characteristic of the magneto-optical recording medium shown in FIG. 30.

The recording layer 10 is based on the use of the TbFeCo alloy having its Curie temperature Tco of 270° C. and its compensation temperature of not more than room temperature. That is, the relationship of room temperature<$Tcr_{12}$<$Tcr_{11}$<Tco, $Tc_1$, $Tc_2$ holds concerning the Curie Temperature Tco of the recording layer 10, the Curie temperature $Tc_2$ and the critical temperature $Tcr_{12}$ of the reproducing layer 24 (second auxiliary magnetic film), and the Curie temperature $Tc_1$ and the critical temperature $Tcr_{11}$ of the magnetic layer 28 (first auxiliary magnetic film). The temperature relationship is shown in FIG. 31. In the same manner as FIG. 20, FIG. 31 shows the magnetic characteristics of the recording layer 10, the reproducing layer 24, and the magnetic layer 28 (first auxiliary magnetic film) of the magneto-optical recording medium 100 in a state in which a constant DC magnetic field Hex is applied in the recording direction to the magneto-optical recording medium 100. As shown in FIG. 31, temperature ranges for the reproducing layer 24 and the magnetic layer 28 (first auxiliary magnetic film) to exhibit the perpendicular magnetization overlap in a relatively narrow temperature range (arrow ΔT in FIG. 31). In this temperature range, the recording layer 10, the magnetic layer 28, and the reproducing layer 24 can be magnetically coupled.

Figure 32:
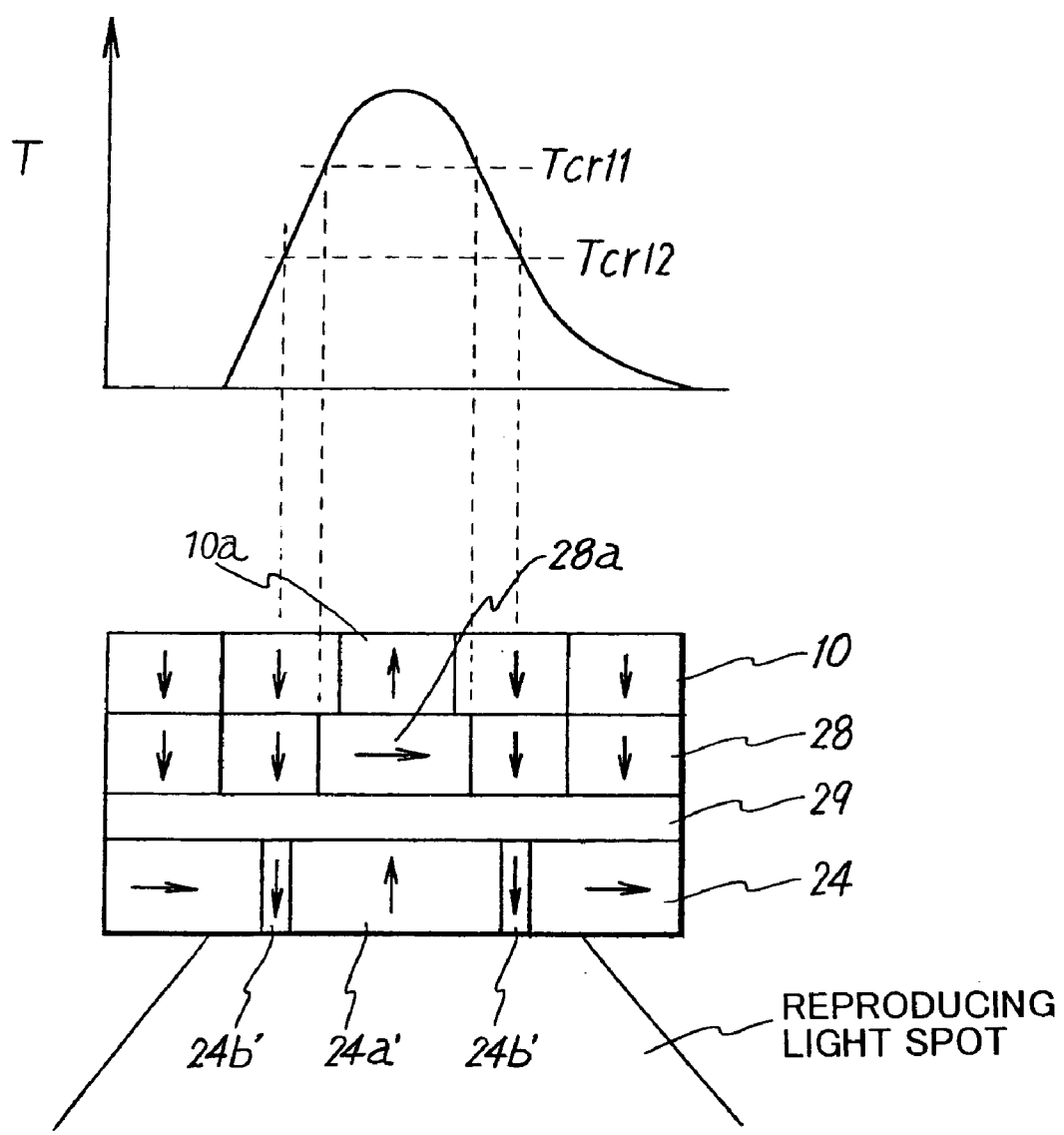
FIG. 32 illustrate the principle of reproduction on the magneto-optical recording medium produced in the eleventh embodiment.

The principle of reproduction on the magneto-optical disk 100 shown in FIG. 30 may be explained with reference to FIG. 32. That is, the reproducing layer 24 of the magneto-optical disk 100 is irradiated with the reproducing light beam, and the temperature of the reproducing layer 24 is raised. The area, in which the temperature exceeds the critical temperature $Tcr_{12}$, causes transition from the in-plane magnetization to the perpendicular magnetization, simultaneously with which the magnetization in the recording layer 10 is transferred to the reproducing layer 24 by the aid of the magnetostatic coupling force. The reproducing light power and $Tcr_{12}$ are adjusted so that the area (24a') in which the temperature exceeds the critical temperature $Tcr_{12}$ is larger than the magnetic domain 10a in which the magnetization information of the recording layer 10 is recorded. Therefore, the portion of the reproducing layer 24 having the perpendicular magnetization is magnified to be larger than the magnetic domain in the recording layer 10 as the transfer source. On the other hand, the perpendicular magnetization in the magnetic layer 28 undergoes transition to the in-plane magnetization in the area (28a) in which the temperature exceeds the critical temperature $Tcr_{11}$ existing inside the area in which the temperature exceeds the critical temperature $Tcr_{12}$ in accordance with the temperature distribution of the magneto-optical disk 100. The in-plane magnetization area 28a in the magnetic layer 28 intercepts the leakage magnetic field, after the recording magnetic domain information is transmitted from the recording layer 10 to the reproducing layer 24. Accordingly, the magnification an the reproducing layer 24 is facilitated, simultaneously with which C/N of the reproduced signal obtained from the recording layer 24 is improved. In the present invention, it is required to satisfy $Tcr_{12}<Tcr_{11}$. However, it is preferable that the difference in temperature ΔT between $Tcr_{12}$ and $Tcr_{11}$ is selected so that C/N of the reproduced signal is optimized, and the reproduced signal intensity brought about by the magnetic domain magnification is maximized.

When the recording signal recorded on the recording layer 10 of the magneto-optical disk 100 is reproduced, the reproducing power is modulated to have the two powers in synchronization with the reproducing clock or the integral multiple thereof (recording clock or the integral multiple thereof), as explained in the principle of the reproducing method of the present invention. The reduction and the extinguishment of the magnified magnetic domain may be caused by using any one of the low power and the high power as described above. However, in this embodiment, the reproducing light beam to transfer and magnify the magnetic domain was modulated to have the low power, and the reproducing light beam to reduce or extinguish the magnified magnetic domain was modulated to have the high power. The power levels are applied during the period in which the recording track is subjected to scanning by irradiating the magneto-optical disk with the reproducing light beam.

INDUSTRIAL APPLICABILITY

According to the present invention, when the information recorded on the magneto-optical recording medium, all of the recorded information is not faithfully reproduced. Different pieces of information can be reproduced by using, depending on the use and the purpose, the different application patterns of the external magnetic field or the different radiation patterns of the reproducing light beam applied during the reproduction. When such a pattern is used as a password, only a person, who has the password, can access the specified information recorded on the magneto-optical recording medium. Accordingly, the use of the reproducing method and the reproducing apparatus according to the present invention makes it possible to construct a novel system for keeping confidential information based on the use of the magneto-optical recording medium.

Further, the use of the reproducing method and the reproducing apparatus according to the present invention makes it possible to improve C/N in the method for reproducing information recorded at a high density, such as those based on the magnetically induced super resolution and the magnetic domain-magnifying reproduction.

What is claimed is:

1. A method for reproducing information recorded on a magneto-optical recording medium while radiating a reproducing light beam onto the magneto-optical recording medium, the method comprising the step of:

radiating the reproducing light beam including different radiation patterns onto an identical recording area on the magneto-optical recording medium so that different pieces of information corresponding to the radiation patterns are reproduced from the identical recording area.

2. The method according to claim 1, wherein the radiation pattern is represented as a function L(x) of a reproducing light beam intensity with respect to a position x on the magneto-optical recording medium.

3. The method according to claim 2, wherein the function L(x) is a password to obtain information, and only a person, who knows the function L(x), is able to access specified information capable of being reproduced with the function L(x).

4. The method according to claim 1, herein a specified information sequence is precoded and recorded beforehand on the magneto-optical recording medium so that the specified information sequence is reproduced when a function L(x) of the reproducing light beam intensity is used.

5. The method according to claim 1, wherein the different radiation patterns are obtained by changing at least one of an intensity of a laser beam, a clock frequency for synchronizing radiation of the laser beam, a duty for radiating the laser beam, a rising shape and a falling shape of radiation intensity of the laser beam, and a timing for radiating the laser beam.

6. The method according to claim 1, wherein the different pieces of information are obtained from the identical recording area depending on an on/off pattern of the reproducing light beam.

7. The method according to claim 1, wherein an information sequence previously recorded on a specified portion of the magneto-optical recording medium is reproduced by applying the reproducing light beam having a pattern capable of reproducing the specified portion.

8. The method according to claim 7, wherein the information sequence recorded on the specified portion of the magneto-optical recording medium is an information sequence which is discontinuously recorded in a track direction.

9. The method according to claim 8, wherein the information sequence recorded on the specified portion of the magneto-optical recording medium is an information sequence which is composed of code information recorded at every cycle that is at least twice as much as a recording clock.

10. A magneto-optical reproducing apparatus for reproducing recorded information by radiating a reproducing light beam onto a magneto-optical recording medium, the apparatus comprising:

a light source for radiating the reproducing light beam onto the magneto-optical recording medium during reproduction;

a means for selecting a specified radiation pattern from a plurality of radiation patterns; and a driving unit for driving the light source in accordance with the selected specified pattern, wherein:

the information recorded on the magneto-optical recording medium is reproduced while radiating the reproducing light beam onto the magneto-optical recording medium in accordance with the specified radiation pattern to make it possible to obtain specified information based on the pattern.

11. The magneto-optical reproducing apparatus according to claim 10, wherein the radiation pattern is a password to access the specified information recorded on the magneto-optical recording medium, the specified pattern is selected when a user inputs the password into the reproducing apparatus, and the specified information is reproduced by radiating the reproducing light beam onto the magneto-optical recording medium in accordance with the specified pattern.

12. The magneto-optical reproducing apparatus according to claim 10, wherein the reproducing apparatus has a recording function, and it further comprises an encoder for pre-coding the specified information when the information is recorded so that the specified information is reproduced in accordance with the radiation pattern.

13. The magneto-optical reproducing apparatus according to claim 10, further comprising a unit for applying a DC magnetic field to the magneto-optical recording medium.

14. The magneto-optical reproducing apparatus according to claim 10, further comprising a storage unit for storing the plurality of radiation patterns.

* * * * *